US012117749B2

(12) United States Patent
Nanno

(10) Patent No.: US 12,117,749 B2
(45) Date of Patent: Oct. 15, 2024

(54) FIXING DEVICE AND IMAGE FORMING APPARATUS INCORPORATING SAME

(71) Applicant: Shigeo Nanno, Kanagawa (JP)

(72) Inventor: Shigeo Nanno, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 18/144,854

(22) Filed: May 9, 2023

(65) Prior Publication Data

US 2023/0375966 A1 Nov. 23, 2023

(30) Foreign Application Priority Data

May 20, 2022 (JP) ................................ 2022-083025

(51) Int. Cl.
*G03G 15/20* (2006.01)
*G03G 15/00* (2006.01)

(52) U.S. Cl.
CPC ......... *G03G 15/2039* (2013.01); *G03G 15/80* (2013.01)

(58) Field of Classification Search
CPC ........... G03G 15/2017; G03G 15/2039; G03G 15/2042; G03G 15/2053; G03G 15/80; G03G 2215/2022
See application file for complete search history.

(56) References Cited

U.S. PATENT DOCUMENTS

| | | | | |
|---|---|---|---|---|
| 11,921,448 B2 * | 3/2024 | Nanno | G03G 15/2017 |
| 2005/0163540 A1 * | 7/2005 | Umezawa | G03G 15/2053 399/328 |
| 2012/0177422 A1 | 7/2012 | Nanno et al. | |
| 2012/0275834 A1 | 11/2012 | Naitoh et al. | |
| 2013/0064586 A1 | 3/2013 | Adachi et al. | |
| 2014/0112691 A1 | 4/2014 | Nanno et al. | |
| 2014/0153983 A1 | 6/2014 | Fujii et al. | |
| 2015/0248091 A1 | 9/2015 | Nanno et al. | |
| 2022/0035287 A1 | 2/2022 | Nanno | |
| 2022/0155712 A1 | 5/2022 | Imada et al. | |
| 2022/0291615 A1 | 9/2022 | Nanno et al. | |

FOREIGN PATENT DOCUMENTS

| | | |
|---|---|---|
| JP | 2016-142747 | 8/2016 |
| JP | 2017-026883 | 2/2017 |

OTHER PUBLICATIONS

U.S. Appl. No. 17/943,220, filed Sep. 13, 2022, Shigeo Nanno.
U.S. Appl. No. 17/987,878, filed Nov. 16, 2022, Shigeo Nanno.

* cited by examiner

*Primary Examiner* — Hoang X Ngo
(74) *Attorney, Agent, or Firm* — XSENSUS LLP

(57) ABSTRACT

A fixing device includes a rotator, a pressure rotator, a heater, and a conductor. The pressure rotator presses the rotator to form a fixing nip between the rotator and the pressure rotator. The heater is in contact with an inner circumferential surface of the rotator and heats the rotator. The conductor is grounded and has a contact portion in contact with a center region of the inner circumferential surface of the rotator in a longitudinal direction of the rotator.

20 Claims, 22 Drawing Sheets

FIXING DEVICE AND IMAGE FORMING APPARATUS INCORPORATING SAME

CROSS-REFERENCE TO RELATED APPLICATIONS

This patent application is based on and claims priority pursuant to 35 U.S.C. § 119(a) to Japanese Patent Application No. 2022-083025, filed on May 20, 2022, in the Japan Patent Office, the entire disclosure of which is hereby incorporated by reference herein.

BACKGROUND

Technical Field

Embodiments of the present disclosure generally relate to a fixing device and an image forming apparatus incorporating the fixing device.

Related Art

A fixing device includes a fixing belt as a fixing rotator, a heater in contact with an inner circumferential surface of the fixing belt to heat the fixing belt, and a pressure roller to press the fixing belt. One type of the heater includes a base and a resistive heat generator formed on the base. Applying an alternating current (AC) voltage to the resistive heat generator generates heat. The heat heats the inner circumferential surface of the fixing belt via an insulation layer or the like.

SUMMARY

This specification describes an improved fixing device that includes a rotator, a pressure rotator, a heater, and a conductor. The pressure rotator presses the rotator to form a fixing nip between the rotator and the pressure rotator. The heater is in contact with an inner circumferential surface of the rotator to heat the rotator. The conductor is grounded and has a contact portion in contact with a center region of the inner circumferential surface of the rotator in a longitudinal direction of the rotator.

This specification also describes an improved fixing device that includes a rotator, a pressure rotator, a heater, and multiple conductors. The rotator has a center region and outer regions outside the center region in a longitudinal direction of the rotator. The pressure rotator presses the rotator to form a fixing nip between the rotator and the pressure rotator. The heater is in contact with an inner circumferential surface of the rotator and heats the rotator. The multiple conductors are grounded and include a first conductor and a second conductor. The first conductor has a first contact portion in contact with one of the outer regions of the inner circumferential surface of the rotator. The second conductor has a second contact portion in contact with the other one of the outer regions of the inner circumferential surface of the rotator.

This specification further describes an improved fixing device that includes a rotator, a pressure rotator, a heater, a conductor, and a temperature sensor. The rotator has a center region and outer regions outside the center region in a longitudinal direction of the rotator. The pressure rotator presses the rotator to form a fixing nip between the rotator and the pressure rotator. The heater is in contact with an inner circumferential surface of the rotator and heats the rotator. The conductor is grounded and has a first contact portion in contact with one of the outer regions of the inner circumferential surface of the rotator. The temperature sensor has a second contact portion in contact with the other one of the outer regions of the inner circumferential surface of the rotator.

This specification still further describes an image forming apparatus including any one of the fixing devices.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
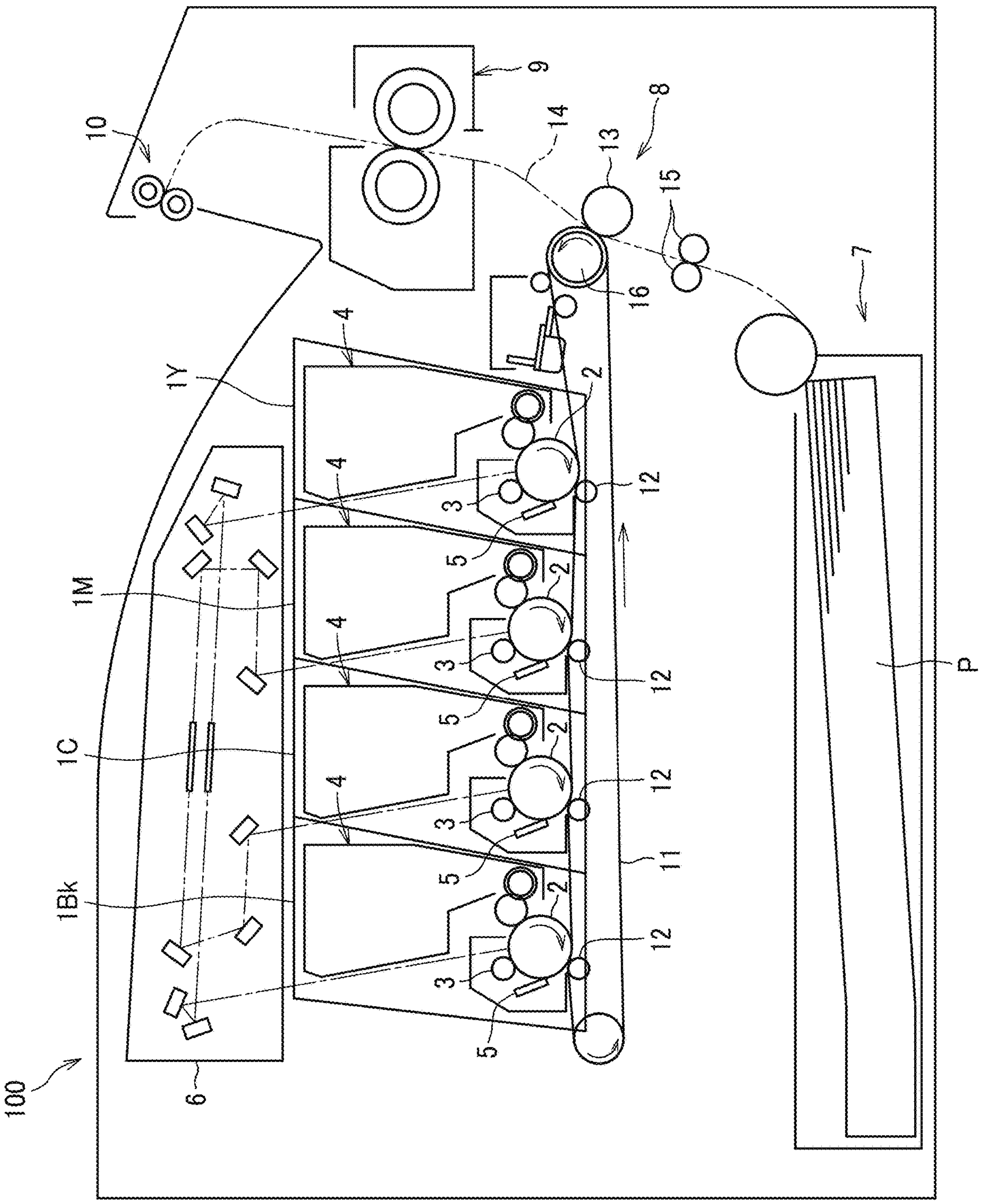
FIG. 1 is a schematic cross-sectional view of an image forming apparatus.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Referring to the drawings, embodiments of the present disclosure are described below. Identical reference numerals are assigned to identical components or equivalents and a description of those components is simplified or omitted. Hereinafter, a fixing device incorporated in an image forming apparatus is described as a heating device according to an embodiment of the present disclosure.

FIG. 1 is a schematic sectional view of an image forming apparatus 100 according to an embodiment of the present disclosure.

The image forming apparatus 100 illustrated in FIG. 1 includes four image forming units 1Y, 1M, 1C, and 1Bk detachably attached to an image forming apparatus body. The image forming units 1Y, 1M, 1C, and 1Bk have substantially the same configuration except for containing different color developers, i.e., yellow (Y), magenta (M), cyan (C), and black (Bk) toners, respectively. The colors of the developers correspond to color separation components of full-color images. Each of the image forming units 1Y, 1M, 1C, and 1Bk includes a drum-shaped photoconductor 2 as an image bearer, a charging device 3, a developing device 4, and a cleaning device 5. The charging device 3 charges the surface of the photoconductor 2. The developing device 4 supplies the toner as the developer to the surface of the photoconductor 2 to form a toner image. The cleaning device 5 cleans the surface of the photoconductor 2.

The image forming apparatus 100 includes an exposure device 6, a sheet feeder 7, a transfer device 8, a fixing device 9 as the heating device, and a sheet ejection device 10. The exposure device 6 exposes the surface of the photoconductor 2 to form an electrostatic latent image on the surface of the photoconductor 2. The sheet feeder 7 supplies a sheet P as a recording medium to a sheet conveyance path 14. The transfer device 8 transfers the toner images formed on the photoconductors 2 onto the sheet P. The fixing device 9 fixes the toner image transferred onto the sheet P to the surface of the sheet P. The sheet ejection device 10 ejects the sheet P outside the image forming apparatus 100. The image forming units 1Y, 1M, 1C, and 1Bk, photoconductors 2, the charging devices 3, the exposure device 6, the transfer device 8, and the like configure an image forming device that forms the toner image on the sheet P.

The transfer device 8 includes an intermediate transfer belt 11 having an endless form and serving as an intermediate transferor, four primary transfer rollers 12 serving as primary transferors, and a secondary transfer roller 13 serving as a secondary transferor. The intermediate transfer belt 11 is stretched by a plurality of rollers. Each of the four primary transfer rollers 12 transfers the toner image from each of the photoconductors 2 onto the intermediate transfer belt 11. The secondary transfer roller 13 transfers the toner image transferred onto the intermediate transfer belt 11 onto the sheet P. The four primary transfer rollers 12 are in contact with the respective photoconductors 2 via the intermediate transfer belt 11. Thus, the intermediate transfer belt 11 contacts each of the photoconductors 2, forming a primary transfer nip between the intermediate transfer belt 11 and each of the photoconductors 2.

The secondary transfer roller 13 contacts, via the intermediate transfer belt 11, one of the plurality of rollers around which the intermediate transfer belt 11 is stretched. Thus, the secondary transfer nip is formed between the secondary transfer roller 13 and the intermediate transfer belt 11.

A timing roller pair 15 is disposed in a sheet conveyance path 14 at a position between the sheet feeder 7 and the secondary transfer nip defined by the secondary transfer roller 13.

Referring to FIG. 1, a description is provided of printing processes performed by the image forming apparatus 100 described above.

When the image forming apparatus 100 receives an instruction to start printing, a driver drives and rotates the photoconductor 2 clockwise in FIG. 1 in each of the image forming units 1Y, 1M, 1C, and 1Bk. The charging device 3 charges the surface of the photoconductor 2 uniformly at a high electric potential. Next, the exposure device 6 exposes the surface of each photoconductor 2 based on image data of the document read by the document reading device or print data instructed to be printed from a terminal. As a result, the potential of the exposed portion on the surface of each photoconductor 2 decreases, and an electrostatic latent image is formed on the surface of each photoconductor 2. The developing device 4 supplies toner to the electrostatic latent image formed on the photoconductor 2, forming a toner image thereon.

The toner image formed on each of the photoconductors 2 reaches the primary transfer nip defined by each of the primary transfer rollers 12 in accordance with rotation of each of the photoconductors 2. The toner images are sequentially transferred and superimposed onto the intermediate transfer belt 11 that is driven to rotate counterclockwise in FIG. 1 to form a full color toner image. Thereafter, the full color toner image formed on the intermediate transfer belt 11 is conveyed to the secondary transfer nip defined by the secondary transfer roller 13 in accordance with rotation of the intermediate transfer belt 11. The full color toner image is transferred onto the sheet P conveyed to the secondary transfer nip. The sheet P is supplied from the sheet feeder 7. The timing roller pair 15 temporarily halts the sheet P supplied from the sheet feeder 7. Thereafter, the timing roller pair 15 conveys the sheet P to the secondary transfer nip so that the sheet P meets the full color toner image formed on the intermediate transfer belt 11 at the secondary transfer nip. Thus, the full color toner image is transferred onto and borne on the sheet P. After the toner image is transferred from each of the photoconductors 2 onto the intermediate transfer belt 11, each of cleaning devices 5 removes residual toner on each of the photoconductors 2.

After the full color toner image is transferred onto the sheet P, the sheet P is conveyed to the fixing device 9 to fix the full color toner image onto the sheet P. Thereafter, the sheet ejection device 10 ejects the sheet P onto the outside of the image forming apparatus 100, thus finishing a series of printing processes.

Next, a configuration of the fixing device 9 is described.

Figure 2:
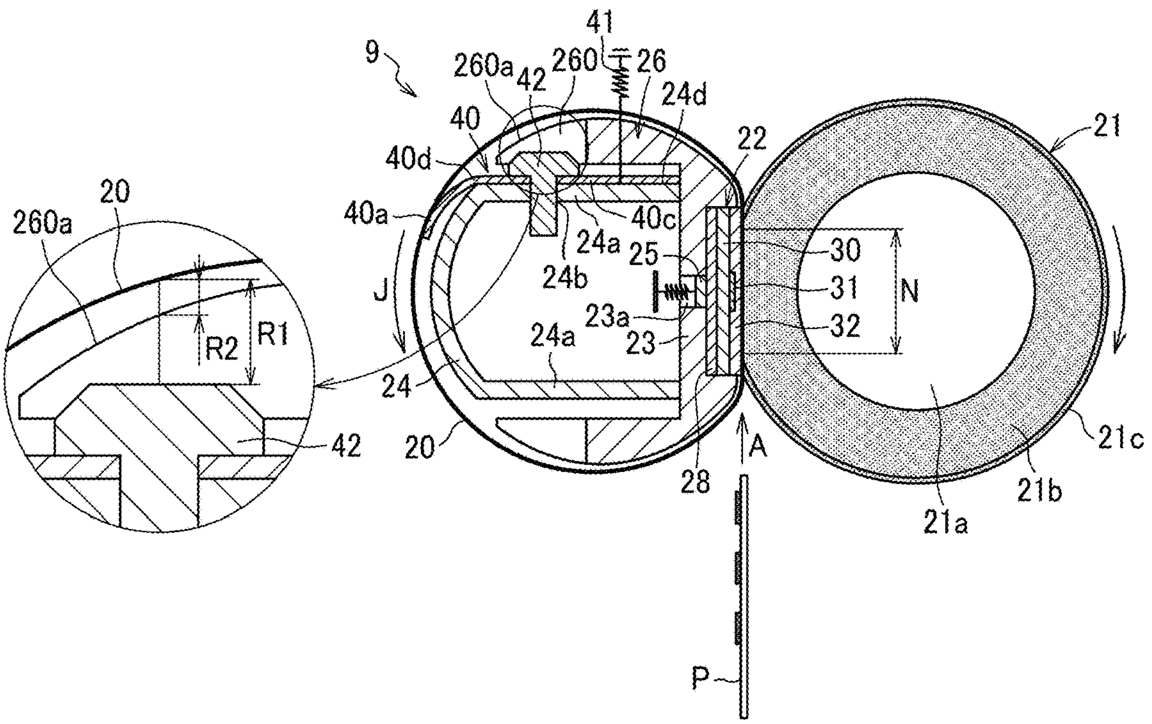
FIG. 2 is a cross-sectional side view of a fixing device including a fastener to fix a conductor.

As illustrated in FIG. 2, the fixing device 9 according to the present embodiment includes a fixing belt 20, a pressure roller 21 as an opposed rotator or a pressure rotator, a heater 22 as a heating member, a heater holder 23 as a holder, a stay 24, a thermistor 25 as a temperature sensor, a first high thermal conduction member 28, and a conductor 40. The fixing belt 20 is an endless belt. The pressure roller 21 is in contact with the outer circumferential surface of the fixing belt 20 to form a fixing nip N between the pressure roller 21 and the fixing belt 20. The heater 22 heats the fixing belt 20. The heater holder 23 holds the heater 22. The stay 24 supports the heater holder 23. The thermistor 25 detects the temperature of the first high thermal conduction member 28. The fixing device 9 is detachably attached to the image forming apparatus.

The fixing belt 20, the pressure roller 21, the heater 22, the heater holder 23, the stay 24, and the first high thermal conduction member 28 extend in a direction perpendicular to the sheet surface of FIG. 2. Hereinafter, the direction is simply referred to as a longitudinal direction. The longitudinal direction is indicated by a double-headed arrow X in FIG. 4. Note that the longitudinal direction is also a width direction of the sheet P conveyed, a belt width direction of the fixing belt 20, and an axial direction of the pressure roller 21. A direction indicated by an arrow A in FIG. 2 is a sheet conveyance direction. Hereinafter, an upstream side in the sheet conveyance direction that is a lower side in FIG. 2 is simply referred to as the upstream side, and a downstream side in the sheet conveyance direction that is an upper side in FIG. 2 is simply referred to as the downstream side.

A fixing rotator disposed in the fixing device is an aspect of the rotator disposed in the heating device of the present disclosure. The fixing device 9 in the present embodiment includes the fixing belt 20 as an example of the fixing rotator. The stay 24 is an example of a first facing member disposed in the heating device of the present disclosure and is also a support that supports the holder.

The fixing belt 20 includes a base layer configured by, for example, a tubular base made of polyimide (PI), and the tubular base has an outer diameter of 25 mm and a thickness of from 40 to 120 μm. The fixing belt 20 further includes a release layer serving as an outermost surface layer. The release layer is made of fluororesin, such as tetrafluoroethylene-perfluoroalkylvinylether copolymer (PFA) or polytetrafluoroethylene (PTFE) and has a thickness in a range of from 5 to 50 μm to enhance durability of the fixing belt 20 and facilitate separation of the sheet P and a foreign substance from the fixing belt 20. An elastic layer made of rubber having a thickness of from 50 to 500 μm may be interposed between the base layer and the release layer. The fixing belt 20 of the present embodiment may be a rubberless belt including no elastic layer. The base layer of the fixing belt 20 may be made of heat resistant resin such as polyetheretherketone (PEEK) or metal such as nickel (Ni) or steel use stainless (SUS), instead of PI. The inner circumferential surface of the fixing belt 20 may be coated with PI or PTFE as a slide layer.

The pressure roller 21 having, for example, an outer diameter of 25 mm, includes a solid iron core 21*a*, an elastic layer 21*b* formed on the surface of the core 21*a*, and a release layer 21*c* formed on the outside of the elastic layer 21*b*. The elastic layer 21*b* is made of silicone rubber and has a thickness of 3.5 mm, for example. Preferably, the release layer 21*c* is formed by a fluororesin layer having, for example, a thickness of approximately 40 μm on the surface of the elastic layer 21*b* to improve releasability.

The pressure roller 21 is biased toward the fixing belt 20 by a biasing member and pressed against the heater 22 via the fixing belt 20. Thus, the fixing nip N is formed between the fixing belt 20 and the pressure roller 21. A driver drives and rotates the pressure roller 21 in a direction indicated by the arrow in FIG. 2, and the rotation of the pressure roller 21 rotates the fixing belt 20 in a direction indicated by an arrow J in FIG. 2.

The heater 22 is disposed to contact the inner circumferential surface of the fixing belt 20. The heater 22 in the present embodiment contacts the pressure roller 21 via the fixing belt 20 and serves as a nip formation pad to form the fixing nip N between the pressure roller 21 and the fixing belt 20. The fixing belt 20 is a heated member heated by the heater 22.

The heater 22 is a planar heater extending in the longitudinal direction thereof parallel to the width direction of the fixing belt 20. The heater 22 includes a planar base 30, resistive heat generators 31 disposed on the base 30, and an insulation layer 32 covering the resistive heat generators 31. A power supply 200 (see FIG. 31) applies an alternating current (AC) voltage to the heater 22, and the resistive heat generators 31 mainly generate heat to heat the fixing belt 20.

The insulation layer 32 of the heater 22 contacts the inner circumferential surface of the fixing belt 20, and the heat generated by the resistive heat generators 31 is transmitted to the fixing belt 20 through the insulation layer 32.

The heater 22 may be covered with a conductor such as a sliding sheet, and the sliding sheet may contact the inner circumferential surface of the fixing belt 20. Although the resistive heat generators 31 and the insulation layer 32 are disposed on the side of the base 30 facing the fixing belt 20 (that is, the fixing nip N) in the present embodiment, the resistive heat generators 31 and the insulation layer 32 may be disposed on the opposite side of the base 30, that is, the side facing the heater holder 23. In this case, since the heat of the resistive heat generator 31 is transmitted to the fixing belt 20 through the base 30, it is preferable that the base 30 be made of a material with high thermal conductivity such as aluminum nitride. Making the base 30 with the material having the high thermal conductivity enables to sufficiently heat the fixing belt 20 even if the resistive heat generators 31 are disposed on the side of the base 30 opposite to the side facing the fixing belt 20.

When the fixing belt 20 rotates, the inner circumferential surface of the fixing belt 20 slides on the heater 22 in the fixing nip N. To reduce a frictional resistance between the fixing belt 20 and the heater 22, lubricant such as grease is applied to a sliding contact surface of the heater 22. As a result, abrasion of the fixing belt 20 can be reduced.

The heater holder 23 and the stay 24 are disposed inside a loop of the fixing belt 20. The stay 24 is configured by a channeled metallic member, and both side plates of the fixing device 9 support both end portions of the stay 24 in the longitudinal direction of the stay 24. Since the stay 24 supports the heater holder 23 and the heater 22, the heater 22 reliably receives a pressing force of the pressure roller 21 pressed against the fixing belt 20. Thus, the fixing nip N is stably formed between the fixing belt 20 and the pressure roller 21. In the present embodiment, the thermal conductivity of the heater holder 23 is set to be smaller than the thermal conductivity of the base 30.

The stay 24 has a substantially U-shaped structure including right-angle portions 24*a* that are an upstream side wall and a downstream side wall in the sheet conveyance direction. Each end of the right-angle portions 24*a* is in contact with the heater holder 23 to support the heater holder 23. The right-angle portion 24*a* extends in a lateral direction in FIG. 2 that is a pressing direction of the pressure roller 21. The stay 24 is grounded via a resistor 41.

In other words, the stay 24 according to the present embodiment has portions extending in the pressing direction of the pressure roller 21 that is the lateral direction in FIG. 2, the portions each having a thickness. The portions are disposed in the left part in FIG. 2 so as to face the pressure roller 21. Bringing the portions into contact with the heater holder 23 supports the heater holder 23. Such a configuration reduces a bend of the heater holder 23 caused by the pressing force from the pressure roller 21, in particular, the bend in the longitudinal direction of the heater holder 23 in the present embodiment. However, the above-described contact between the stay 24 and the heater holder 23 includes not only the case where the stay 24 is in direct contact with the heater holder 23 but also the case where the stay 24 contacts the heater holder 23 via another member. The term "contact via another member" means a state in which another member is interposed between the stay 24 and the heater holder 23 in the lateral direction in FIG. 2, and at a position corresponding to at least a part of the member, the stay 24 contacts the member, and the member contacts the heater holder 23.

The term "extending in the pressing direction" is not limited to a case where the portion of the stay 24 extends in the same direction as the pressing direction of the pressure roller 21 but includes the case where the portion of the stay 24 extends in a direction with a certain angle from the pressing direction of the pressure roller 21. Even in such cases, the stay 24 can reduce bending of the heater holder 23 under pressure from the pressure roller 21.

Since the heater holder 23 is heated to a high temperature by heat from the heater 22, the heater holder 23 is preferably made of a heat resistant material. The heater holder 23 made of heat-resistant resin having low thermal conduction, such as a liquid crystal polymer (LCP) or PEEK, reduces heat transfer from the heater 22 to the heater holder 23. Thus, the heater 22 can effectively heat the fixing belt 20.

Figure 38:
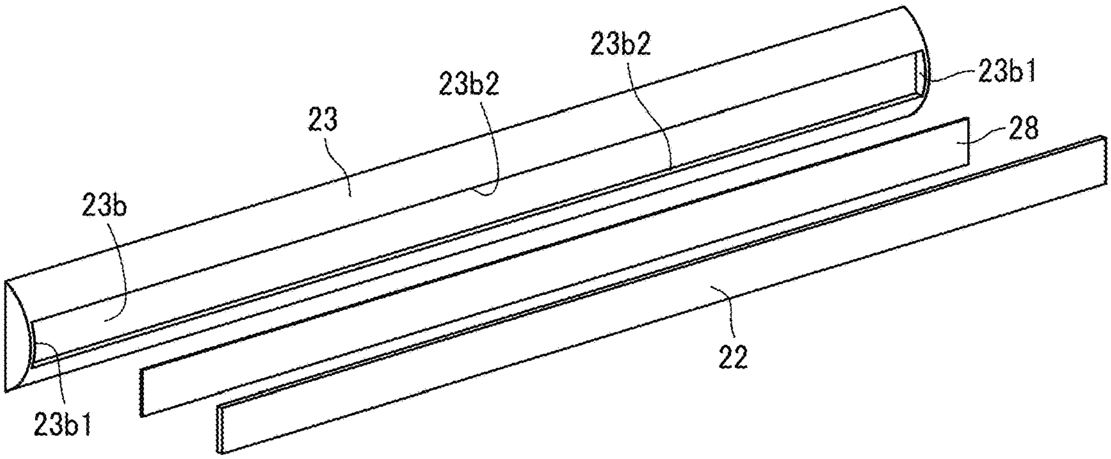
FIG. 38 is a perspective view of the heater, a first high thermal conduction member, and a heater holder.

As illustrated in FIG. 38, the heater holder 23 has a recessed portion **23*b* to hold the heater 22 and the first high thermal conduction member 28**.

As illustrated in FIG. 2, the heater holder 23 includes guide portions 26 to guide the fixing belt 20. The heater holder 23 and the guide portions 26 may be formed as one part.

The guide portions 26 include upstream portions upstream from the heater holder 23 and downstream portions downstream from the heater holder 23 in the sheet conveyance direction.

The guide portions 26 include a plurality of guide ribs 260 as guides. Each guide rib 260 has a substantial fan shape. The guide rib 260 has a guide surface **260*a* that is an arc-shaped or convex curved surface extending in a belt circumferential direction along the inner circumferential surface of the fixing belt 20**.

The heater holder 23 has openings **23*a* extending through the heater holder 23 in the thickness direction thereof. The thermistor 25 and a thermostat which is described later are disposed in the openings 23*a*. Springs press the thermistor 25 and the thermostat against the back surface of the first high thermal conduction member 28. However, the first high thermal conduction member 28 and a second high thermal conduction member described later may have openings similar to the openings 23*a* to press the thermistor 25 and the thermostat against the back surface of the base 30**.

The first high thermal conduction member 28 is made of a material having a thermal conductivity higher than a thermal conductivity of the base 30. In the present embodiment, the first high thermal conduction member 28 is a plate made of aluminum. Alternatively, the first high thermal conduction member 28 may be made of copper, silver, graphene, or graphite, for example. The first high thermal conduction member 28 that is the plate can improve accuracy of positioning of the heater 22 with respect to the heater holder 23 and the first high thermal conduction member 28.

Next, a method of calculating the thermal conductivity is described. In order to calculate the thermal conductivity, the thermal diffusivity of a target object is firstly measured. Using the thermal diffusivity, the thermal conductivity is calculated.

The thermal diffusivity is measured using a thermal diffusivity/conductivity measuring device (for example, trade name: AI-PHASE MOBILE 1U, manufactured by Ai-Phase co., ltd.).

In order to convert the thermal diffusivity into thermal conductivity, values of density and specific heat capacity are necessary. The density is measured using a dry automatic densitometer (for example, trade name: Accupyc 1330, manufactured by Shimadzu Corporation). The specific heat capacity is measured by a differential scanning calorimeter (for example, trade name: DSC-60 manufactured by Shimadzu Corporation), and sapphire is used as a reference material in which the specific heat capacity is known. For example, the specific heat capacity is measured five times, and an average value at 50° C. is used. The thermal conductivity λ is obtained by the following expression (1).

$$\lambda=\rho\times C\times\alpha \quad (1)$$

where ρ is the density, C is the specific heat capacity, and a is the thermal diffusivity obtained by the thermal diffusivity measurement described above.

When the fixing device 9 according to the present embodiment starts printing, the pressure roller 21 is driven to rotate, and the fixing belt 20 starts to be rotated. The guide surface **260*a* of the guide rib 260 contacts and guides the inner circumferential surface of the fixing belt 20 to stably and smoothly rotates the fixing belt 20. As power is supplied to the resistive heat generators 31 of the heater 22, the heater 22 heats the fixing belt 20. When the temperature of the fixing belt 20 reaches a predetermined target temperature which is called a fixing temperature, as illustrated in FIG. 2, the sheet P bearing an unfixed toner image is conveyed to the fixing nip N between the fixing belt 20 and the pressure roller 21**, and the unfixed toner image is heated and pressed to be fixed to the sheet P.

Figure 3:
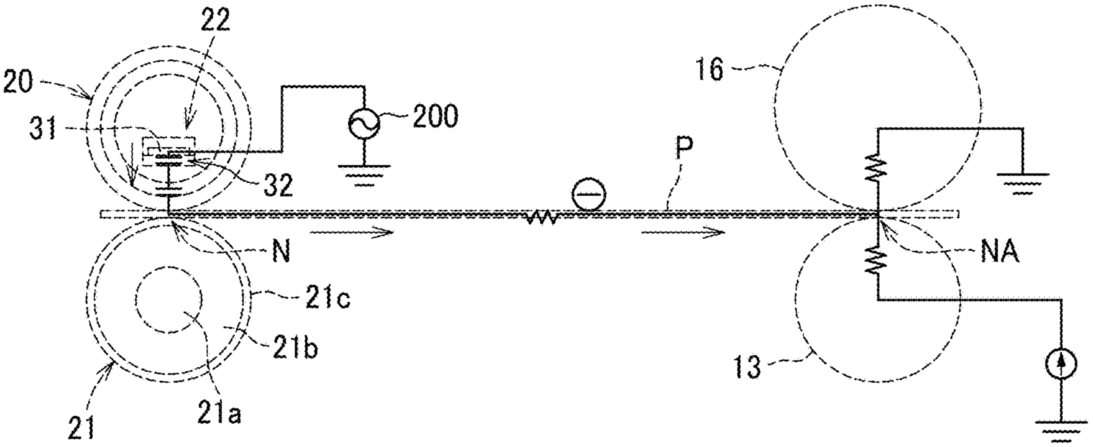
FIG. 3 is a schematic diagram for describing how a banding image is formed.

The above-described fixing device 9 has a disadvantage called a banding image. In the fixing device 9 including the heater 22 to which the AC voltage is applied, the insulation layer in the heater 22 and the surface layer of the fixing belt 20 are equivalent to parts of a capacitor. The fixing belt 20 in contact with the heater 22 applies the AC voltage to the fixing nip N. As illustrated in FIG. 3, the sheet P in contact with both the fixing nip N and the secondary transfer nip NA transmits the AC voltage to the secondary transfer nip NA in a direction indicated by arrow in FIG. 3. The AC voltage affects the transfer electric field to cause periodic density unevenness in the transferred image that is called the banding image. In particular, in a case where the sheet P has low resistance, for example, in a high-humidity environment or when a thin paper sheet is used as the sheet P, the above-described disadvantage is likely to occur. The secondary transfer nip NA is a nip portion formed between the secondary transfer roller 13 and a secondary-transfer backup roller 16.

The above-described fixing device 9 may cause an image defect due to electrostatic offset that occurs as follows.

The surface layer of the fixing belt 20 is charged and attracts the unfixed toner on the sheet P passing through the fixing nip N, and the unfixed toner on the sheet P adheres to the fixing belt 20. The fixing belt 20 rotates and conveys the toner that adheres to the fixing belt 20 to the fixing nip N again, and the toner adheres to another part of the sheet P or another sheet P that reaches the fixing nip N after the above-described sheet P has passed through the fixing nip N. The adhesion of the toner causes the image defect.

The fixing device 9 according to the present embodiment includes the above-described conductor 40 to pass an alternating current from the fixing nip N to the ground via the fixing belt 20 and the conductor 40. As a result, the occurrence of the above-described banding image is prevented. The conductor 40 removes the charge on the surface of the fixing belt 20 to prevent the image defect due to the above-described electrostatic offset.

The conductor 40 has a sheet shape. The conductor 40 is made of conductive material. The conductor 40 in the present embodiment is made of conductive polyimide in which carbon black is added.

The conductor 40 is grounded via the stay 24 and the resistor 41. Multiple conductors 40 may be arranged in the longitudinal direction, or one conductor 40 may be disposed. The conductor 40 is disposed between the stay 24 and the guide portion 26.

The conductor 40 has one end 40*a* that is a free end. The end 40*a* is a contact portion in contact with the inner circumferential surface of the fixing belt 20. The contact of the one end 40*a* with the inner circumferential surface of the fixing belt 20 enables the charge on the fixing belt 20 to pass to the ground through the stay 24 and the resistor 41, removing the charge accumulated on the fixing belt 20. The conductor 40 in the present embodiment has the other end 40*b* that is opposite to the one end 40*a*. The one end 40*a* may include an area nearer to one edge of the conductor 40 than the center of an area of the conductor 40 along a direction orthogonal to a width direction of the conductor 40 and a direction along the surface of the conductor 40. The other end 40*b* may include an area nearer to the other edge of the conductor 40 than the center of the area of the conductor 40 along the direction orthogonal to the width direction of the conductor 40 and the direction along the surface of the conductor 40.

The conductor 40 in the present embodiment has a facing portion 40*c* facing a first facing surface 24*d* of the stay 24 as the first facing member, and the facing portion 40*c* is fixed to the right-angle portion 24*a* by a screw 42 as a fastener. The right-angle portion 24*a* of the stay 24 has a fastening hole 24*b* to fix the screw 42.

Fixing the facing portion 40*c* to the stay 24 with the screw 42 enables setting the facing portion 40*c* along the first facing surface 24*d*. In other words, the facing portion 40*c* in the present embodiment including a portion fixed by the screw 42 is disposed along the first facing surface 24*d*. The above-described configuration can stabilize a contact position and a posture of the one end 40*a* of the conductor 40 with respect to the inner circumferential surface of the fixing belt 20. In addition, the above-described configuration can ensure a contact pressure of the conductor 40 with respect to the inner circumferential surface of the fixing belt 20. The ensured contact pressure can stabilize a contact state of the conductor 40 with respect to the inner circumferential surface of the fixing belt 20.

The above-described configuration in the present embodiment can surely bring the conductor 40 into contact with the stay 24 to ground the conductor 40 via the stay 24.

In FIG. 2, a position at which the screw 42 fixies the conductor 40 to the stay 24, that is, the position of the fastening hole 24*b* is nearer to the one end 40*a* of the conductor 40 than the center position of the first facing surface 24*d* in the lateral direction. In other words, assuming the fixing belt 20 divided into two in the vertical direction in FIG. 2, which is the sheet conveyance direction, or in the lateral direction in FIG. 2, which is a direction orthogonal to the vertical direction and different from the longitudinal direction, the one end 40*a* and the position at which the screw 42 fixes the conductor 40 to the stay 24 are in the same part of the divided two parts. In particular, assuming the fixing belt 20 in the present embodiment divided into two in any direction, the one end 40*a* and the position at which the screw 42 fixes the conductor 40 to the stay 24 are in the same part of the divided two parts. As described above, in the present embodiment, the screw 42 fixes the facing portion 40*c* to the first facing surface 24*d* at a position near the position at which the conductor 40 comes into contact with the fixing belt 20. The above-described configuration can stabilize the posture of the conductor 40 and a contact state in which the conductor 40 comes into contact with the inner circumferential surface of the fixing belt 20.

However, the above-described conductor 40 in contact with the inner circumferential surface of the fixing belt 20 increases a sliding friction at the contact position at which the conductor 40 comes into contact with the rotating fixing belt 20. As a result, a difference occurs in the sliding friction of the fixing belt 20 in the longitudinal direction when the fixing belt 20 rotates, which causes skew of the fixing belt 20 when the fixing belt 20 rotates. The skew of the fixing belt 20 may cause a longitudinal edge of the fixing belt 20 to slide on another member. As a result, the edge of the fixing belt 20 may abnormally abrade and be damaged.

The following describes how the contact portion of the conductor 40 in the present embodiment is set to reduce the difference in the sliding friction of the fixing belt 20 in the longitudinal direction caused by the contact between the conductor 40 and the inner circumferential surface of the fixing belt 20.

Figure 4:
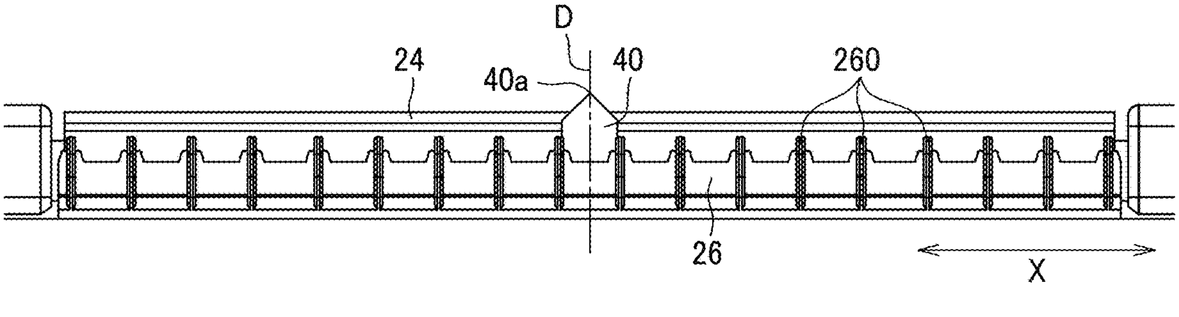
FIG. 4 is a plan view of a conductor between a stay and a guide portion to illustrate how a contact portion of the conductor in the present embodiment is set in a longitudinal direction of the stay.

The one end 40*a* of the conductor 40 illustrated in FIG. 4 is the contact portion in contact with the inner circumferential surface of the fixing belt 20, and hereinafter, the one end 40*a* is also referred to as a contact portion 40*a*. The contact portion 40*a* in the present embodiment is located to come into contact with the center position D of the fixing belt 20 in the longitudinal direction. The above-described configuration can prevent the occurrence of the difference in the sliding friction of the fixing belt 20 in the longitudinal direction caused by the contact between the contact portion 40*a* and the inner circumferential surface of the fixing belt 20, which can prevent the damage to the edge of the fixing belt 20 caused by the skew of the fixing belt 20. The contact portion 40*a* does not need to be exactly positioned to be in contact with the center position D in the longitudinal direction, and the position of the contact portion 40*a* may have some errors.

In the present embodiment, the center position D of the fixing belt 20 in the longitudinal direction corresponds to a center position of the sheet that is not skewed in the width direction and passes through the fixing device 9. In addition, the center position D corresponds to a center position of a heat generation portion on which the resistive heat generators of the heater 22 are arranged in the longitudinal direction and a center position of the elastic layer 21*b* of the pressure roller 21 in the longitudinal direction.

Next, a first variation of the present embodiment is described. In the first variation, the position of the conductor 40 in the longitudinal direction is modified as follows.

Figure 5:
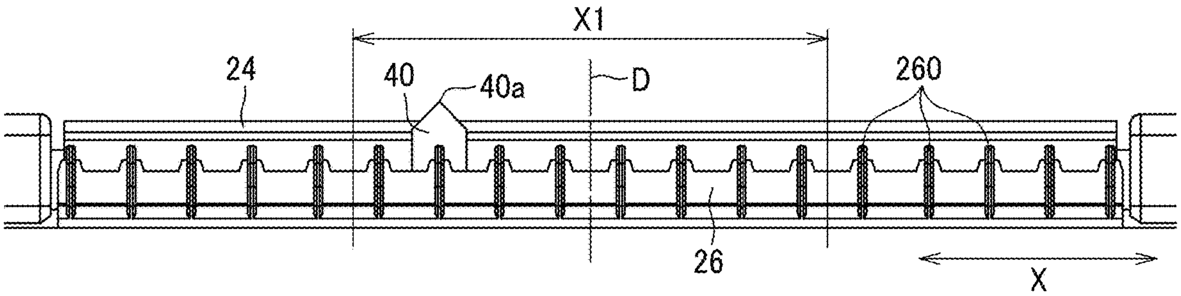
FIG. 5 is a plan view of the conductor between the stay and the guide portion to illustrate how the contact portion of the conductor in a first variation of the present embodiment is set in the longitudinal direction.

As illustrated in FIG. 5, the contact portion 40*a* of the conductor 40 in the first variation is located to come into contact with a center region of the fixing belt in the longitudinal direction. The center region has a width and includes the center position D. The center region is, for example, a minimum sheet passing region X1 of the fixing belt that comes into contact with the sheet having the smallest width of widths of sheets used in the fixing device 9. Disposing the contact portion 40*a* at a position closer to the center position D of the fixing belt 20 in the longitudinal direction can reduce the difference in the sliding friction of the fixing belt 20 in the longitudinal direction. As described above, the configuration according to the first variation can reduce the difference in the sliding friction of the fixing belt 20 in the longitudinal direction and provide flexibility in locating the contact portion 40*a*. In the first variation, the sheet having the smallest width is B7 sheet that is defined by the Japanese Industrial Standards (JIS) and has a width of 91 mm, but the sheet having the smallest width in the present disclosure is not limited to this. The sheet having the smallest width in the present disclosure is the sheet having the smallest width among the sheets described in the instruction manual or catalog of the image forming apparatus.

Figure 6:
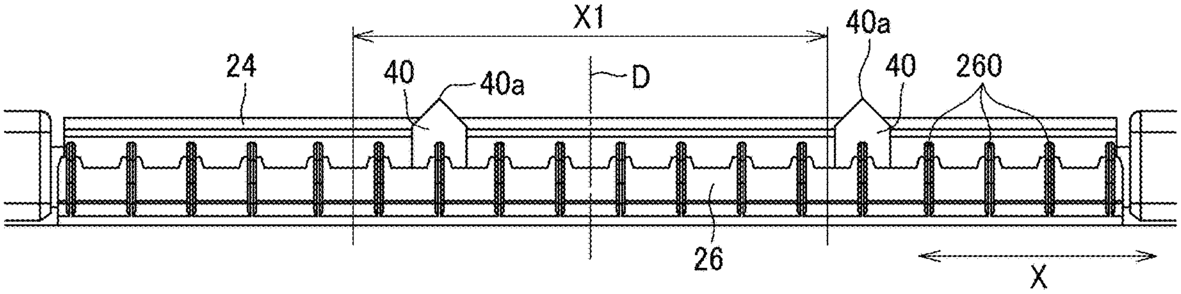
FIG. 6 is a plan view of the conductors between the stay and the guide portion to illustrate how the contact portions of the conductors in a second variation of the present embodiment is set in the longitudinal direction.

A second variation is described below. The fixing device 9 according to the second variation includes multiple conductors 40. In addition to the conductor facing the center region of the fixing belt in the longitudinal direction, as a first conductor, the fixing device 9 may include a second conductor 40 having the contact portion 40*a* in contact with a region outside the center region of the fixing belt. For example, as illustrated in FIG. 6, the fixing device 9 includes the contact portion 40*a* of the first conductor 40 coming into contact with the center region of the fixing belt 20 in the longitudinal direction and the contact portion 40*a* of the second conductor 40 coming into contact with the region outside the center region in the longitudinal direction. As illustrated in FIG. 6, disposing the second conductor 40 at a position closer to the center region of the fixing belt in the longitudinal direction can reduce the difference in the sliding friction of the fixing belt 20 in the longitudinal direction.

Figure 7:
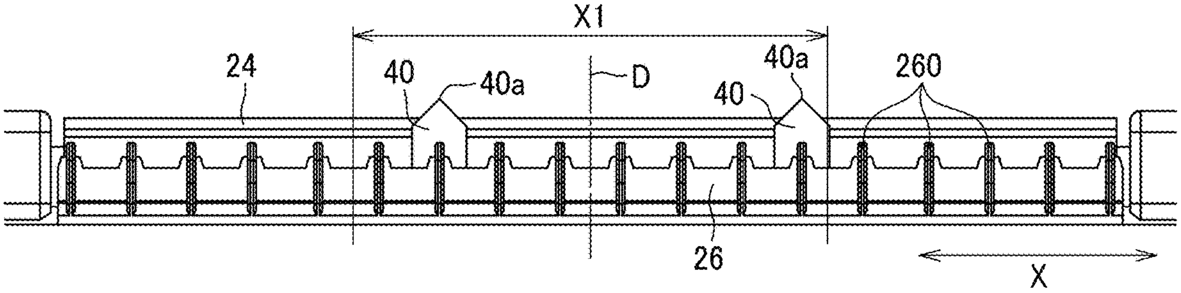
FIG. 7 is a plan view of the conductors between the stay and the guide portion to illustrate how the contact portions of the conductors in a third variation of the present embodiment is set in the longitudinal direction.

With reference to FIG. 7, a third variation is described. The fixing device 9 according to the third variation includes multiple conductors 40 each having the contact portion 40*a* in contact with the minimum sheet passing region X1 that is the center region of the fixing belt in the longitudinal direction. Arranging contact portions 40*a* of the multiple conductors 40 each being in contact with the minimum sheet passing region X1 that is the center region of the fixing belt in the longitudinal direction can reduce the difference in the sliding friction of the fixing belt 20 in the longitudinal direction. The minimum sheet passing region X1 includes positions of the fixing belt that come into contact with both ends of the sheet having the smallest width in the width direction of the sheet, and the positions are boundaries between the minimum sheet passing region X1 and the region outside the minimum sheet passing region.

Figure 8:
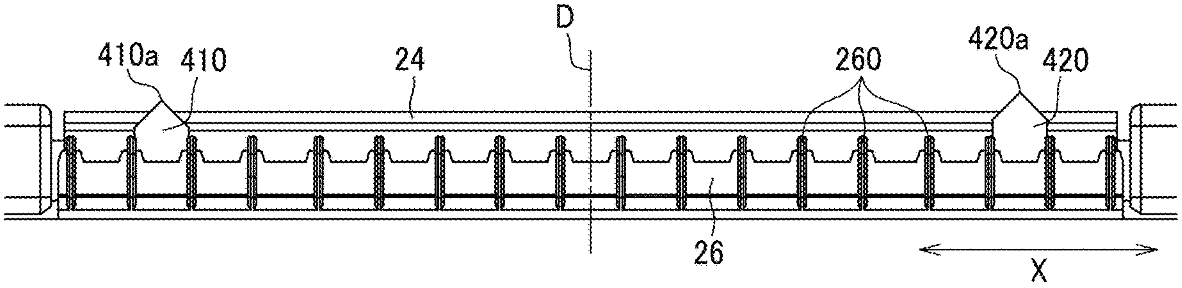
FIG. 8 is a plan view of the conductors between the stay and the guide portion to illustrate how the contact portions of the conductors in a fourth variation of the present embodiment is set in the longitudinal direction.

With reference to FIG. 8, a fourth variation is described. The fixing device 9 according to the fourth variation includes multiple conductors, that is, a first conductor 410 having a first contact portion 410*a* and a second conductor 420 having a second contact portion 420*a*. The fixing belt has the minimum sheet passing region X1 and outer regions outside the minimum sheet passing region X1 in the longitudinal direction. The first contact portion 410*a* is in contact with one of the outer regions. The second contact portion 420*a* is in contact with the other one of the outer regions. In particular, the first contact portion 410*a* and the second contact portion 420*a* in the fourth variation are arranged to be symmetrical with respect to the center position D of the fixing belt 20 in the longitudinal direction. Arranging the first contact portion 410*a* and the second contact portion 420*a* to be symmetrical with respect to the center position D means that a distance from the center position D to a position at which the first contact portion 410*a* is in contact with the one of outer regions is substantially equal to a distance from the center position D to a position at which the second contact portion 420*a* is in contact with the other one of the outer regions in the longitudinal direction. The above-described configuration can prevent the occurrence of the difference in the sliding friction of the fixing belt 20 in the longitudinal direction. Even in a case in which disposing the contact portion 40*a* of the conductor 40 to be in contact with the center region of the fixing belt 20 in the longitudinal direction as illustrated in FIGS. 4 and 5 is difficult, arranging the multiple conductors 40 so that the first and second contact portions 410*a* and 420*a* are symmetrical with respect to the center position D in the longitudinal direction as described in the fourth variation can prevent the occurrence of the difference in the sliding friction of the fixing belt 20 in the longitudinal direction. As a result, the degree of freedom of arrangement of the conductors is improved.

Figure 9:
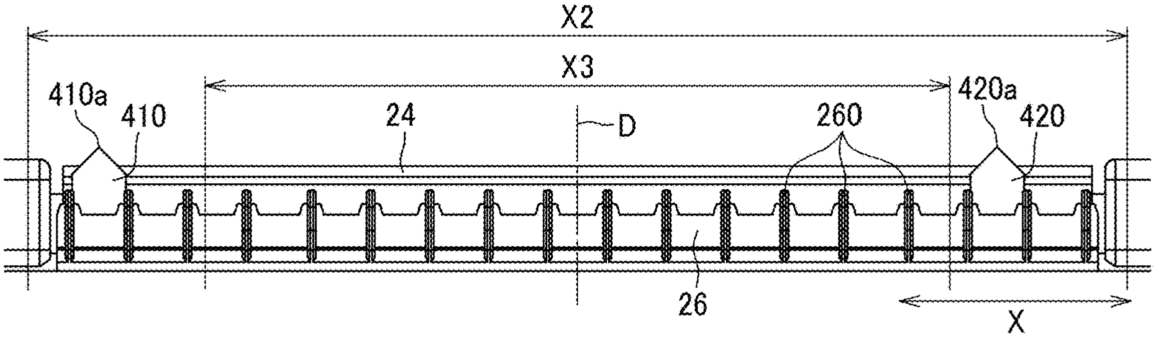
FIG. 9 is a plan view of the conductors between the stay and the guide portion to illustrate how the contact portions of the conductors in a fifth variation of the present embodiment is set in the longitudinal direction.

With reference to FIG. 9, a fifth variation is described. In the fifth variation, the first contact portion 410*a* and the second contact portion 420*a* are not symmetrical with reference to the center position D of the fixing belt in the longitudinal direction. The fixing belt 20 has the center region and outer regions outside the center region in the longitudinal direction. The first contact portion 410*a* is in contact with one of the outer regions. The second contact portion 420*a* is in contact with the other one of the outer regions.

A region X2 illustrated in FIG. 9 is a maximum sheet passing region of the fixing belt. The maximum sheet passing region has a width of the largest size of the sheets, fixed by the fixing device 9, in the longitudinal direction. A region X3 is a first sheet passing region of the fixing belt. The first sheet passing region has a width smaller than the width of the largest size of the sheets fixed by the fixing device 9 in the longitudinal direction. In the fifth variation, the first sheet passing region is the center region of the fixing belt 20 in the longitudinal direction.

In the present embodiment, the largest size of the sheets in the longitudinal direction is A4 size defined by JIS and has a width of 210 mm. The first sheet passing region in the fifth variation has the width of the second largest size of the sheets, fixed by the fixing device, in the longitudinal direction. The second largest size is B5 defined by JIS. The width of B5 size in the longitudinal direction is 182 mm. However, the first sheet passing region is not limited to the above. The first sheet passing region may have a width smaller than the width of the second largest size as long as the first sheet passing region has a width larger than the width of the smallest size of the sheets fixed by the fixing device. The first sheet passing region is an example of a first recording medium passing region.

In the fifth variation, the outer regions are outside the first sheet region X3 and inside the maximum sheet passing region X2 in the longitudinal direction. The first contact portion 410*a* is in contact with the one of the outer regions, and the second contact portion 420*a* is in contact with the other one of the outer regions. The maximum sheet passing region X2 includes boundaries. In other words, the maximum sheet passing region includes positions away from each other by the width of the largest size of the sheets. In the longitudinal direction, a distance from the center position D to the position at which the first contact portion 410*a* is in contact with the one of the outer regions of the fixing belt is different from a distance from the center position D to the position at which the second contact portion 420*a* is in contact with the other one of the outer regions. Disposing the first contact portion 410*a* and the second contact portion 420*a* to be in contact with the outer regions as described above can prevent the occurrence of a large difference in the sliding friction between the outer regions of the fixing belt 20 in the longitudinal direction. In other words, the above-described configuration can reduce the difference in the sliding friction between the outer regions of the fixing belt 20 in the longitudinal direction that is caused by the contact portions in contact with the fixing belt 20. In addition, the above-described configuration improves the degree of freedom of arrangement of the conductors. Note that the above-described sheet passing regions X1 to X3 are defined by the above-described sheets not being out of designed positions.

In particular, arranging the first contact portion 410*a* and the second contact portion 420*a* to be in contact with the outer regions inside the region X2 and outside the region X3 that is the first sheet passing region having the width of the second largest size as in the fifth variation can reduce the difference in the sliding friction between the outer regions of the fixing belt 20 in the longitudinal direction.

Figure 10:
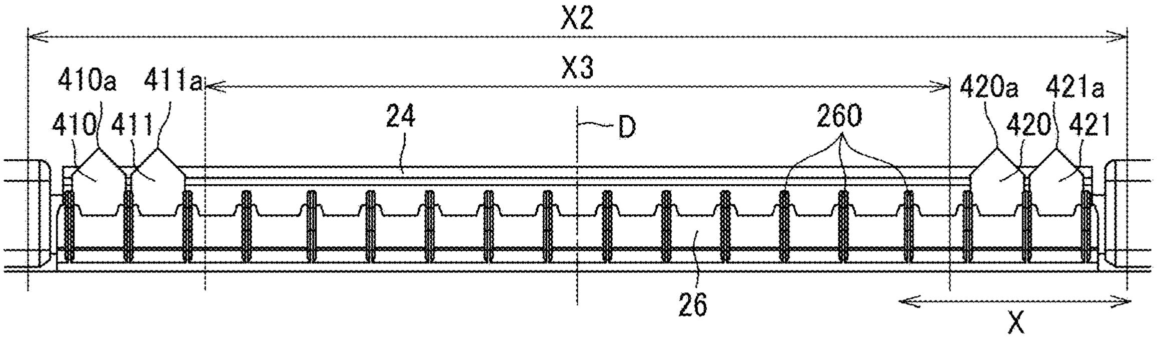
FIG. 10 is a plan view of the conductors between the stay and the guide portion to illustrate how the contact portions of the conductors in a sixth variation of the present embodiment is set in the longitudinal direction.

Next, a sixth variation is described. In the sixth variation, the fixing device 9 includes multiple first conductors having multiple first contact portions and multiple second conductors having multiple second contact portions. The multiple first and second conductors are arranged so that multiple first contact portions are in contact with one of the outer regions and multiple second contact portions are in contact with the other one of the outer regions. For example, as illustrated in FIG. 10, the fixing belt has outer regions outside the first sheet passing region X3 in the longitudinal direction. Two first contact portions 410*a* and 411*a* are in contact with one of the outer regions, and two contact portions 420*a* and 421*a* are in contact with the other one of the outer regions. As described above, arranging the multiple first conductors 410 and 411 and the multiple second conductors 420 and 421 so that the first multiple contact portions 410*a* and 411*a* are in contact with the one of outer regions outside the first sheet passing region X3 and inside the maximum sheet passing region X2 and the second multiple contact portions 420*a* and 421*a* are in contact with the other one of outer regions can reduce the difference in the sliding friction between the outer regions of the fixing belt 20 in the longitudinal direction. In particular, the number of the first contact portions 410*a* and 411*a* in contact with the one of outer regions outside the first sheet passing region X3 is the same as the number of the second contact portions 420*a* and 421*a* in contact with the other one of outer regions in the sixth variation. This configuration can further reduce the difference in the sliding friction between the outer regions of the fixing belt 20 in the longitudinal direction.

Figure 11:
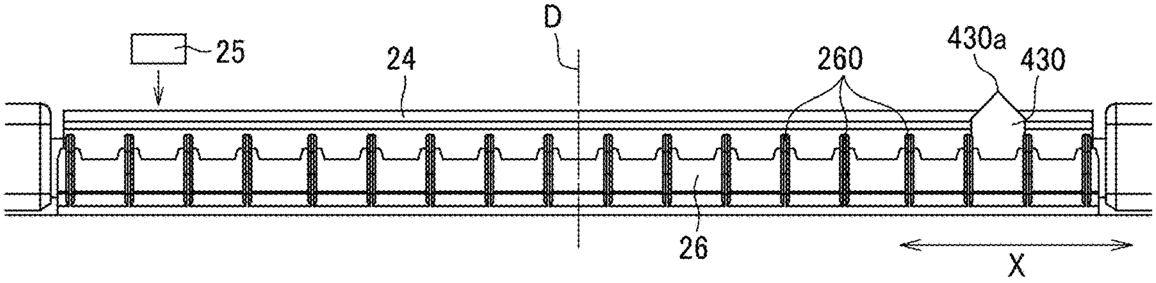
FIG. 11 is a view to illustrate how the contact portion of the conductor and a contact portion of a thermistor in a seventh variation are set in the longitudinal direction.
Figure 12:
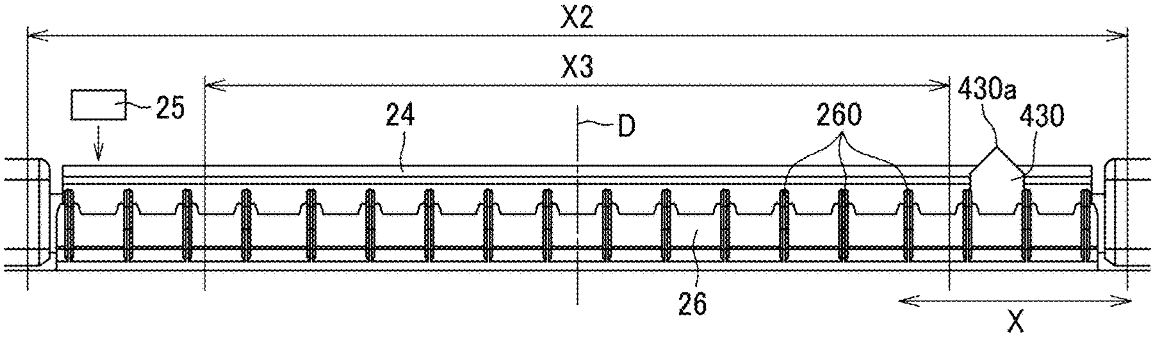
FIG. 12 is a view to illustrate how the contact portion of the conductor and the contact portion of the thermistor in an eighth variation are set in the longitudinal direction.
Figure 13:
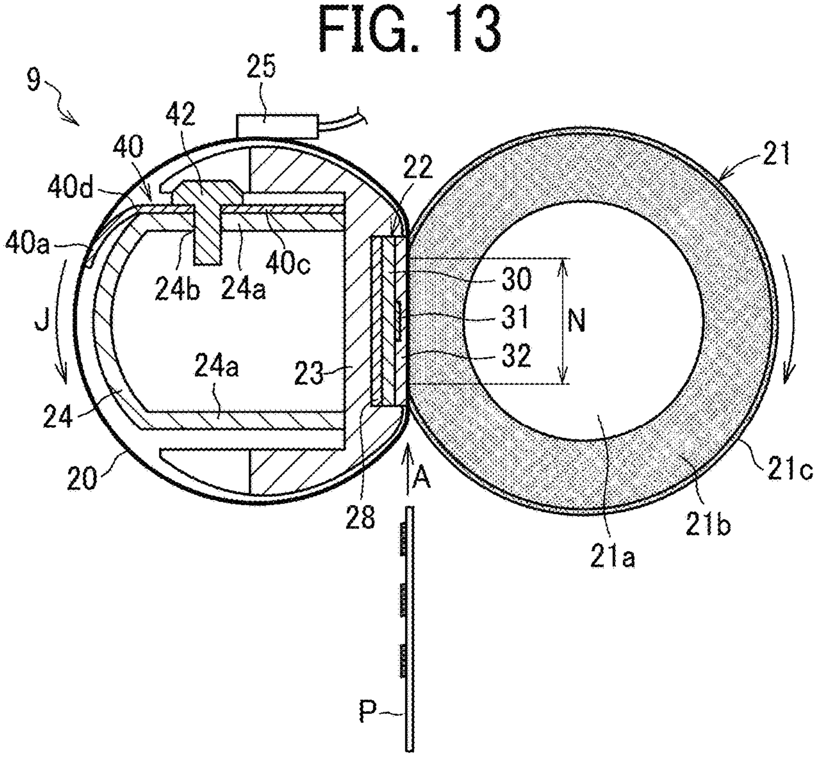
FIG. 13 is a cross-sectional side view of the fixing device of FIG. 11 or 12.

Further, only the contact portion 40*a* of the conductor 40 is not always and necessarily disposed to balance the sliding friction between the outer regions of the fixing belt 20 in the longitudinal direction. For example, as illustrated in FIG. 11, the fixing device according to a seventh variation includes a conductor 430 having a first contact portion 430*a* in contact with one of outer regions outside the center region of the fixing belt in the longitudinal direction and the thermistor 25 as the temperature sensor having a second contact portion in contact with the other one of the outer regions in the longitudinal direction. The above-described configuration enables preventing the occurrence of the difference in the sliding friction between the outer regions of the fixing belt 20 in the longitudinal direction. In FIG. 11, the first contact portion 430*a* and the contact portion of the thermistor 25 are disposed at lateral symmetrical positions as illustrated in FIG. 8. However, each of the contact portion 430*a* and the contact portion of the thermistor 25 may be in contact with the fixing belt at the position inside the region X2 and outside the region X3 as illustrated in FIG. 12 of the fixing device according to an eighth variation. The above-described configuration can reduce the difference in the sliding friction between the outer regions of the fixing belt 20 in the longitudinal direction. Similarly to the sixth variation illustrated in FIG. 10, the fixing device may include multiple first conductors having multiple first contact portions in contact with the one of the outer regions outside the region X3 and the second conductor having a third contact portion in contact with the other one of the outer regions, and a number of the multiple first contact portions is preferably equal to the sum of a number of the second contact portion and a number of the contact portion of the thermistor 25. The position of the first contact portion 430*a* and the position of the contact portion of the thermistor 25 in each of FIGS. 11 and 12 may be reversed. The thermistor 25 may be disposed to be in contact with the outer surface of the fixing belt 20 as illustrated in FIG. 13 or may be disposed to be in contact with the inner surface of the fixing belt 20.

Next, a more detailed configuration of an example of the thermistor 25 is described with reference to FIG. 14.

Figure 14:
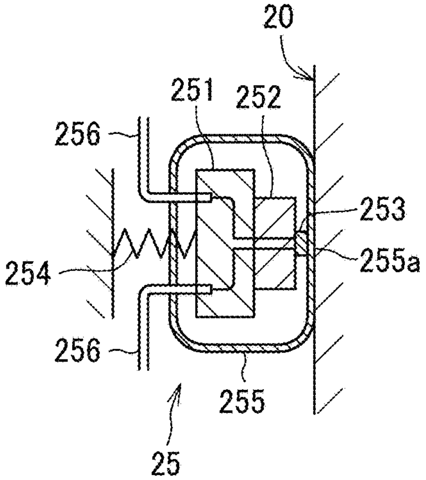
FIG. 14 is a cross-sectional view of the thermistor.

As illustrated in FIG. 14, the thermistor 25 includes a holder 251, an elastic member 252, a temperature sensor element 253 as a temperature sensor unit, a spring 254 as a biasing member, and an insulating sheet 255.

The holder 251 is made of resin such as LCP. The temperature sensor element 253 is disposed on a surface of the holder 251 that is the surface facing the fixing belt 20 via the elastic member 252. The elastic member 252 is made of a material having thermal conductivity and rigidity that are lower than those of the holder 251 and has elasticity and heat insulating properties. The insulating sheet 255 is made of an insulating material such as polyimide (PI) and is disposed so as to cover the holder 251, the elastic member 252, and the temperature sensor element 253. The spring 254 biases the holder 251 toward the fixing belt 20 so that the temperature sensor element 253 is in contact with the fixing belt 20 via the insulating sheet 255. Two wires 256 connected to the temperature sensor element 253 extend from the holder 251, and each of the wires 256 is covered with an insulating film. Considering heat resistance, a desirable thickness of the insulating film covering the wire 256 is, for example, 0.4 mm or more. If the film thickness is 0.4 mm or less, a plurality of films may be stacked.

A portion 255*a* of the insulating sheet 255 with which the temperature sensor element 253 is in contact forms the contact portion of the thermistor 25 that comes in contact with the fixing belt 20.

By the way, the lubricant is applied between the heater 22 and the inner circumferential surface of the fixing belt 20, and the rotation of the fixing belt 20 carries the lubricant on the inner circumferential surface of the fixing belt 20 downstream in the rotation direction.

The conductor 40 in contact with the inner circumferential surface of the fixing belt 20 scrapes off the lubricant applied to the inner circumferential surface of the fixing belt 20. As the amount of the lubricant scraped off by the conductor 40 increases, the frictional resistance between the inner circumferential surface of the fixing belt 20 and the heater 22 increases, which causes abnormal wear of the fixing belt 20.

The following describes a configuration of the contact portion 40*a* to reduce the amount of lubricant scraped off by the conductor 40.

Figure 15:
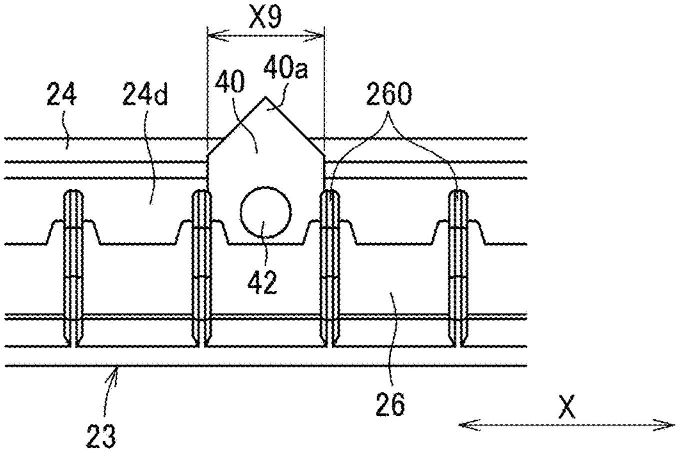
FIG. 15 is a schematic view of the conductor to illustrate a limiting shape.

FIG. 15 is a schematic view of the conductor 40 viewed from above in FIG. 2.

The contact portion 40*a* has a tapered shape having a narrower width toward the edge. In other words, as a portion of the conductor 40 is nearer to the edge, a width of the portion of the conductor 40 becomes smaller. In particular, the contact portion 40*a* of the present embodiment includes a protruding end having a pointed tip shape. The contact portion 40*a* including the protruding end as described above can reduce an area in which the contact portion 40*a* is in contact with the fixing belt 20 to be as small as possible. As a result, the above-described configuration can reduce the amount of the lubricant scraped off by the contact portion 40*a* as much as possible and prevent the abnormal wear of the fixing belt 20. In addition, the contact portion 40*a* including the protruding end can increase a contact pressure of the conductor 40 in contact with the fixing belt 20 and stabilize the contact state of the conductor 40 with respect to the fixing belt 20.

The protruding end formed on the contact portion 40*a* is an example of a limiting shape to limit the contact area in which the conductor 40 is in contact with the inner circumferential surface of the fixing belt 20. To limit the contact area, the contact portion 40*a* is designed as follows. For example, a contact width in which the contact portion 40*a* is in contact with the fixing belt 20 is designed to be smaller than a width X9 of a base end in FIG. 15 that is the other end of the conductor 40 opposite to the contact portion 40*a*, or the 30 contact portion 40*a* is divided into multiple portions to reduce a contact area in each of the divided plurality of portions.

Designing the contact width of the contact portion 40*a* to be smaller than the width of the base end, in other words, providing the contact portion 40*a* inside a region having the width X9 enables reducing the size of the conductor 40. In addition, since the above-described configuration enables setting a portion at which the conductor 40 actually contacts the fixing belt 20 to be closer to the fixing belt 20 than the base end, the above-described configuration can stabilize the contact state of the conductor 40 with respect to the fixing belt 20.

The limiting shape of the contact portion 40*a* of the conductor 40 is not limited the above.

Figure 16A:
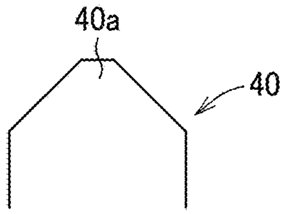
FIGS. 16A and 16B are schematic views of contact portions having limiting shapes different from the limiting shape of FIG. 15.
Figure 16B:
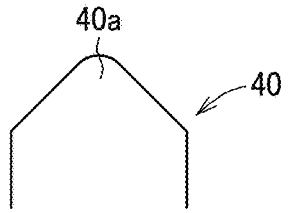
Figure 17A:
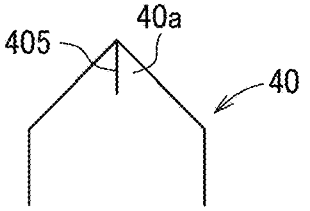
FIGS. 17A to 17C are schematic views of slits set in the contact portions of FIG. 15, FIG. 16A, and FIG. 16B, respectively.
Figure 17B:
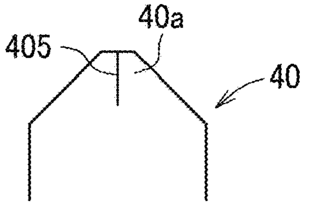
Figure 17C:
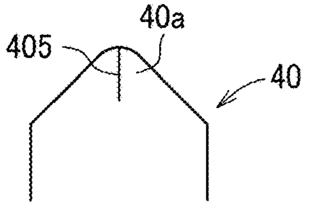

For example, as illustrated in FIG. 16A, the contact portion 40*a* may have a tip having a minute flat portion. As illustrated in FIG. 16B, the contact portion 40*a* may have the tip having a curve. The contact portions 40*a* illustrated in FIGS. 16A and 16B has the same feature as the contact portion 40*a* illustrated in FIG. 15, that is, the contact portion 40*a* has a shape tapered toward the tip of the contact portion 40*a*. As illustrated in FIGS. 17A, 17B, and 17C, the contact portion 40*a* may have a slit 405. The slit 405 is at a central position of the conductor 40 in the width direction of the conductor 40. The slit 405 in the contact portion 40*a* divides the area in which the contact portion 40*a* is in contact with the inner circumferential surface of the fixing belt 20 and reduces the amount of the lubricant scraped off by the contact portion 40*a*.

Figure 18:
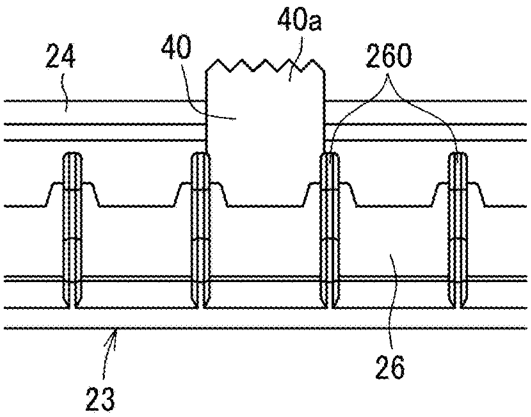
FIG. 18 is a view of the conductor having a different shape from the conductors illustrated in FIGS. 15, 16A, 16B, and 17A to 17C.

As illustrated in FIG. 18, the contact portion 40*a* in the present embodiment may have, as the limiting shape, a concavo-convex shape including multiple convex portions and concave portions recessed from the convex portions toward the other end 40*b* of the conductor 40 and extending in the width direction of the conductor 40. The above-described concavo-convex shape of the contact portion 40*a* divides and reduces the contact area in which the contact portion 40*a* is in contact with the inner circumferential surface of the fixing belt 20. As a result, the above-described configuration reduces the amount of the lubricant scraped off by the contact portion 40*a*. The conductor 40 including the contact portion 40*a* in contact with the inner circumferential surface of the fixing belt 20 at multiple portions can more stably remove the electric charge from the fixing belt 20 than the conductor 40 including the contact portion 40*a* in contact with the inner circumferential surface of the fixing belt 20 at one portion. For example, the lubricant is likely to be interposed between the contact portion 40*a* and the fixing belt 20 and prevent the contact portion 40*a* from coming into contact with the inner circumferential surface of the fixing belt 20 in the contact portion 40*a* as illustrated in FIG. 15 in which the contact portion 40*a* comes into contact with the inner circumferential surface of the fixing belt 20 at the one portion. The conductor 40 including the contact portion 40*a* coming into contact with the inner circumferential surface of the fixing belt 20 at the plurality of portions can stably remove the electric charge from the fixing belt 20.

Figure 19:
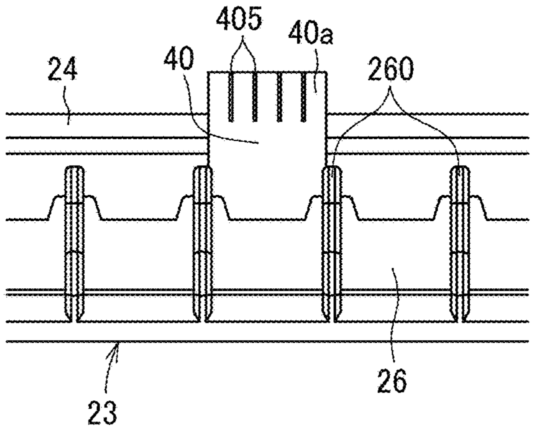
FIG. 19 is a view of the conductor having a different shape from the conductors illustrated in FIGS. 15, 16A, 16B, 17A to 17C, and 18.

As illustrated in FIG. 19, the contact portion 40*a* may have multiple slits 405 included in the limiting shape. As compared with the contact portion 40*a* having a rectangular shape and not having the limiting shape, the above-described configuration divides the contact area in which the contact portion 40*a* is in contact with the inner circumferential surface of the fixing belt 20 into multiple portions and reduces the amount of the lubricant scraped off by the contact portion 40*a*. In addition, the contact portion 40*a* can come into contact with the inner circumferential surface of the fixing belt 20 at the plurality of portions, and the conductor 40 can stably remove the electric charge from the fixing belt 20.

Figure 20:
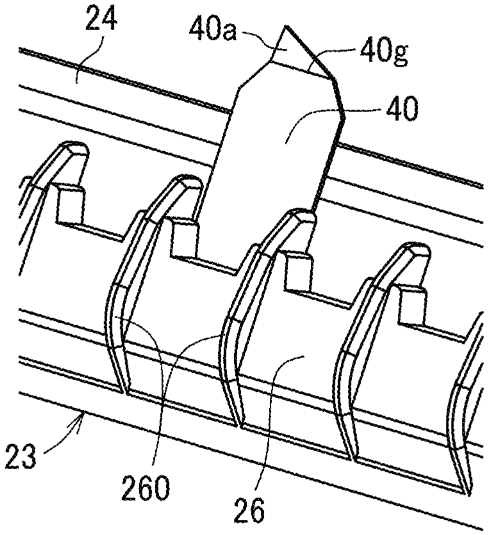
FIG. 20 is a perspective view of the conductor having a bent portion and the periphery of the conductor.

As illustrated in FIG. 20, the conductor 40 may have a bent portion 40*g* adjacent to the contact portion 40*a*. The bent portion 40*g* is plastically deformed and bent in a direction opposite to the rotation direction of the fixing belt 20. The bent portion 40*g* is bent, for example, before the conductor 40 is assembled to the fixing device 9 or before the fixing belt 20 is assembled to the fixing device 9. The bent portion 40*g* enables the contact portion 40*a* of the conductor 40 to stably come into contact with the inner circumferential surface of the fixing belt 20.

Figure 21:
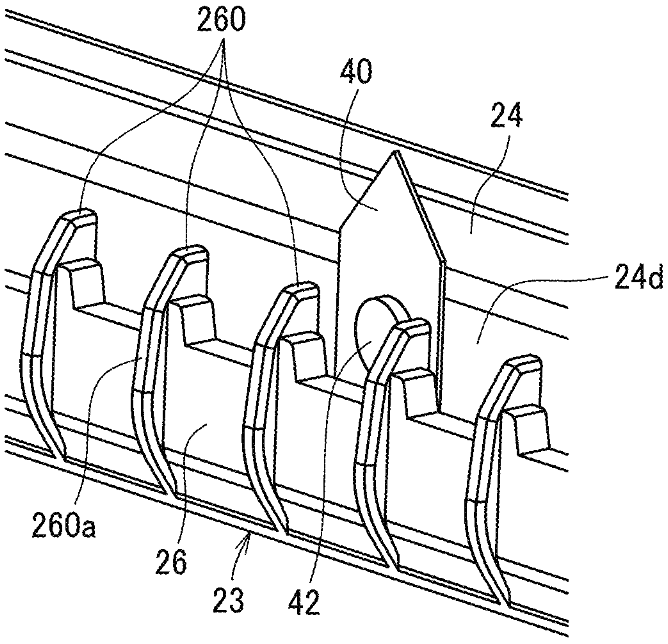
FIG. 21 is a perspective view of the conductor and the parts around the conductor, illustrating a location of the conductor in the longitudinal direction.

As illustrated in FIGS. 15 and 21, the screw 42 in the present embodiment is disposed between the guide ribs 260 in the longitudinal direction that is the lateral direction in FIG. 15. That is, the screw 42 is disposed at a position between the guide ribs 260, and the position is different from the positions of the guide ribs 260 in the longitudinal direction. The above-described configuration can prevent the screw 42 from interfering the guide rib 260. If the position of the screw 42 in the longitudinal direction is the same as the position of the guide rib 260 in the longitudinal direction, the guide rib 260 needs to be arranged so that the screw head of the screw 42 does not interfere with the guide rib 260, which increases the diameter of the fixing belt 20 by that amount. In contrast, according to the above-described arrangement of the present embodiment, the screw 42 does not interfere with the guide rib 260 despite the arrangement in which the guide rib 260 overlaps the screw 42 in a cross section orthogonal to the longitudinal direction as illustrated in FIG. 2. The above-described configuration enables a compact arrangement of the screw 42 and the guide ribs 260 inside the loop of the fixing belt 20, which can reduce the diameter of the fixing belt 20. As a result, the fixing device can be downsized.

As illustrated in FIG. 2, the screw 42 in the present embodiment is at a position farther from the inner circumferential surface of the fixing belt 20 than the guide surface 260*a* of the guide rib 260. In other words, the position of the screw 42 in the radial direction of the fixing belt 20 is farther from the inner circumferential surface of the fixing belt 20 than the guide surface 260*a*. Specifically, as illustrated in an enlarged partial view of FIG. 2, a distance R1 from the center of the screw head of the screw 42 to the inner surface of the fixing belt 20 in an upward direction in FIG. 2 that is an insertion direction to insert the screw 42 into the stay 24 is larger than a distance R2 from the position of the guide surface 260*a* just above the screw 42, that is, the position of the guide surface 260*a* having the same coordinate value in the lateral direction of FIG. 2 as the position of the center of the screw head to the inner surface of the fixing belt 20 in the insertion direction, that is, R1>R2. In other words, the shortest distance from the screw 42 to the inner surface of the fixing belt 20 is larger than the shortest distance from the guide surface 260*a* to the inner surface of the fixing belt 20 in the cross section of FIG. 2 in a plane orthogonal to the longitudinal direction of the fixing belt 20. As a result, the screw 42 is not in contact with the inner surface of the fixing belt 20, which prevents the damage of the fixing belt 20 caused by the contact between the screw 42 and the inner surface of the fixing belt 20.

Figure 22:
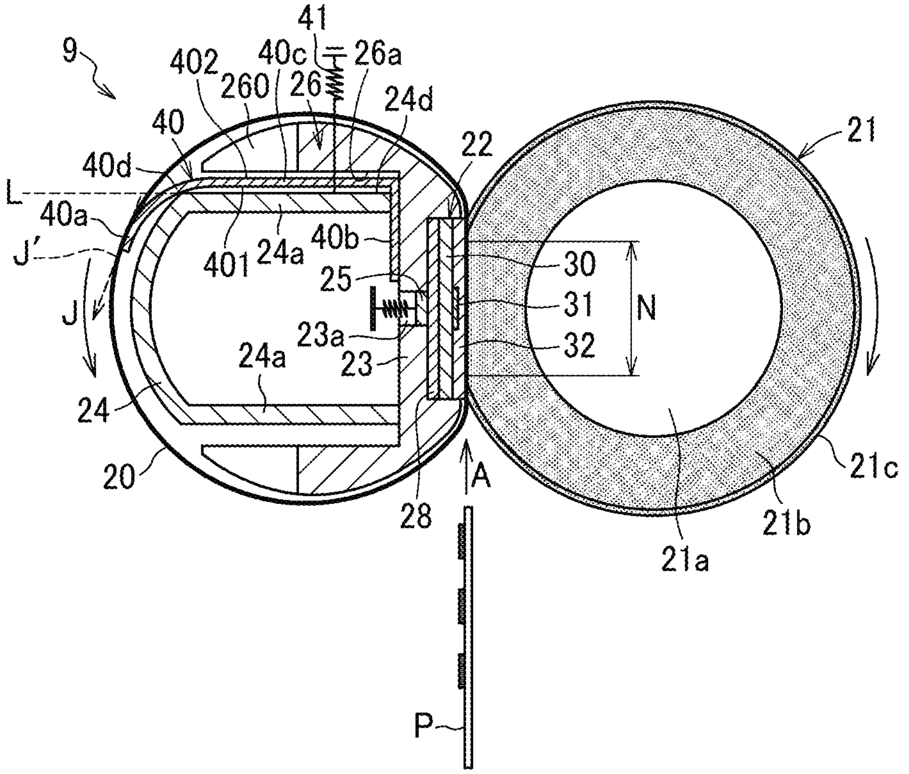
FIG. 22 is a cross-sectional side view of a fixing device including the conductor set in the fixing device without using the fastener.

The following describes an embodiment including the conductor set on the stay without using the fastener with reference to FIG. 22.

As illustrated in FIG. 22, the conductor 40 has the facing portion 40*c* facing the first facing surface 24*d* of the stay 24 and a second facing surface 26*a* of the guide portion 26. The first facing surface 24*d* and the second facing surface 26*a* regulate the inclination of the conductor 40. The position of the first facing surface 24*d* is designed so that the first facing surface 24*d* comes into contact with the conductor 40 inclined upward in FIG. 22 to regulate the inclination of the conductor 40. The position of the second facing surface 26*a* is designed so that the second facing surface 26*a* comes into contact with the conductor 40 inclined downward in FIG. 22 to regulate the inclination of the conductor 40. In particular, the facing portion 40*c* in the present embodiment is disposed adjacent to the first facing surface 24*d* and the second facing surface 26*a*. The first facing surface 24*d* faces a first surface 401 of the conductor 40. The first surface 401 is a surface opposite to a second surface 402 that is a surface of the conductor 40, and the second surface 402 is in contact with the fixing belt 20. The second facing surface 26*a* faces the second surface 402 of the conductor 40, and the second surface 402 is in contact with the fixing belt 20. In other words, the first facing surface 24*d* faces a downstream side of the facing portion 40*c* in a direction J' of FIG. 22, and the second facing surface 26*a* faces an upstream side of the facing portion 40*c* in the direction J' where the direction J' is indicated by arrow J' in FIG. 22 that is a belt rotation direction at the position of the one end 40*a* where the conductor 40 is in contact with the inner surface of the fixing belt 20. In the following description, a side of the first surface 401 of the conductor 40 in contact with the fixing belt 20 is also referred to as a "contact side of the conductor 40", and a side of the second surface 402 of the conductor 40 opposite to the surface in contact with the fixing belt 20 is also referred to as a "side opposite to the contact side of the conductor 40".

The facing portion 40*c* faces the first facing surface 24*d* and the second facing surface 26*a* and extends along the first facing surface 24*d* and the second facing surface 26*a*. However, the facing portion 40*c* does not necessarily have to be disposed along both the first facing surface 24*d* and the second facing surface 26*a*. The first facing surface 24*d* and the second facing surface 26*a* in the present embodiment are planar portions extending in a direction substantially parallel to the pressing direction of the pressure roller 21.

The guide portion 26 is a second facing member in the present embodiment. The second facing member may be formed integrally with the heater holder 23 as in the present embodiment or may be an independent member. The second facing member is not limited to a member having the guide surface 260*a* that guides the inner surface of the fixing belt 20 as in the present embodiment.

The conductor 40 has one end bent portion 40*d* adjacent to the facing portion 40*c*. The one end bent portion 40*d* is bent so that the first surface 401 is on the inside. The first surface 401 is opposite to the second surface 402 in contact with the conductor 40. The one end bent portion 40*d* is a portion bent by elastic deformation. In the conductor 40 of the present embodiment, a portion from the one end bent portion 40*d* to the one end 40*a* is bent toward downstream in the rotation direction of the fixing belt 20.

The conductor 40 has the other end 40*b* that is bent from the facing portion 40*c*. The facing portion 40*c* of the conductor 40 is interposed between the one end 40*a* and the other end 40*b*. A portion including the other end 40*b* is sandwiched by the right-angle portion 24*a* of the stay 24 and the heater holder 23 in the lateral direction of FIG. 22. As a result, the pressing force of the pressure roller 21 surely supports the conductor 40 interposed between the stay 24 and the heater holder 23. The above-described configuration can surely position the other end 40*b* of the conductor 40 with respect to the stay 24. The above-described configuration can surely bring the conductor 40 into contact with the stay 24 to ground the conductor 40 via the stay 24. The stay 24 and the heater holder 23 can hold the conductor 40. Without using the fastener such as the screw, the above-described configuration can obtain the above-described effects and downsize the fixing device. Reducing the member such as the fastener reduces the thermal capacity of the fixing device to save energy.

If the first facing surface 24*d* and the second facing surface 26*a* are not disposed to face the facing portion 40*c* of the conductor 40, variation occurs in an extending direction of the one end 40*a* that is the free end due to variation in the conductor 40. For example, when the conductor 40 is assembled, the conductor 40 may perpendicularly extend as illustrated in FIG. 22, may be inclined toward the stay 24 as indicated by a dashed line in FIG. 23A, or may be inclined toward the guide portion 26 as indicated by a dashed line in FIG. 23B. The above-described variation in the posture of the conductor 40 and the contact position at which the conductor 40 is in contact with the inner surface of the fixing belt 20 causes an unstable contact state of the conductor 40 with respect to the fixing belt 20.

Figure 23A:
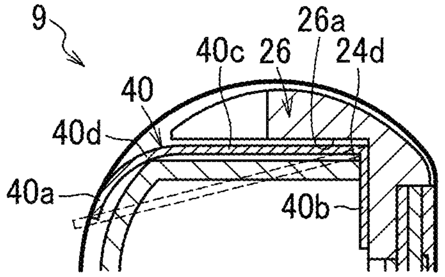
FIGS. 23A and 23B are partial cross-sectional side views of the fixing device of FIG. 22 to illustrate a configuration to prevent the conductor from inclining.

In the present embodiment, the first facing surface 24*d* facing the conductor 40 as described above prevents the conductor 40 from being inclined as illustrated in FIG. 23A and leads the facing portion 40*c* of the conductor 40 along the first facing surface 24*d*. The above-described configuration reduces the variation in the posture of the conductor 40 in contact with the fixing belt 20 and the contact position at which the conductor 40 is in contact with the fixing belt 20, which enables stabilizing the contact state of the conductor 40 in contact with the inner circumferential surface of the fixing belt 20.

Disposing the first facing surface 24*d* and maintaining the facing portion 40*c* of the conductor 40 in a shape rising along the first facing surface 24*d* enables securing the contact pressure between the conductor 40 and the inner surface of the fixing belt 20 and stabilizing the contact state of the conductor 40 with the inner surface of the fixing belt 20. The conductor 40 is in contact with the inner circumferential surface of the fixing belt 20 at the one end 40*a* and bent toward the direction indicated by the arrow J that is the rotation direction of the fixing belt 20. In particular, when the fixing belt 20 rotates, the one end 40*a* of the conductor 40 receives a rotational force in the direction indicated by arrow J from the fixing belt 20. The rotational force bends the conductor 40 to form the one end bent portion 40*d* bent in the rotation direction of the fixing belt 20 between the one end 40*a* and the center portion of the facing portion 40*c* maintained in the rising shape. The force generated by the one end bent portion 40*d*, that is, the force by which the one end bent portion 40*d* elastically returns ensures the contact force of the one end 40*a* of the conductor 40 that presses the inner surface of the fixing belt 20. As a result, the above-described configuration can stabilize the contact state of the conductor 40 with respect to the inner circumferential surface of the fixing belt 20.

The above-described stable contact state of the conductor 40 with the inner surface of the fixing belt 20 enables the alternating current to stably pass from the fixing nip N to the ground via the fixing belt 20. Thus, the above-described configuration can prevent the occurrence of the banding image. The above-described configuration can stably release the electric charge accumulated on the fixing belt 20 to the ground via the stay 24. As a result, the above-described configuration can prevent the image defect due to the electrostatic offset. Without using the fastener such as the screw to fix the conductor 40 on a member in the fixing device, the above-described configuration can obtain the above-described effects. Accordingly, since the above-described configuration does not require a space for setting the fastener such as the screw, the fixing device can be miniaturized. Reducing the member such as the fastener reduces the thermal capacity of the fixing device to save energy.

In the present embodiment, the one end 40*a* as the contact portion of the conductor 40 comes into contact with the fixing belt 20 at a position beyond the first facing surface 24*d* of the stay 24. In other words, the one end 40*a* of the conductor 40 is disposed on the side opposite to the facing portion 40*c* across the first facing surface 24*d*. The meaning of the above-described sentence is as follows. When an extended surface L (see FIG. 22) extended from the first facing surface 24*d* is assumed as a boundary, the one end 40*a* is disposed so that the one end 40*a* is in one side from the boundary and the facing portion 40*c* is in the other side from the boundary. The "first facing surface" in the description "on the side opposite to the facing portion 40*c* across the first facing surface" is a surface facing a portion of the conductor 40 opposite to the one end 40*a* across the one end bent portion 40*d* and particularly in the present embodiment, is a surface facing the facing portion 40*c* including a portion adjacent to the one end bent portion 40*d*. The above-described configuration ensures a contact pressure of the conductor 40 pressing the inner surface of the fixing belt 20, which enables stabilizing the contact state of the conductor 40 in contact with the inner circumferential surface of the fixing belt 20.

In the present embodiment, a contact portion of the conductor 40 is in contact with the stay 24, and a portion closer to the one end 40*a* than the contact portion is bent toward the downstream side in the rotation direction of the fixing belt 20. The conductor 40 is in contact with the stay 24 disposed downstream from the conductor 40 in the rotation direction J of the fixing belt 20, and the stay 24 supports the conductor 40. A portion of the conductor 40 closer to the one end 40*a* than the contact portion or a portion of the conductor 40 closer to the one end 40*a* including the contact portion is bent toward the downstream in the rotation direction J. Bending the portion of the conductor 40 in contact with the inner surface of the fixing belt 20 as described above ensures the contact pressure of the conductor 40 with respect to the inner surface of the fixing belt 20 as described above, which can stabilize the contact state.

Figure 23B:
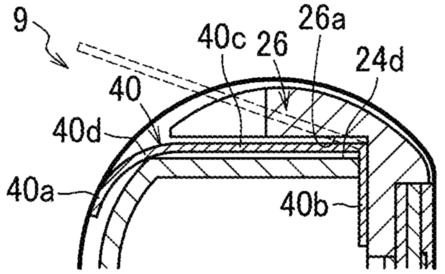

In addition, the second facing surface 26*a* in the present embodiment faces the surface of the facing portion 40*c* of the conductor 40 that is the surface in contact with the fixing belt 20 to prevent the conductor 40 from inclining as illustrated in FIG. 23B. As a result, the facing portion 40*c* of the conductor 40 is disposed along the second facing surface 26*a*. The above-described configuration reduces the variation in the posture of the conductor 40 in contact with the fixing belt 20 and the contact position at which the conductor 40 is in contact with the fixing belt 20, which enables stabilizing the contact state of the conductor 40 in contact with the inner circumferential surface of the fixing belt 20. As described above, disposing members facing both sides of the conductor 40 in the rotation direction of the fixing belt 20 enables disposing the facing portion 40*c* of the conductor 40 between the first facing surface 24*d* and the second facing surface 26*a*. The above-described configuration can stabilize the posture of the conductor 40 and the contact state of the conductor 40 with respect to the inner circumferential surface of the fixing belt 20. Note that the above-described inclination of the conductor 40 is the inclination in the vertical direction in FIG. 22, in other words, the inclination in a thickness direction of the conductor 40 or the inclination in a direction in which the conductor 40 comes into contact with the first facing surface 24*d* or the second facing surface 26*a*.

Note that "a part of the conductor is disposed along the first facing surface or the second facing surface" in the present embodiment is not limited to the part of the conductor perfectly in parallel with the first facing surface or the second facing surface and may include the part of the conductor slightly inclined. That is, it is sufficient that the first facing surface or the second facing surface can regulate the shape of the facing portion of the conductor to stabilize the contact position and the contact posture of the conductor with respect to the rotator. In addition, "a part of the conductor is disposed along the first facing surface or the second facing surface" means that the conductor is disposed close to the first facing surface or the second facing surface and does not include a case where the conductor is disposed at a position separated from the first facing surface or the second facing surface so as not to come into contact with the first facing surface or the second facing surface even when the conductor is inclined.

In the above-described embodiment, the component variation of the conductor 40 during assembling causes inclination of the part including the one end 40*a* as illustrated in FIG. 23A or FIG. 23B, but a factor that causes the variation in the posture of the conductor 40 is not limited to this. For example, when a force acts on the one end 40*a* of the conductor 40 in the direction illustrated in FIG. 23A or FIG. 23B after the parts of the fixing device 9 are assembled, the first facing surface 24*d* or the second facing surface 26*a* can prevent the conductor 40 from inclining to stabilize the contact state of the conductor 40 in contact with the inner circumferential surface of the fixing belt 20.

The first facing surface 24*d* and the second facing surface 26*a* in the present embodiment are parallel surfaces extending in a direction substantially parallel to the pressing direction of the pressure roller 21. The above-described configuration can maintain the facing portion 40*c* of the conductor 40 to be a shape that perpendicularly rises between the first facing surface 24*d* and the second facing surface 26*a* and stabilize the contact state of the conductor 40 with the inner surface of the fixing belt 20. The direction of the extending surface is not necessarily in parallel to the pressing direction. The above-described parallel surfaces do not need to be strictly parallel to each other and may be disposed with a slight error. Even in these cases, the above-described configuration can maintain the facing portion 40*c* to be a shape that rises in a substantially perpendicular direction. In addition, at least one of the first facing surface 24*d* and the second facing surface 26*a* may be configured by a flat surface portion extending in one direction. The above-described configuration can maintain the facing portion 40*c* along the flat surface portion to be the shape that rises. The flat surface portion extending in the one direction does not need to be a perfect flat surface extending in the one direction and may be slightly inclined or uneven.

The conductor 40 in the present embodiment is disposed between the stay 24 and the guide rib 260 downstream from the heater holder 23 but may be disposed between the stay 24 and the guide rib 260 upstream from the heater holder 23. In this case, the facing portion 40*c* of the conductor 40 faces the first facing surface of the upstream guide rib 260 serving as the first facing member and the second facing surface of the stay 24 serving as the second facing member.

Preferably, the fixing device 9 including the conductor 40 includes the fixing belt 20 including no elastic layer, as in the present embodiment. The fixing belt 20 including no elastic layer is less flexible than the fixing belt including the elastic layer and more difficult to form a stable contact state between the fixing belt 20 and the conductor 40 than the fixing belt including the elastic layer. Using the conductor 40 in the above-described fixing device 9 enables the conductor 40 to be stably in contact with the fixing belt 20.

If the fixing belt 20 includes a non-conductive elastic layer, the elastic layer also serves as a capacitor like the insulation layer of the heater 22, and the above-described banding image is likely to occur. Accordingly, the fixing belt 20 not including the non-conductive elastic layer can prevent the occurrence of the banding image.

Referring to FIGS. 24 to 27, another embodiment is described. In the embodiment, another assembling method to assemble the conductor 40 to the stay 24 is described.

Figure 24:
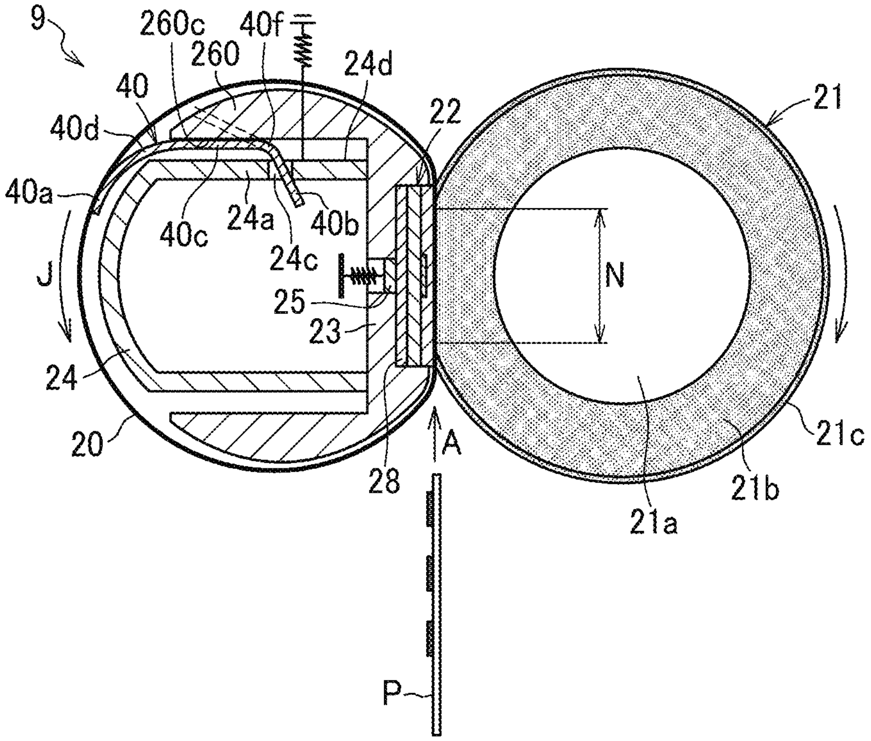
FIG. 24 is a cross-sectional side view of a fixing device that is different from the fixing devices illustrated in FIGS. 2 and 22.

As illustrated in FIG. 24, the stay 24 according to the present embodiment has a locking hole 24*c* as an opening. The locking hole 24*c* is a hole extending in a direction intersecting a direction in which the first facing surface 24*d* of the stay 24 extends. In the present embodiment, the locking hole 24*c* extends in a vertical direction perpendicular to a lateral direction in FIG. 24 that is the direction in which the first facing surface 24*d* extends.

The other end 40*b* of the conductor 40 is bent and inserted into the locking hole 24*c* to attach the conductor 40 to the stay 24. However, a member having the locking hole is not limited to the stay.

Figure 25:
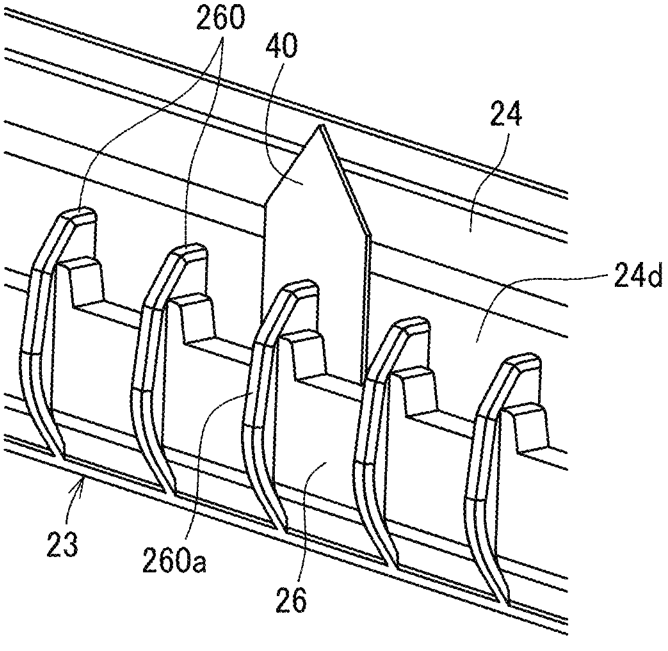
FIG. 25 is a perspective view of the conductor in the fixing device illustrated in FIG. 24.

As illustrated in FIG. 25, the conductor 40 according to the present embodiment is disposed at a position facing one of the guide ribs 260 arranged in the longitudinal direction.

Figure 26:
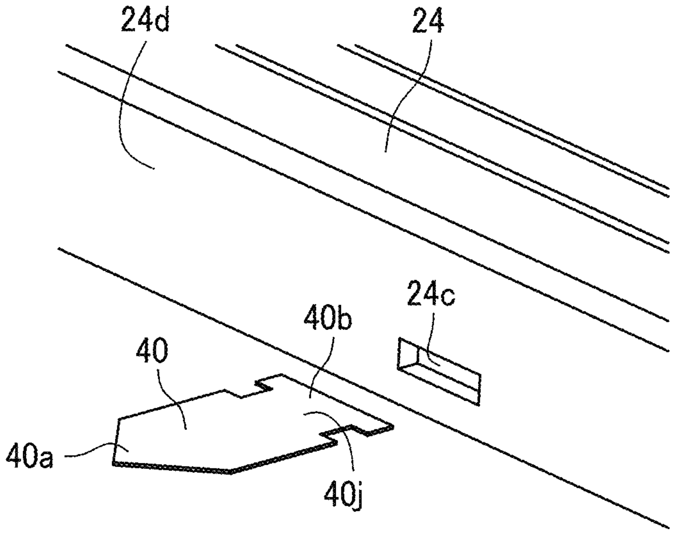
FIG. 26 is a perspective view of the conductor and a part of the stay having a locking hole in the fixing device illustrated in FIG. 24.
Figure 27:
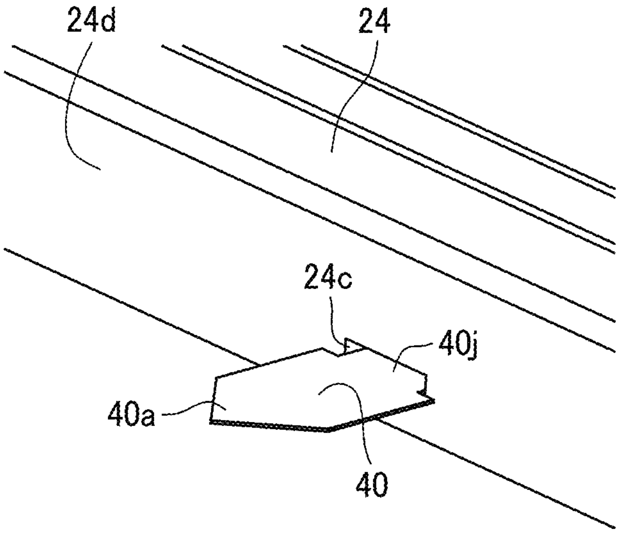
FIG. 27 is a perspective view of the conductor set in the locking hole illustrated in FIG. 26.

As illustrated in FIG. 26, the conductor 40 has a narrow portion 40*j* narrower than the other portion of the conductor 40. The narrow portion 40*j* is nearer to the other end 40*b* than the one end 40*a*. The conductor 40 is elastically deformed, and the other end 40*b* of the conductor 40 is inserted into the locking hole 24*c* of the stay 24. As a result, as illustrated in FIG. 27, the narrow portion 40*j* is disposed in the locking hole 24*c*, and the other end 40*b* of the conductor 40 is set in the locking hole 24*c*. The above-described configuration can surely position the other end 40*b* of the conductor 40 with respect to the stay 24. Without using the fastener such as the screw, the above-described configuration can obtain the above-described effects.

The one end 40*a* of the conductor 40 in FIG. 27 is bent as illustrated in FIG. 24 to form the other end bent portion 40*f* so that the facing portion 40*c* is disposed between the first facing surface 24*d* and a second facing surface 260*c*.

Also in the present embodiment, the facing portion 40*c* of the conductor 40 faces the first facing surface 24*d* of the stay 24 and the second facing surface 260*c* of the guide ribs 260 disposed downstream from the heater holder 23, serving as the second facing member. The facing portion 40*c* is disposed along the first facing surface 24*d* and the second facing surface 260*c*. Similar to the above-described embodiment, the above-described configuration can stabilize the contact state of the conductor 40 with respect to the fixing belt 20. Without using the fastener such as the screw to fix the conductor 40 on a member in the fixing device, the above-described configuration can obtain the above-described effect. Accordingly, since the above-described configuration does not require a space for setting the fastener such as the screw, the fixing device can be miniaturized. Reducing the member such as the fastener reduces the thermal capacity of the fixing device to save energy.

In particular, in the present embodiment, the other end bent portion 40*f* is formed by elastic deformation in order to insert the other end 40*b* of the conductor 40 into the locking hole 24*c*. The other end bent portion 40*f* is a portion bent toward the surface of the conductor 40 opposite to the other surface of the conductor 40 in contact with the fixing belt 20. In other words, the other end bent portion 40*f* is a portion bent toward downstream in the rotation direction of the fixing belt 20 at the position at which the one end 40*a* is in contact with the fixing belt 20. The other end bent portion 40*f* is disposed on the side opposite to the side of the one end 40*a* of the conductor 40 across the facing portion 40*c*.

If the second facing surface 260*c* does not face the surface of the conductor 40 in contact with the fixing belt 20, a direction in which the conductor 40 inserted into the locking hole 24*c* extends is likely to vary. For example, the conductor 40 may extend in a direction indicated by a dashed line in FIG. 24. The direction in which the conductor 40 extends varies depending on how the conductor 40 is inserted into the locking hole 24*c*. In contrast, providing the second facing surface 260*c* as in the present embodiment limits the inclination of the facing portion 40*c* toward the surface of the conductor 40 in contact with the fixing belt 20 and enables the facing portion 40*c* to be along the second facing surface 260*c*. The above-described configuration can stabilize the contact state of the conductor 40 with respect to the fixing belt 20. In addition, the first facing surface 24*d* of the stay 24 faces the facing portion 40*c* to prevent the conductor 40 from inclining toward the stay 24, which can stabilize the contact state of the conductor 40 with respect to the fixing belt 20.

Figure 28:
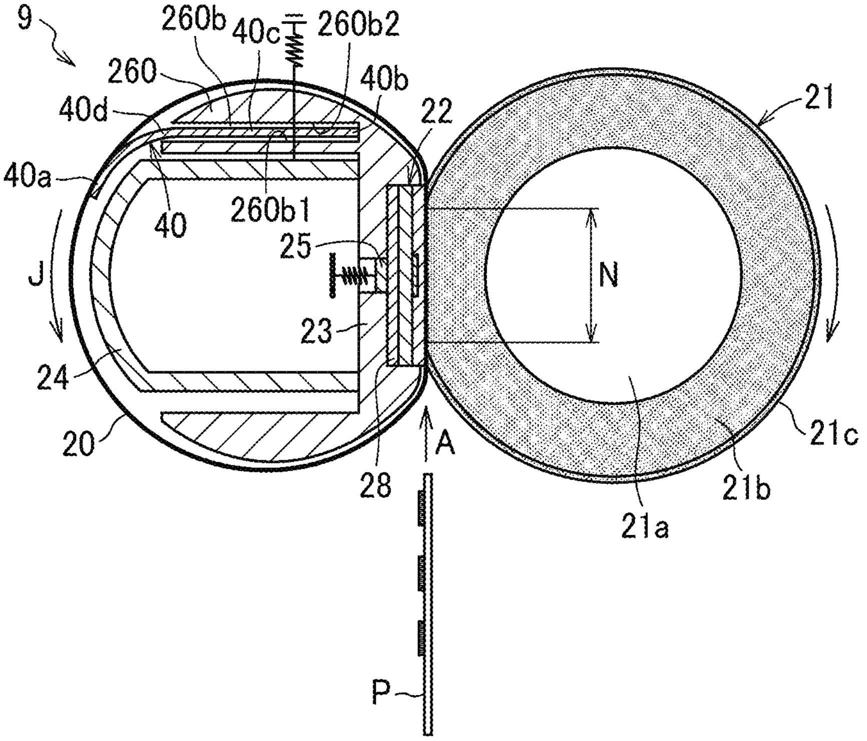
FIG. 28 is a cross-sectional side view of a fixing device including the conductor inserted into an insertion hole of a guide rib.

Alternatively, the guide rib 260 may have an insertion hole 260*b* to insert the conductor 40 as illustrated in FIG. 28. In the present embodiment, the facing portion 40*c* of the conductor 40 faces a first facing surface 260*b*1 and a second facing surface 260*b*2 that are side walls of the insertion hole 260*b*. The guide rib 260 of the present embodiment serves as the first facing member and the second facing member in the present disclosure.

The member having the insertion hole as described above is made of conductive material and is grounded. Alternatively, the conductive material may be attached to the inner surface of the insertion hole and grounded. The conductive material on the inner surface of the insertion hole may be grounded via the stay.

Similar to the above-described embodiments, the conductor 40 faces the first facing surface **260*b*1, and, as a result, the facing portion 40*c* is disposed along the first facing surface 260*b*1. The above-described configuration can stabilize the contact state of the conductor 40 with respect to the inner surface of the fixing belt 20. Similar to the above-described embodiments, the conductor 40 faces the second facing surface 260*b*2, and, as a result, the facing portion 40*c* is disposed along the second facing surface 260*b*2. The above-described configuration can stabilize the contact state of the conductor 40 with respect to the inner surface of the fixing belt 20. Without using the fastener such as the screw to fix the conductor 40** on a member in the fixing device, the above-described configuration can obtain the above-described effects. Accordingly, since the above-described configuration does not require a space for setting the fastener such as the screw, the fixing device can be miniaturized. Reducing the member such as the fastener reduces the thermal capacity of the fixing device to save energy.

In the present embodiment, the conductor 40 may be held by, for example, forming the insertion hole **260*b* into a shape that becomes narrower toward the bottom of the insertion hole 260*b* and inserting the other end of the conductor 40 into the insertion hole 260*b*. The member having the insertion hole 260*b*** is not limited to the guide rib and may be a heater holder having no guide rib or a dedicated member.

Figure 29:
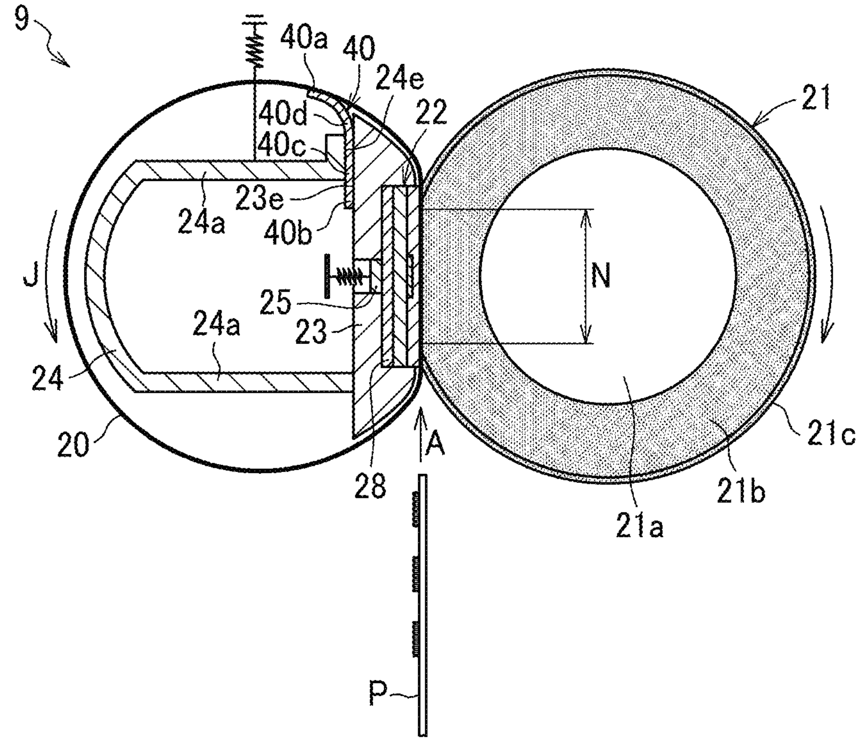
FIG. 29 is a cross-sectional side view of a fixing device including the conductor extending in a direction different from the conductors illustrated in the above.

The direction in which the facing portion **40*c* of the conductor 40 extends is not limited to the direction in the above-described embodiments. For example, the fixing device 9 in an embodiment illustrated in FIG. 29 includes the facing portion 40*c* extending in the vertical direction in FIG. 29. The conductor 40 is sandwiched and held by the stay 24 and the heater holder 23. Specifically, the facing portion 40*c* of the conductor 40 faces a first facing surface 24*e* of the stay 24 and a second facing surface 23*e* of the heater holder 23 and is sandwiched and held by the first facing surface 24*e* and the second facing surface 23*e*. As a result, the facing portion 40*c* is disposed along the first facing surface 24*e* or the second facing surface 23*e*. The above-described configuration in the present embodiment can also stabilize the contact state of the conductor 40 with respect to the inner surface of the fixing belt 20**.

In the above-described embodiments illustrated in FIGS. 22, 24, 28, and 29, disposing the contact portion of the conductor as illustrated in FIGS. 4 to 10 or disposing the contact portion of the conductor and the contact portion of the temperature sensor as illustrated in FIGS. 11 and 12 can reduce the difference in the sliding friction of the fixing belt 20 in the longitudinal direction.

Figure 30:
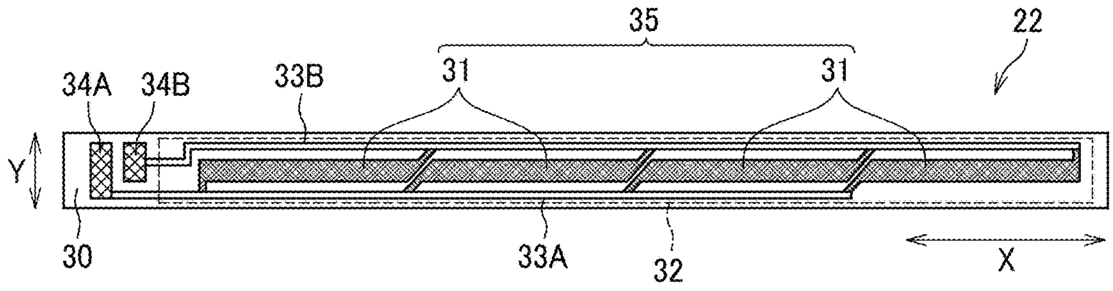
FIG. 30 is a plan view of a heater.

Next, a more detailed configuration of the heater disposed in the above-described fixing device is described with reference to FIG. 30. FIG. 30 is a plan view of the heater according to the present embodiment.

As illustrated in FIG. 30, the heater 22 includes the planar base 30. On the surface of the base 30, a plurality of resistive heat generators 31 (four resistive heat generators 31), power supply lines 33A and 33B that are conductive members, a first electrode 34A, and a second electrode 34B are disposed. However, the number of resistive heat generators 31 is not limited to four in the present embodiment. Hereinafter, the power supply lines 33A and 33B are also referred to as power supply lines 33, and the first electrode 34A and the second electrode 34B are also referred to as electrodes 34.

In the present embodiment, the longitudinal direction of the heater 22 and the like that is the direction perpendicular to the surface of the paper on which FIG. 2 is drawn is also an arrangement direction X in which the plurality of resistive heat generators 31 are arranged as illustrated in FIG. 30. Hereinafter, the direction X is also simply referred to as the arrangement direction. In addition, a direction that intersects the arrangement direction of the plurality of resistive heat generators 31 and is different from a thickness direction of the base 30 is referred to as a direction intersecting the arrangement direction. In the present embodiment, the direction intersecting the arrangement direction is the vertical direction Y in FIG. 30. The direction Y intersecting the arrangement direction is a direction along the surface of the base 30 on which the resistive heat generators 31 are arranged and is also a short-side direction of the heater 22 and a conveyance direction of the sheet P passing through the fixing device 9.

The plurality of resistive heat generators 31 configure a heat generation portion 35 including portions arranged in the arrangement direction. The resistive heat generators 31 are electrically coupled in parallel to a pair of electrodes 34A and 34B via the power supply lines 33A and 33B. The pair of electrodes 34A and 34B is disposed on one end of the base 30 in the arrangement direction that is a left end of the base 30 in FIG. 30. The power supply lines 33A and 33B are made of conductors having an electrical resistance value smaller than an electrical resistance value of the resistive heat generator 31. A gap between neighboring resistive heat generators 31 is preferably 0.2 mm or more, more preferably 0.4 mm or more from the viewpoint of maintaining the insulation between the neighboring resistive heat generators 31. If the gap between the neighboring resistive heat generators 31 is too large, the gap is likely to cause temperature decrease in a region corresponding to the gap. Accordingly, from the viewpoint of reducing the temperature unevenness in the arrangement direction, the gap is preferably equal to or shorter than 5 mm, and more preferably equal to or shorter than 1 mm.

The resistive heat generator 31 is made of a material having a positive temperature coefficient (PTC) of resistance that is a characteristic that the resistance value increases to decrease the heater output as the temperature T increases.

Dividing the heat generation portion 35 configured by the resistive heat generators 31 having the PTC characteristic in the arrangement direction prevents overheating of the fixing belt 20 when small sheets pass through the fixing device 9. When the small sheets each having a width smaller than the entire width of the heat generation portion 35 pass through the fixing device 9, the temperature of a region of the resistive heat generator 31 corresponding to a region of the fixing belt 20 that is not in contact with the small sheet increases because the small sheet does not absorb heat of the fixing belt 20 in the region that is not in contact with the small sheet, in other words, the region outside a small sheet passing region of the fixing belt 20 on which the small sheet passes. Since a constant voltage is applied to the resistive heat generators 31, the temperature increase in the regions facing outsides of the small sheet passing region causes the increase in resistance values of the resistive heat generators 31. The temperature increase relatively reduces outputs (that is, heat generation amounts) of the heater in the regions, thus restraining an increase in temperature in the regions of the heater and end portions of the fixing belt facing the regions.

Electrically coupling the plurality of resistive heat generators 31 in parallel can restrain temperature rises in non-sheet passing regions while maintaining the print speed.

The heat generator that configures the heat generation portion 35 may not be the resistive heat generator having the PTC characteristic. The resistive heat generators in the heater 22 may be arranged in a plurality of rows arranged in the direction intersecting the arrangement direction.

The resistive heat generators 31 arranged in the arrangement direction reduces the increase in temperature in the regions that are end portions of the fixing belt outside the small sheets and can reduce the temperature unevenness of the fixing belt 20 in the arrangement direction. Since the rigidity of the fixing belt 20 changes depending on the temperature thereof, the fixing belt 20 having small temperature unevenness in the arrangement direction is advantageous in ensuring stable contact with the conductor 40. Accordingly, since the conductor 40 can be in the stable contact with the fixing belt 20, the configuration including the resistive heat generators 31 arranged in the arrangement direction in the above-described embodiment is preferable. Similarly, a configuration including the first high thermal conduction member 28 and a second high thermal conduction member 36, which is described below, is preferable. In a case in which the conductor 40 is set without using a fastener such as the screw, the above-described configurations are advantageous from the viewpoint of stably bringing the conductor 40 into contact with the fixing belt 20.

The resistive heat generators 31 are produced, for example, as below. Silver-palladium (AgPd), glass powder, and the like are mixed to make paste. The paste is coated to the base 30 by screen printing or the like. Thereafter, the base 30 is subject to firing. Then, the resistive heat generators 31 are produced. The resistive heat generators 31 each have a resistance value of 80Ω at room temperature, in the present embodiment. The material of the resistive heat generators 31 may contain a resistance material, such as silver alloy (AgPt) or ruthenium oxide ($RuO_2$), other than the above material. Silver (Ag) or silver palladium (AgPd) may be used as a material of the power supply lines 33A and 33B and the electrodes 34A and 34B. Screen-printing such a material forms the power supply lines 33A and 33B and the electrodes 34A and 34B. The power supply lines 33A and 33B are made of conductors having the electrical resistance value smaller than the electrical resistance value of the resistive heat generators 31.

The material of the base 30 is preferably a nonmetallic material having excellent thermal resistance and insulating properties, such as glass, mica, or ceramic such as alumina or aluminum nitride. The heater 22 according to the present embodiment includes an alumina base having a thickness of 1.0 mm, a width of 270 mm in the arrangement direction, and a width of 8 mm in the direction intersecting the arrangement direction. The base 30 may be made by layering the insulation material on conductive material such as metal. Low-cost aluminum or stainless steel is favorable as the metal material of the base 30. The base 30 made of a stainless steel plate is resistant to cracking due to thermal stress.

To improve thermal uniformity of the heater 22 and image quality, the base 30 may be made of a material having high thermal conductivity, such as copper, graphite, or graphene.

The insulation layer 32 may be, for example, a heat-resistant glass layer having a thickness of 75 μm. The insulation layer 32 covers the resistive heat generators 31 and the power supply lines 33A and 33B to insulate and protect the resistive heat generators 31 and the power supply lines 33A and 33B and maintain sliding performance with the fixing belt 20.

Figure 31:
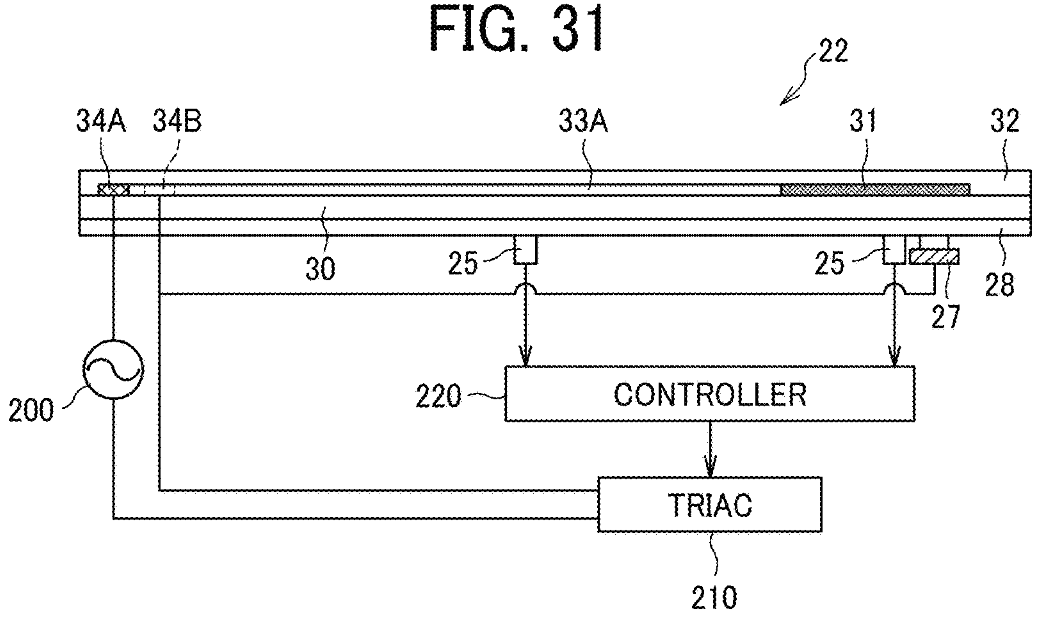
FIG. 31 is a schematic diagram illustrating a circuit to supply power to the heater of FIG. 30.

FIG. 31 is a schematic diagram illustrating a circuit to supply power to the heater according to the present embodiment.

As illustrated in FIG. 31, the alternating current power supply 200 is electrically coupled to the electrodes 34A and 34B of the heater 22 to configure a power supply circuit in the present embodiment to supply power to the resistive heat generators 31. The power supply circuit includes a triac 210 that controls an amount of power supplied. A controller 220 controls the amount of power supplied to the resistive heat generators 31 via the triac 210 based on temperatures detected by the thermistors 25. The controller 220 includes a microcomputer including, for example, a central processing unit (CPU), a read only memory (ROM), a random access memory (RAM), and an input and output (I/O) interface.

In the present embodiment, one thermistor 25 is disposed in the central region of the heater 22 in the arrangement direction that is the region inside a sheet conveyance span for the smallest sheet, and the other thermistor 25 is disposed in one end portion of the heater 22 in the arrangement direction. A thermostat 27 as a power cut-off device is disposed in the one end portion of the heater 22 in the arrangement direction and cuts off power supply to the resistive heat generators 31 when the temperature of the resistive heat generator 31 becomes a predetermined temperature or higher. The thermistors 25 and the thermostat 27 contact the first high thermal conduction member 28 to detect the temperature of the first high thermal conduction member 28.

Figure 32:
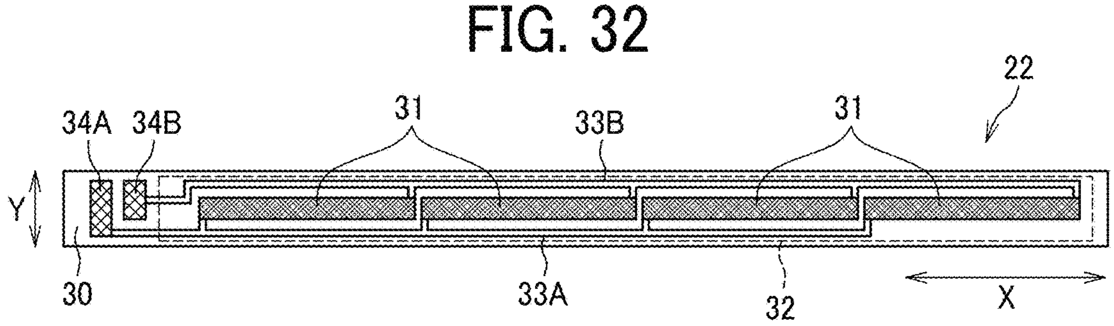
FIG. 32 is a plan view of a heater including resistive heat generators each having a form different from a form of the resistive heat generator illustrated in FIG. 30.
Figure 33:
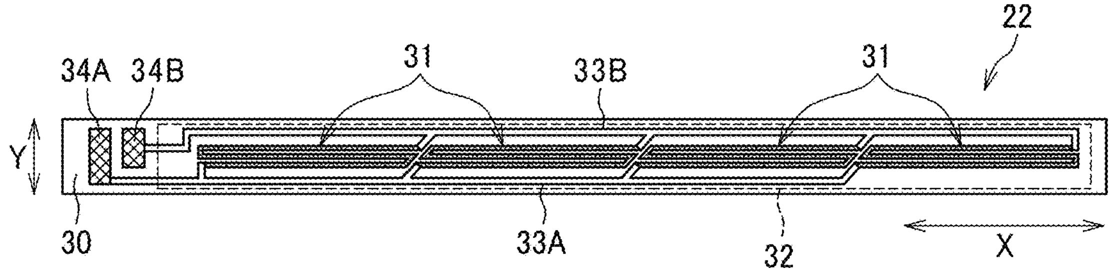
FIG. 33 is a plan view of a heater including resistive heat generators each having a form different from each of the forms of the resistive heat generators illustrated in FIGS. 30 and 32.

The first electrode 34A and the second electrode 34B are disposed on the same end portion of the base 30 in the arrangement direction in the present embodiment but may be disposed on both end portions of the base 30 in the arrangement direction. The shape of resistive heat generator 31 is not limited to the shape in the present embodiment. For example, as illustrated in FIG. 32, the shape of resistive heat generator 31 may be a rectangular shape, or as illustrated in FIG. 33, the resistive heat generator 31 may be configured by a linear portion folding back to form a substantially parallelogram shape. In addition, as illustrated in FIG. 32, portions each extending from the resistive heat generator 31 having a rectangular shape to one of the power supply lines 33A and 33B (the portion extending in the direction intersecting the arrangement direction) may be a part of the resistive heat generator 31 or may be made of the same material as the power supply lines 33A and 33B.

Figure 34:
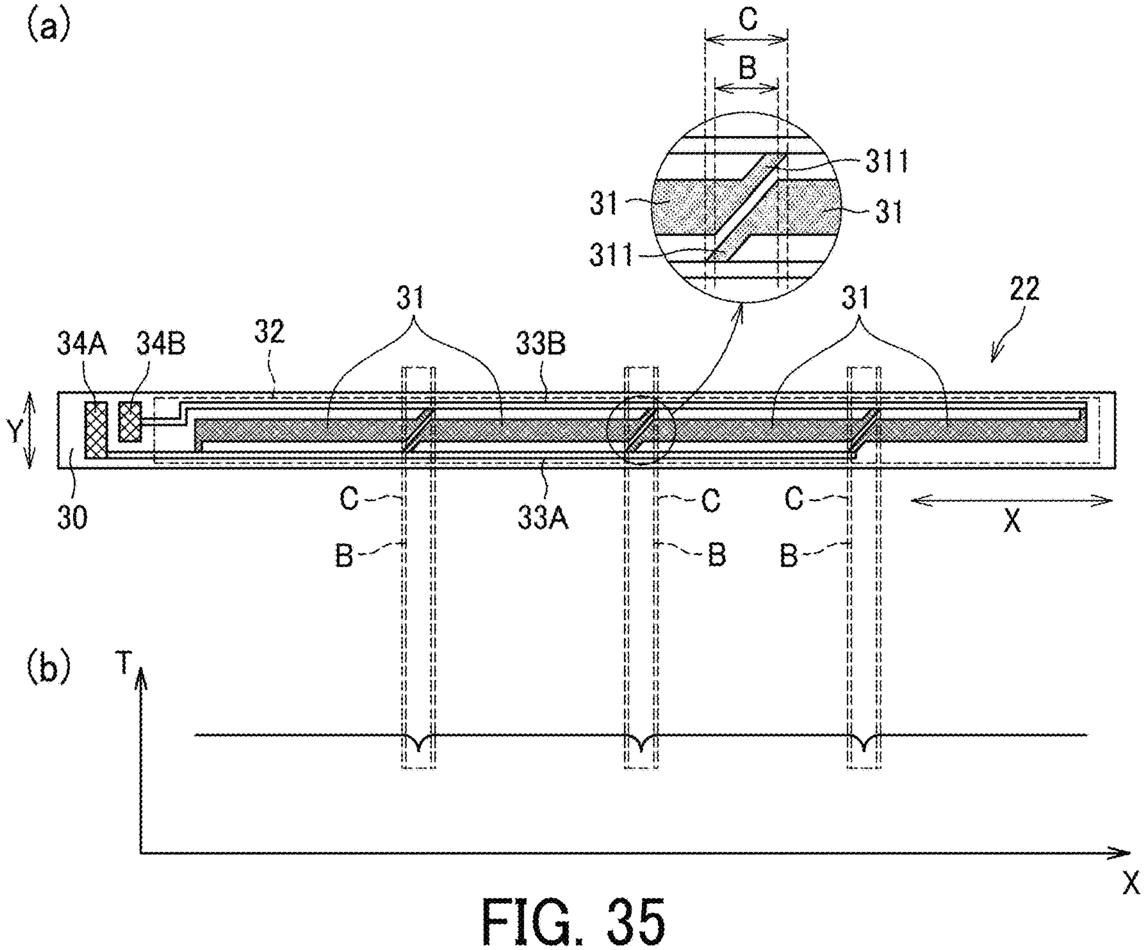
FIG. 34 is a diagram illustrating a temperature distribution of a fixing belt in an arrangement direction of the resistive heat generators of the heater, including (a) a plan view of the heater and (b) a graph illustrating the temperature distribution of the fixing belt.

FIG. 34 is a diagram illustrating a temperature distribution of the fixing belt 20 in the arrangement direction. FIG. 34 includes a plan view (a) of the heater 22 to illustrate the arrangement of the resistive heat generators 31 and a graph (b). In the graph (b), a vertical axis represents the temperature T of the fixing belt 20, and a horizontal axis represents the position of the fixing belt 20 in the arrangement direction.

As illustrated in FIG. 34 (*a*), the plurality of resistive heat generators 31 of the heater 22 are separated from each other in the arrangement direction to form separation areas B including gap areas between the neighboring resistive heat generators 31.

In other words, the heater 22 has gap areas between the plurality of resistive heat generators 31. As illustrated in an enlarged view of FIG. 34 (*a*), the separation area B includes the entire gap area sandwiched by the adjoining resistive heat generators 31. In addition, the separation area B includes parts of the resistive heat generators sandwiched between lines extending in a direction orthogonal to the longitudinal direction from both ends of the gap area in the longitudinal direction. The area occupied by the resistive heat generators 31 in the separation area B is smaller than the area occupied by the resistive heat generators 31 in another area of the heat generation portion 35, and the amount of heat generated in the separation area B is smaller than the amount of heat generated in another area of the heat generation portion. As a result, the temperature of the fixing belt 20 facing the separation area B becomes smaller than the temperature of the fixing belt 20 facing another area, which causes temperature unevenness in the arrangement direction of the fixing belt 20 as illustrated in FIG. 34 (*b*). Similarly, the temperature of the heater 22 corresponding to the separation area B becomes smaller than the temperature of the heater 22 corresponding to another area of the heat generation portion 35. In addition to the separation area B, the heater 22 has an enlarged separation area C including areas corresponding to connection portions 311 of the resistive heat generators 31 and the separation area B as illustrated in the enlarged view of FIG. 34 (*a*). The connection portion 311 is defined as a portion of the resistive heat generator 31 that extends in the direction intersecting the arrangement direction and is connected to one of the power supply lines 33A and 33B. Similar to the separation area B, the temperature of the heater 22 corresponding to the enlarged separation area C and the temperature of the fixing belt 20 corresponding to the enlarged separation area C are smaller than the temperatures of the heater 22 and the fixing belt 20 corresponding to another area of the heat generation portion 35.

Figure 35:
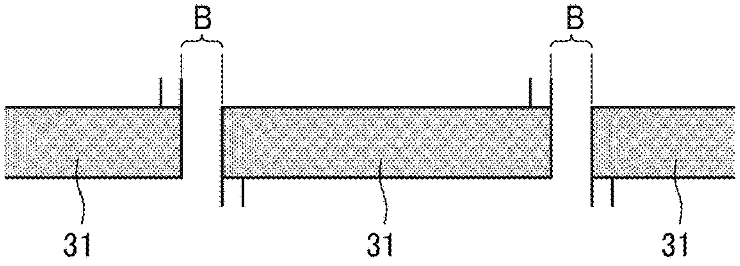
FIG. 35 is a diagram illustrating separation areas of the heater of FIG. 32.
Figure 36:
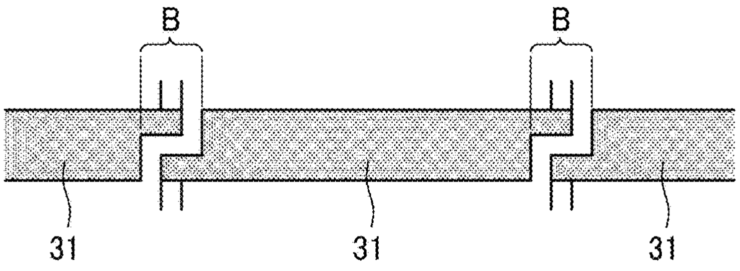
FIG. 36 is a diagram illustrating separation areas each having a form different from the form of the separation area of FIG. 35.
Figure 37:
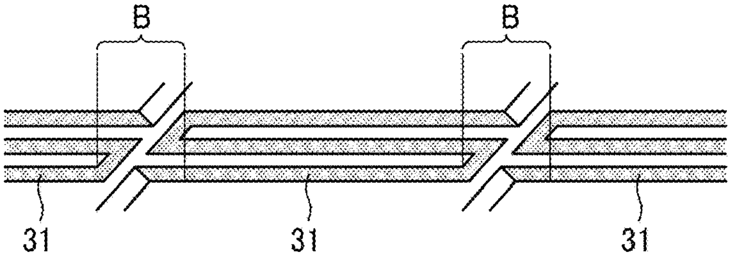
FIG. 37 is a diagram illustrating separation areas of the heater of FIG. 33.

As illustrated in FIG. 35, the heater 22 including the rectangular resistive heat generators 31 illustrated in FIG. 32 also has the separation areas B having lower temperatures than another area of the heat generation portion 35. In addition, the heater 22 including the resistive heat generators 31 having forms as illustrated in FIG. 36 has the separation areas B with lower temperatures than another area of the heat generation portion 35. As illustrated in FIG. 37, the heater 22 including the resistive heat generators 31 having forms as illustrated in FIG. 33 has the separation areas B with lower temperatures than another area of the heat generation portion 35. However, overlapping the resistive heat generators 31 lying next to each other in the arrangement direction as illustrated in FIGS. 34, 36, and 37 can reduce the above-described temperature drop that the temperature of the fixing belt 20 corresponding to the separation area B is smaller than the temperature of the fixing belt 20 corresponding to an area other than the separation area B.

The fixing device 9 in the present embodiment includes the first high thermal conduction member 28 described above in order to reduce the temperature drop corresponding to the separation area B as described above and reduce the temperature unevenness in the arrangement direction of the fixing belt 20. Next, a detailed description is given of the first high thermal conduction member 28.

As illustrated in FIG. 2, the first high thermal conduction member 28 is disposed between the heater 22 and the stay 24 in the lateral direction of FIG. 2 and is particularly sandwiched between the heater 22 and the heater holder 23. One side of the first high thermal conduction member 28 is brought into contact with the back surface of the base 30, and the other side of the first high thermal conduction member 28 is brought into contact with the heater holder 23.

The stay 24 has two right-angle portions 24*a* extending in a thickness direction of the heater 22 and each having a contact surface that contacts the back side of the heater holder 23 or contacts the back side of the heater holder 23 via the conductor 40 to support the heater holder 23, the first high thermal conduction member 28, and the heater 22. In the direction intersecting the arrangement direction that is the vertical direction in FIG. 2, the contact surfaces are outside the resistive heat generators 31. The above-described structure reduces heat transfer from the heater 22 to the stay 24 and enables the heater 22 to effectively heat the fixing belt 20.

As illustrated in FIG. 38, the first high thermal conduction member 28 is a plate having a thickness of 0.3 mm, a length of 222 mm in the arrangement direction, and a width of 10 mm in the direction intersecting the arrangement direction. In the present embodiment, the first high thermal conduction member 28 is made of a single plate but may be made of a plurality of members.

In FIG. 38, the guide portion 26 and the guide rib 260 in FIG. 2 are omitted.

The first high thermal conduction member 28 is fitted into the recessed portion 23*b* of the heater holder 23, and the heater 22 is mounted thereon. Thus, the first high thermal conduction member 28 is sandwiched and held between the heater holder 23 and the heater 22. In the present embodiment, the length of the first high thermal conduction member 28 in the arrangement direction is substantially the same as the length of the heater 22 in the arrangement direction. Both side walls 23*b*1 forming the recessed portion 23*b* in the arrangement direction restrict movement of the heater 22 and movement of the first high thermal conduction member 28 in the arrangement direction and work as arrangement direction regulators. Reducing the positional deviation of the first high thermal conduction member 28 in the arrangement direction in the fixing device 9 improves the thermal conductivity efficiency with respect to a target range in the arrangement direction. In addition, both side walls 23*b*2 forming the recessed portion 23*b* in the direction intersecting the arrangement direction restricts movement of the heater 22 and movement of the first high thermal conduction member 28 in the direction intersecting the arrangement direction.

Figure 39:
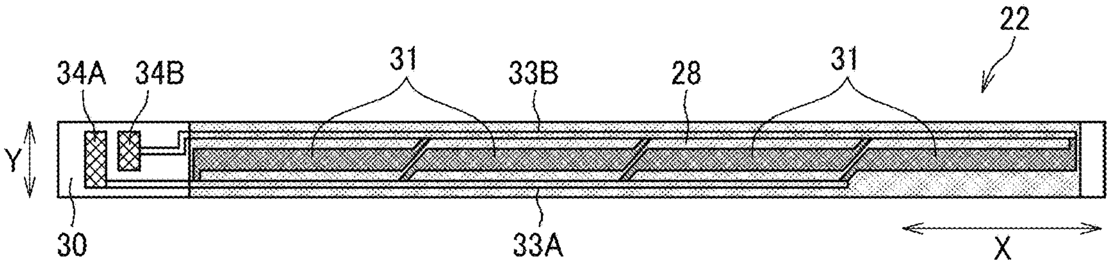
FIG. 39 is a plan view of the heater to illustrate a setting of the first high thermal conduction member.
Figure 40:
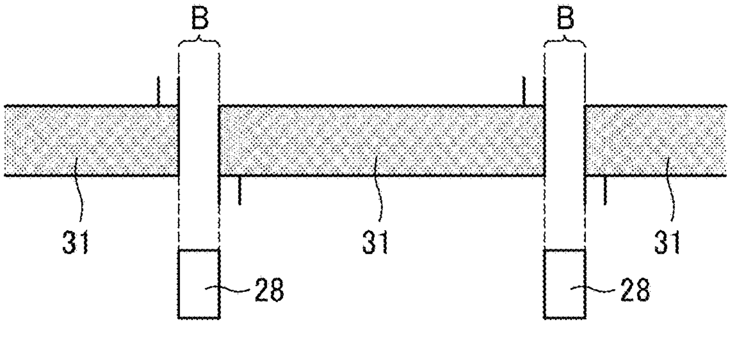
FIG. 40 is a schematic diagram illustrating another example of the setting of the first high thermal conduction members in the heater.

The range in which the first high thermal conduction member 28 is disposed in the arrangement direction is not limited to the above. For example, as illustrated in FIG. 39, the first high thermal conduction member 28 may be disposed so as to face a range corresponding to the heat generation portion 35 in the arrangement direction (see a hatched portion in FIG. 39). As illustrated in FIG. 40, the first high thermal conduction member 28 may face the entire gap area between the resistive heat generators 31. In FIG. 40, for the sake of convenience, the resistive heat generator 31 and the first high thermal conduction member 28 are shifted in the vertical direction of FIG. 40 but are disposed at substantially the same position in the direction intersecting the arrangement direction. However, the present disclosure is not limited to the above. The first high thermal conduction member 28 may be disposed to face a part of the resistive heat generators 31 in the direction intersecting the arrangement direction or may be disposed so as to cover the entire resistive heat generators 31 in the direction intersecting the arrangement direction as illustrated in FIG. 41, which is described below.

Figure 41:
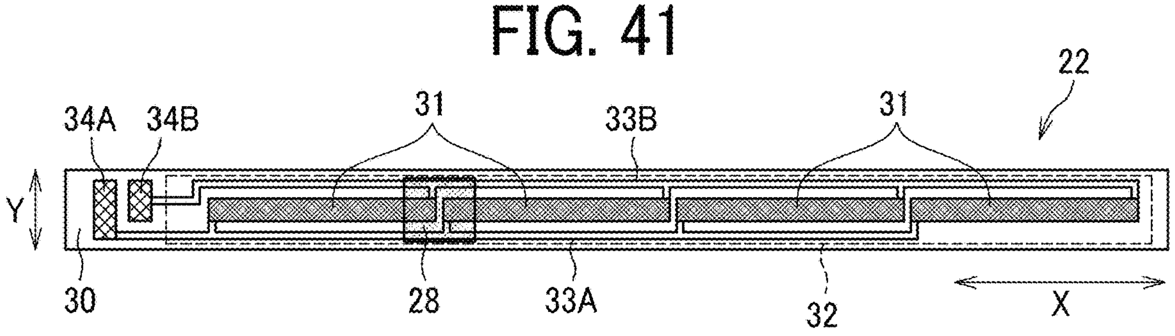
FIG. 41 is a plan view of the heater having a further different setting of the first high thermal conduction member.

As illustrated in FIG. 41, the first high thermal conduction member 28 may face a part of each of the neighboring resistive heat generators 31 in addition to the gap area between the neighboring resistive heat generators 31. The first high thermal conduction member 28 may be disposed to face all separation areas B in the heater 22, one separation area B as illustrated in FIG. 41, or some of separation areas B. At least a part of the first high thermal conduction member 28 may be disposed to face the separation area B.

Due to the pressing force of the pressure roller 21, the first high thermal conduction member 28 is sandwiched between the heater 22 and the heater holder 23 and is brought into close contact with the heater 22 and the heater holder 23. Bringing the first high thermal conduction member 28 into contact with the heaters 22 improves the heat conduction efficiency of the heaters 22 in the arrangement direction. The first high thermal conduction member 28 facing the separation area B improves the heat conduction efficiency of a part of the heater 22 facing the separation area B in the arrangement direction, transmits heat to the part of the heater 22 facing the separation area B, and raise the temperature of the part of the heater 22 facing the separation area B. As a result, the first high thermal conduction member 28 reduces the temperature unevenness in the arrangement direction of the heaters 22. Thus, temperature unevenness in the arrangement direction of the fixing belt 20 is reduced. Therefore, the above-described structure prevents fixing unevenness and gloss unevenness in the image fixed on the sheet. Since the heater 22 does not need to generate additional heat to secure sufficient fixing performance in the part of the heater 22 facing the separation area B, energy consumption of the fixing device 9 can be saved. The first high thermal conduction member 28 disposed over the entire area of the heat generation portion 35 in the arrangement direction improves the heat transfer efficiency of the heater 22 over the entire area of a main heating region of the heater 22 (that is, an area facing an image formation area of the sheet passing through the fixing device) and reduces the temperature unevenness of the heater 22 and the temperature unevenness of the fixing belt 20 in the arrangement direction.

In the present embodiment, the combination of the first high thermal conduction member 28 and the resistive heat generator 31 having the PTC characteristic described above efficiently prevents overheating the non-sheet passing region (that is the region of the fixing belt that is not in contact with the small sheet) of the fixing belt 20 when small sheets pass through the fixing device 9. Specifically, the PTC characteristic reduces the amount of heat generated by the resistive heat generator 31 facing the non-sheet passing region, and the first high thermal conduction member effectively transfers heat from the non-sheet passing region in which the temperature rises to a sheet passing region that is a region of the fixing belt contacting the sheet. As a result, the overheating of the non-sheet passing region is effectively mitigated.

The first high thermal conduction member 28 may be disposed opposite an area around the separation area B because the small heat generation amount in the separation area B decreases the temperature in the area around the separation area B. For example, the first high thermal conduction member 28 facing the enlarged separation area C (see FIG. 34A) particularly improves the heat transfer efficiency of the separation area B and the area around the separation area B in the arrangement direction and reduces the temperature unevenness of the heater 22 in the arrangement direction. In particular, the first high thermal conduction member 28 facing the entire region of the heat generation portion 35 in the arrangement direction reduces the temperature unevenness of the heater 22 (and the fixing belt 20) in the arrangement direction.

Next, different embodiments of the fixing device are described.

Figure 42:
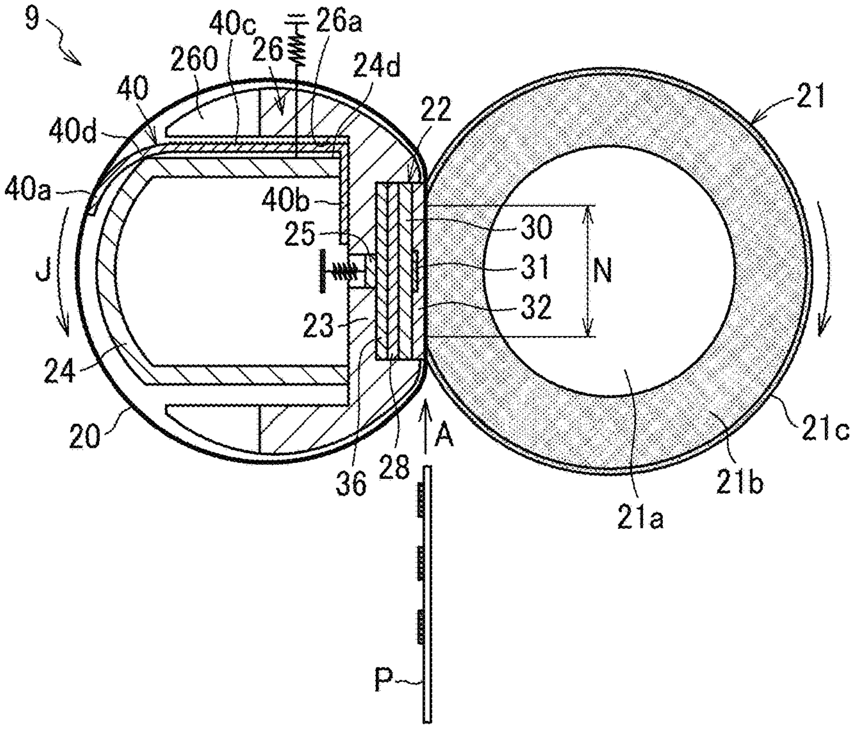
FIG. 42 is a cross-sectional side view of the fixing device according to an embodiment different from the embodiment illustrated in FIG. 2.

As illustrated in FIG. 42, the fixing device 9 according to the present embodiment includes a second high thermal conduction member 36 between the heater holder 23 and the first high thermal conduction member 28. The second high thermal conduction member 36 is disposed at a position different from the position of the first high thermal conduction member 28 in the lateral direction in FIG. 42 that is a direction in which the heater holder 23, the stay 24, and the first high thermal conduction member 28 are layered. Specifically, the second high thermal conduction member 36 is disposed so as to overlap the first high thermal conduction member 28. FIG. 42 illustrates a schematic cross section of the fixing device 9 including the second high thermal conduction member 36 at a position in the arrangement direction, and the position of the schematic cross section is different from the position of the thermistor 25, which is different from the position of the schematic cross section in FIG. 2.

The second high thermal conduction member 36 is made of a material having thermal conductivity higher than the thermal conductivity of the base 30, for example, graphene or graphite. In the present embodiment, the second high thermal conduction member 36 is made of a graphite sheet having a thickness of 1 mm. Alternatively, the second high thermal conduction member 36 may be a plate made of aluminum, copper, silver, or the like.

Figure 43:
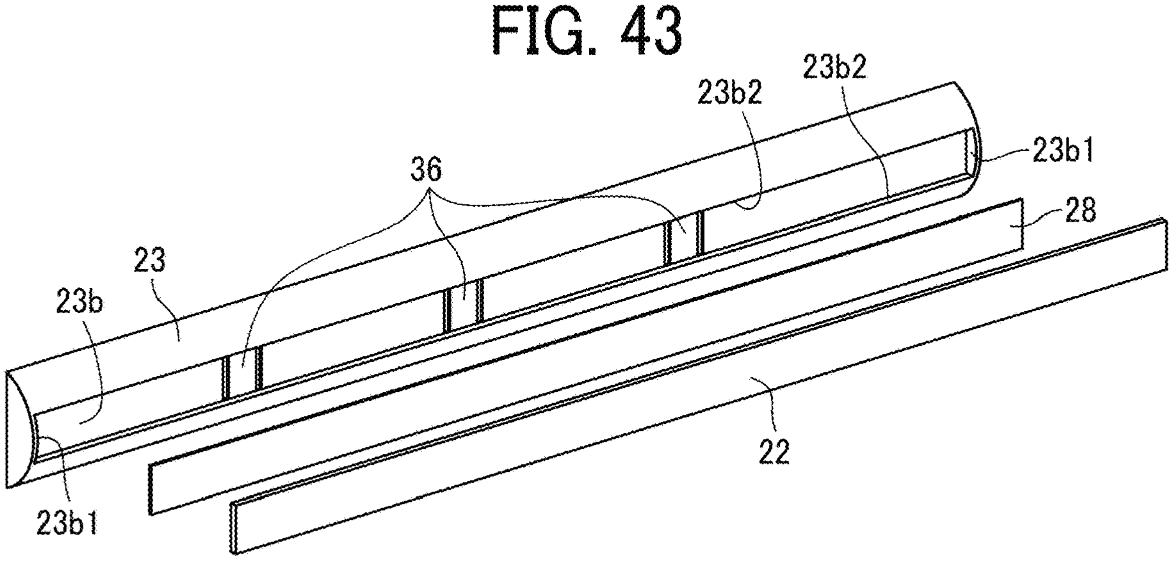
FIG. 43 is a perspective view of the heater, the first high thermal conduction member, a second high thermal conduction member, and the heater holder.

As illustrated in FIG. 43, a plurality of the second high thermal conduction members 36 are disposed on a plurality of portions of the heater holder 23 in the arrangement direction. The recessed portion 23*b* of the heater holder 23 has a plurality of holes in which the second high thermal conduction members 36 are disposed. Clearances are formed between the heater holder 23 and both sides of the second high thermal conduction member 36 in the arrangement direction. The clearance prevents heat transfer from the second high thermal conduction member 36 to the heater holder 23, and the heater 22 can efficiently heat the fixing belt 20. In FIG. 43, the guide portion 26 in FIG. 2 is omitted.

Figure 44:
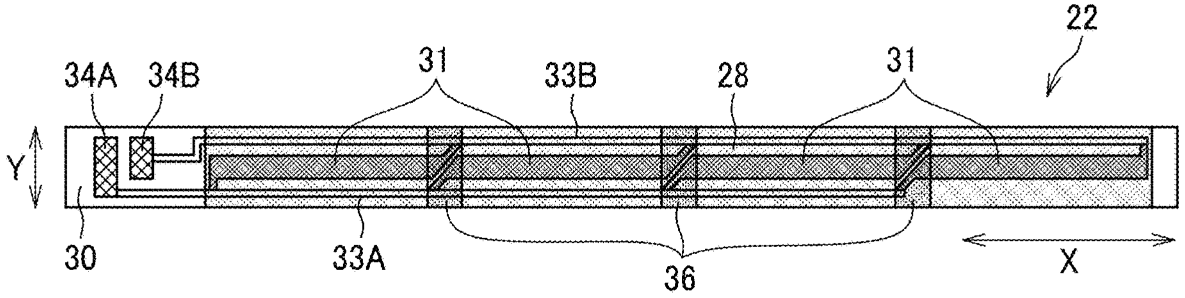
FIG. 44 is a plan view of the heater to illustrate an arrangement of the first high thermal conduction member and the second high thermal conduction member.

As illustrated in FIG. 44, each of the second high thermal conduction members 36 (see the hatched portions) is disposed at a position corresponding to the separation area B in the arrangement direction and faces at least a part of each of the neighboring resistive heat generators 31 in the arrangement direction. In particular, each of the second high thermal conduction members 36 in the present embodiment faces the entire separation area B. In FIG. 44 (and FIG. 48 to be described later), the first high thermal conduction member 28 faces the heat generation portion 35 extending in the arrangement direction, but the first high thermal conduction member 28 according to the present embodiment is not limited this as described above.

Figure 45:
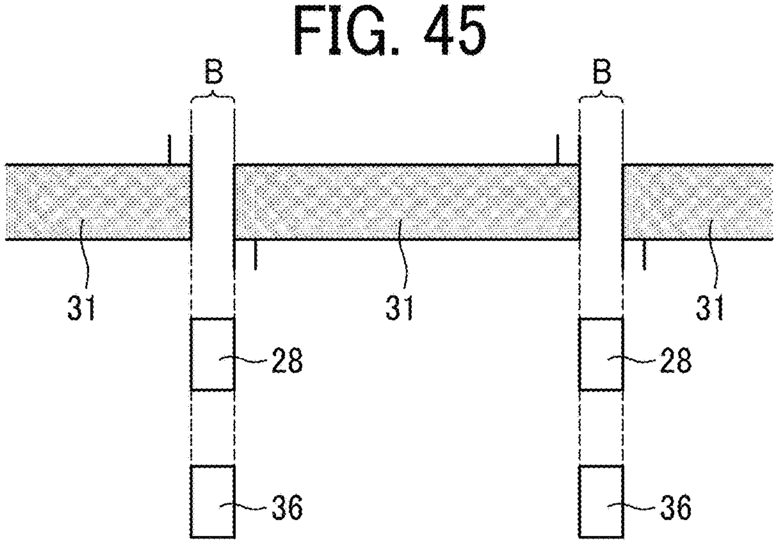
FIG. 45 is a schematic diagram illustrating a different arrangement of the first high thermal conduction members and the second high thermal conduction members from the arrangement in FIG. 44.

The fixing device 9 according to the present embodiment includes the second high thermal conduction member 36 disposed at the position corresponding to the separation area B in the arrangement direction and the position at which at least a part of each of the neighboring resistive heat generators 31 faces the second high thermal conduction member 36 in addition to the first high thermal conduction member 28. The above-described structure particularly improves the heat transfer efficiency in the separation area B in the arrangement direction and further reduces the temperature unevenness of the heater 22 in the arrangement direction. As illustrated in FIG. 45, the first high thermal conduction members 28 and the second high thermal conduction member 36 may be disposed opposite the entire gap area between the resistive heat generators 31. The above-described structure improves the heat transfer efficiency of the part of the heater 22 corresponding to the gap area to be higher than the heat transfer efficiency of the other part of the heater 22. In FIG. 45, for the sake of convenience, the resistive heat generator 31, the first high thermal conduction member 28, and the second high thermal conduction member 36 are shifted in the vertical direction of FIG. 45 but are disposed at substantially the same position in the direction intersecting the arrangement direction. The present disclosure is not limited to the above. The first high thermal conduction member 28 and the second high thermal conduction member 36 may be disposed opposite a part of the resistive heat generators 31 in the direction intersecting the arrangement direction.

In one embodiment different from the embodiments described above, each of the first high thermal conduction member 28 and the second high thermal conduction member 36 is made of a graphene sheet. The first high thermal conduction member 28 and the second high thermal conduction member 36 made of the graphene sheet have high thermal conductivity in a predetermined direction along the plane of the graphene, that is, not in the thickness direction but in the arrangement direction. Accordingly, the above-described structure can effectively reduce the temperature unevenness of the fixing belt 20 in the arrangement direction and the temperature unevenness of the heater 22 in the arrangement direction.

Figure 46:
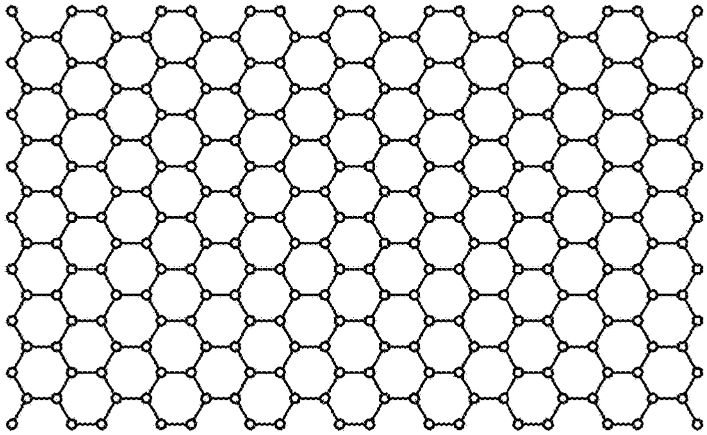
FIG. 46 is a schematic diagram illustrating a two-dimensional atomic crystal structure of graphene.

Graphene is a flaky powder. Graphene has a planar hexagonal lattice structure of carbon atoms, as illustrated in FIG. 46. The graphene sheet is usually a single layer. The single layer of carbon may contain impurities. The graphene may have a fullerene structure. The fullerene structures are generally recognized as compounds including an even number of carbon atoms, which form a cage-like fused ring polycyclic system with five and six membered rings, including, for example, C60, C70, and C80 fullerenes or other closed cage structures having three-coordinate carbon atoms.

Graphene sheets are artificially made by, for example, a chemical vapor deposition (CVD) method.

The graphene sheet is commercially available. The size and thickness of the graphene sheet or the number of layers of the graphite sheet described below are measured by, for example, a transmission electron microscope (TEM).

Figure 47:
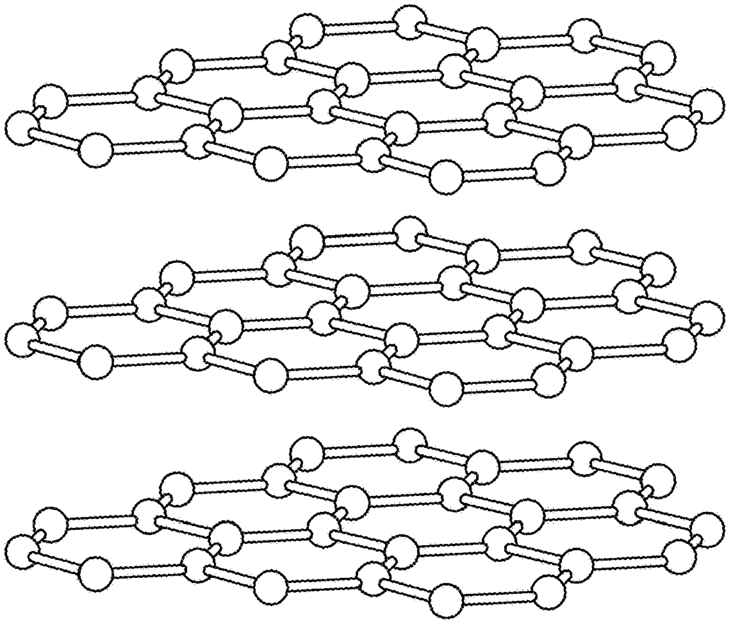
FIG. 47 is a schematic diagram illustrating a three-dimensional atomic crystal structure of graphite.

Graphite obtained by multilayering graphene has a large thermal conduction anisotropy. As illustrated in FIG. 47, the graphite has a crystal structure formed by layering a number of layers each having a condensed six membered ring layer plane of carbon atoms extending in a planar shape. Among carbon atoms in this crystal structure, adjacent carbon atoms in the layer are coupled by a covalent bond, and carbon atoms between layers are coupled by a van der Waals bond. The covalent bond has a larger bonding force than a van der Waals bond. Therefore, there is a large anisotropy between the bond between carbon atoms in a layer and the bond between carbon atoms in different layers. That is, the first high thermal conduction member 28 and the second high thermal conduction member 36 that are made of graphite each have the heat transfer efficiency in the arrangement direction larger than the heat transfer efficiency in the thickness direction of the first high thermal conduction member 28 and the second high thermal conduction member 36 (that is, the stacking direction of these members), reducing the heat transferred to the heater holder 23. Accordingly, the above-described structure can efficiently decrease the temperature unevenness of the heater 22 in the arrangement direction and can minimize the heat transferred to the heater holder 23. Since the first high thermal conduction member 28 and the second high thermal conduction member 36 that are made of graphite are not oxidized at about 700 degrees or lower, the first high thermal conduction member 28 and the second high thermal conduction member 36 each have an excellent heat resistance.

The physical properties and dimensions of the graphite sheet may be appropriately changed according to the function required for the first high thermal conduction member 28 or the second high thermal conduction member 36. For example, the anisotropy of the thermal conduction can be increased by using high-purity graphite or single-crystal graphite or increasing the thickness of the graphite sheet. Using a thin graphite sheet can reduce the thermal capacity of the fixing device 9 so that the fixing device 9 can perform high speed printing. A width of the first high thermal conduction member 28 or a width of the second high thermal conduction member 36 in the direction intersecting the arrangement direction may be increased in response to a large width of the fixing nip N or a large width of the heater 22.

From the viewpoint of increasing mechanical strength, the number of layers of the graphite sheet is preferably 11 or more. The graphite sheet may partially include a single layer portion and a multilayer portion.

Figure 48:
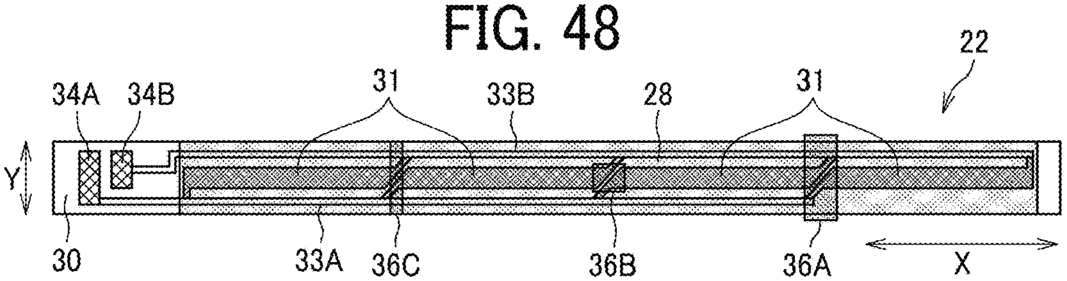
FIG. 48 is a plan view of the heater having a different arrangement of the second high thermal conduction member from the arrangement in FIG. 44.

As long as the second high thermal conduction member 36 faces a part of each of neighboring resistive heat generators 31 and at least a part of the gap area between the neighboring resistive heat generators 31, the configuration of the second high thermal conduction member 36 is not limited to the configuration illustrated in FIG. 44. For example, as illustrated in FIG. 48, a second high thermal conduction member 36A is longer than the base 30 in the direction intersecting the arrangement direction, and both ends of the second high thermal conduction member 36A in the direction intersecting the arrangement direction are outside the base 30 in FIG. 28. A second high thermal conduction member 36B faces a range in which the resistive heat generator 31 is disposed in the direction intersecting the arrangement direction. A second high thermal conduction member 36C faces a part of the gap area and a part of each of neighboring resistive heat generators 31.

Figure 49:
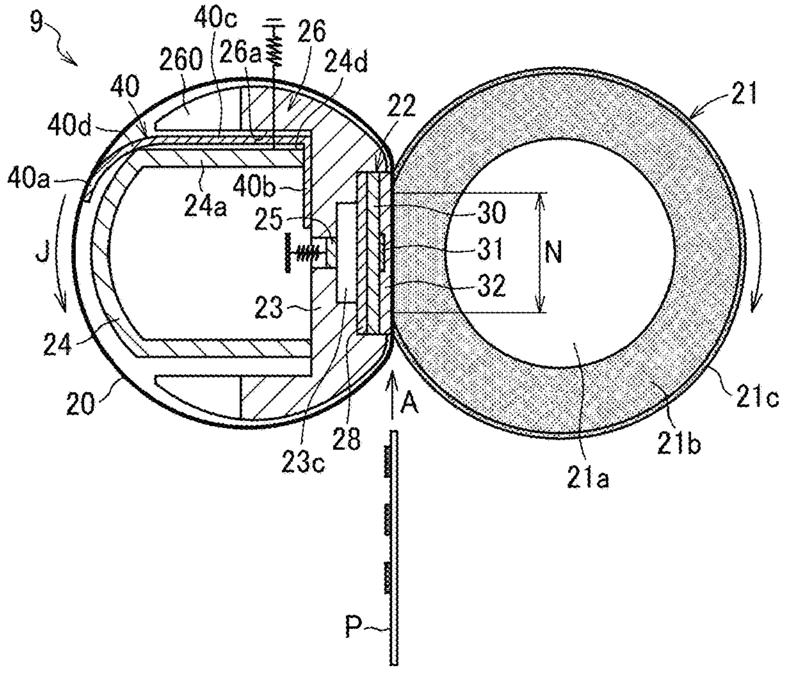
FIG. 49 is a cross-sectional side view of the fixing device different from the fixing devices illustrated in FIGS. 2 and 42.

As illustrated in FIG. 49, the fixing device according to the present embodiment has a gap between the first high thermal conduction member 28 and the heater holder 23 in the thickness direction that is the lateral direction in FIG. 49. In other words, the fixing device 9 has a gap 23*c* serving as a thermal insulation layer. The gap 23*c* is in a partial area of the recessed portion 23*b* (see FIG. 43). In the recessed portion 23*b* of the heater holder 23, the heater 22, the first high thermal conduction member 28, and the second high thermal conduction member 36 are set, but the second high thermal conduction member is not set in the partial area. The partial area is a part of or entire area of the recessed portion 23*b* other than an area on which the second high thermal conduction member 36 is set in the arrangement direction and a part of the recessed portion 23*b* in the direction intersecting the arrangement direction. The gap 23*c* has a depth deeper than other portions to receive the first high thermal conduction member 28. The above-described structure minimizes the contact area between the heater holder 23 and the first high thermal conduction member 28. Minimizing the contact area reduces heat transfer from the first high thermal conduction member 28 to the heater holder 23 and enables the heater 22 to efficiently heat the fixing belt 20. In the cross section of the fixing device 9 in which the second high thermal conduction member 36 is set, the second high thermal conduction member 36 is in contact with the heater holder 23 as illustrated in FIG. 42 of the above-described embodiment.

In particular, the fixing device 9 according to the present embodiment has the gap 23*c* facing the entire area of the resistive heat generators 31 in the direction intersecting the arrangement direction that is the vertical direction in FIG. 49. The gap 23*c* reduces heat transfer from the first high thermal conduction member 28 to the heater holder 23, and the heater 22 can efficiently heat the fixing belt 20. The fixing device 9 may include a thermal insulation layer made of heat insulator having a lower thermal conductivity than the thermal conductivity of the heater holder 23 instead of a space like the gap 23*c* serving as the thermal insulation layer.

In the above description, the second high thermal conduction member 36 is a member different from the first high thermal conduction member 28, but the present embodiment is not limited to this. For example, the first high thermal conduction member 28 may have a thicker portion than the other portion so that the thicker portion faces the separation area B.

In the above-described embodiments illustrated in FIGS. 42 and 49, disposing the contact portion of the conductor as illustrated in FIGS. 4 to 10 or disposing the contact portion of the conductor and the contact portion of the temperature sensor as illustrated in FIGS. 11 and 12 can reduce the difference in the sliding friction of the fixing belt 20 in the longitudinal direction. Similar to the above-described other embodiments, the conductor 40 facing the first facing surface 24*d* of the stay 24 and the second facing surface 26*a* of the guide portion 26 can stabilize the contact state of the conductor 40 with the inner surface of the fixing belt 20. Without using the fastener such as the screw to fix the conductor 40 on a member in the fixing device, the above-described configuration can obtain the above-described effects. Accordingly, since the above-described configuration does not require a space for setting the fastener such as the screw, the fixing device can be miniaturized. Reducing the member such as the fastener reduces the thermal capacity of the fixing device to save energy.

The above-described embodiments are illustrative and do not limit this disclosure. It is therefore to be understood that within the scope of the appended claims, numerous additional modifications and variations are possible to this disclosure otherwise than as specifically described herein.

Figure 50:
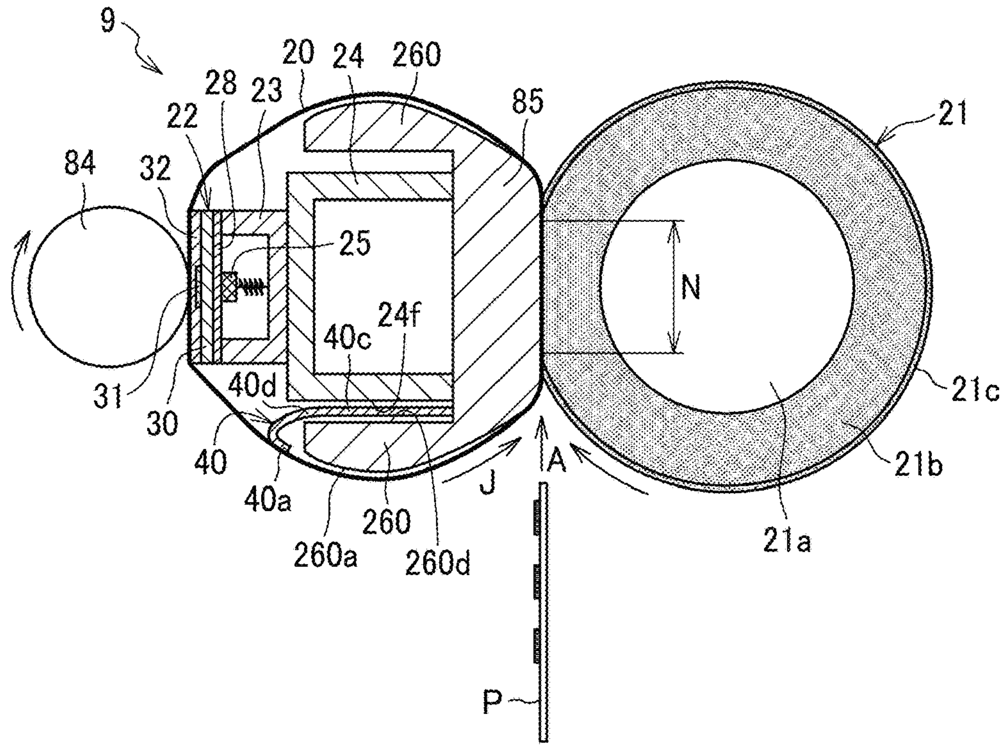
FIG. 50 is a cross-sectional side view of a fixing device different from the fixing devices illustrated in FIGS. 2, 42, and 49.
Figure 51:
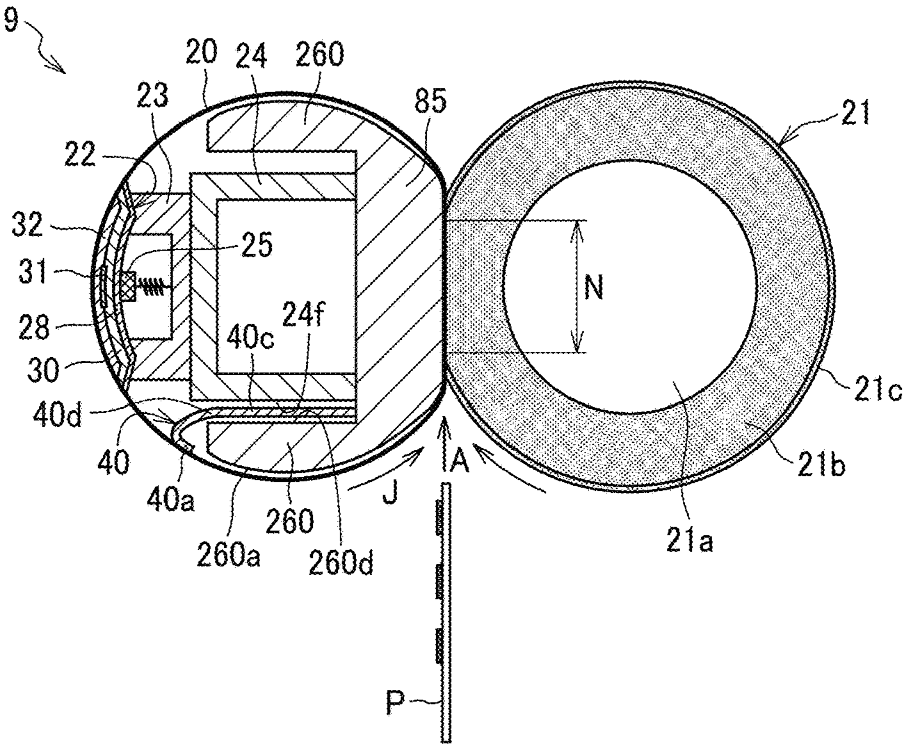
FIG. 51 is a cross-sectional side view of a fixing device different from the fixing devices of FIGS. 2, 42, 49, and 50.
Figure 52:
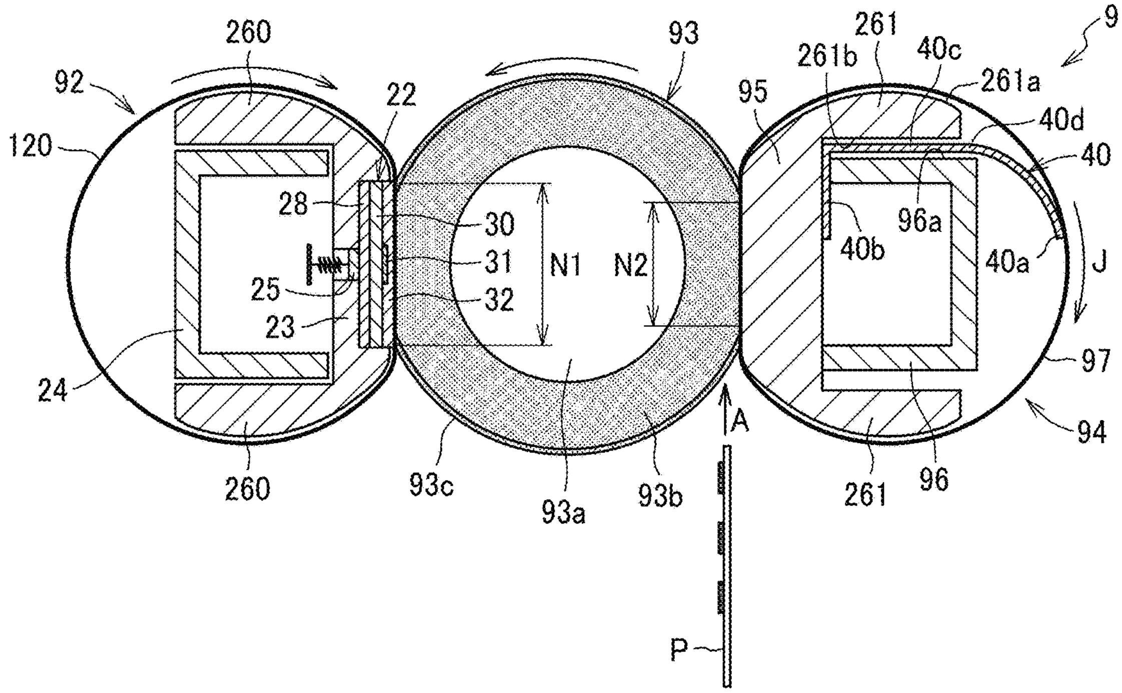
FIG. 52 is a cross-sectional side view of a fixing device different from the fixing devices of FIGS. 2, 42, and 49 to 51.

The embodiments of the present disclosure are also applicable to the fixing devices as illustrated in FIGS. 50 to 52 in addition to the fixing devices described above. The configurations of fixing devices illustrated in FIGS. 50 to 52 are briefly described below.

First, the fixing device 9 illustrated in FIG. 50 includes a pressurization roller 84 opposite the pressure roller 21 with respect to the fixing belt 20. The pressurization roller 84 is an opposed rotator that rotates and is opposite the fixing belt 20 as the rotator. The fixing belt 20 is sandwiched by the pressurization roller 84 and the heater 22 and heated by the heater 22. On the other hand, a nip formation pad 85 serving as a nip former is disposed inside the loop formed by the fixing belt 20 and disposed opposite the pressure roller 21. The nip formation pad 85 is supported by the stay 24. The nip formation pad 85 sandwiches the fixing belt 20 together with the pressure roller 21, thereby forming the fixing nip N.

The guide ribs 260 are disposed upstream and downstream from the nip formation pad 85. The conductor 40 is disposed between the stay 24 and the guide rib 260 upstream from the nip formation pad 85. Specifically, the facing portion 40*c* of the conductor 40 faces a first facing surface 260*d* of the guide rib 260 upstream from the nip formation pad 85 and a second facing surface 24*f* of the stay 24. In the present embodiment, the guide rib 260 serves as the first facing member, and the stay 24 serves as the second facing member. The facing portion 40*c* is disposed along the first facing surface 260*d* and the second facing surface 24*f*. The one end 40*a* of the conductor 40 is in contact with the inner surface of the fixing belt 20 as the rotator.

A description is provided of the construction of the fixing device 9 as illustrated in FIG. 51. The fixing device 9 does not include the pressurization roller 84 described above with reference to FIG. 50. In order to attain a contact length for which the heater 22 contacts the fixing belt 20 in the circumferential direction thereof, the heater 22 is curved into an arc in cross section that corresponds to a curvature of the fixing belt 20. Other parts of the fixing device 9 illustrated in FIG. 51 are the same as the fixing device 9 illustrated in FIG. 50.

Finally, the fixing device 9 illustrated in FIG. 52 is described. The fixing device 9 includes a heating assembly 92, a fixing roller 93 that is a fixing member, and a pressure assembly 94 that is a facing pressing member.

The heating assembly 92 includes the heater 22, the first high thermal conduction member 28, the heater holder 23, the stay 24, which are described in the above embodiments, and a heating belt 120 as the rotator. The fixing roller 93 is an opposed rotator that rotates and faces the heating belt 120 as the rotator.

The fixing roller 93 includes a core 93*a*, an elastic layer 93*b*, and a release layer 93*c*. The core 93*a* is a solid core made of iron. The elastic layer 93*b* coats the circumferential surface of the core 93*a*. The release layer 93*c* coats an outer circumferential surface of the elastic layer 93*b*. The pressure assembly 94 is opposite to the heating assembly 92 with respect to the fixing roller 93. The pressure assembly 94 includes a nip formation pad 95 and a stay 96 inside the loop of a pressure belt 97, and the pressure belt 97 is rotatably arranged to wrap around the nip formation pad 95 and the stay 96. The sheet P passes through the fixing nip N2 between the pressure belt 97 and the fixing roller 93 to be heated and pressed to fix the image onto the sheet P. An arrow J in FIG. 52 indicates a rotation direction of the pressure belt 97.

Guide ribs 261 are disposed upstream and downstream from the nip formation pad 95. A plurality of guide ribs 261 each having a substantially fan shape are disposed in the arrangement direction. The guide rib 261 has a belt facing surface 261*a* facing the inner circumferential surface of the pressure belt 97. The belt facing surface 261*a* has an arc-shaped or convex curved surface extending in a belt circumferential direction.

The conductor 40 is disposed between the stay 96 and the guide rib 261 downstream from the nip formation pad 95. Specifically, the facing portion 40*c* of the conductor 40 faces a first facing surface 96*a* of the stay 96 and a second facing surface 261*b* of the guide rib 261 downstream from the nip formation pad 95. In the present embodiment, the stay 96 serves as the first facing member, and the guide rib 261 serves as the second facing member. The facing portion 40*c* of the conductor 40 is disposed along the first facing surface 96*a* and the second facing surface 261*b*. The one end 40*a* of the conductor 40 is in contact with the inner surface of the pressure belt 97 as the rotator. In the fixing device 9 including the fixing roller 93 having a surface layer made of conductive material and the heating belt 120 made of conductive material, the conductor 40 may be disposed so as to face the first facing surface of the stay 24 and the second facing surface of the guide rib 260 upstream from the nip formation pad 95, similarly to the embodiment of FIG. 22. In this case, the one end of the conductor 40 is in contact with the inner surface of the heating belt 120 as the rotator.

In the above-described embodiments illustrated in FIGS. 50 to 52, disposing the contact portion of the conductor as illustrated in FIGS. 4 to 10 or disposing the contact portion of the conductor and the contact portion of the temperature sensor as illustrated in FIGS. 11 and 12 can reduce the difference in the sliding friction of the fixing belt 20 in the longitudinal direction.

Disposing the conductor 40 as described by the fixing devices of FIGS. 50 to 52 enables the conductor 40 to be in stable contact with the inner surface of the fixing belt 20 (or the inner surface of the pressure belt 97). As a result, the conductor 40 can appropriately remove the electric charge from the fixing belt 20 or the pressure belt 97. Without using the fastener such as the screw to fix the conductor 40 on a member in the fixing device, the above-described configuration can obtain the above-described effects. Accordingly, since the above-described configuration does not require a space for setting the fastener such as the screw, the fixing device can be miniaturized. Reducing the member such as the fastener reduces the thermal capacity of the fixing device to save energy.

The present disclosure is not limited to applying the fixing device described in the above embodiments. The present disclosure may be applied to, for example, a heating device such as a dryer to dry ink applied to the sheet, a coating device (a laminator) that heats, under pressure, a film serving as a covering member onto the surface of the sheet such as paper, and a thermocompression device such as a heat sealer that seals a seal portion of a packaging material with heat and pressure. Applying the present disclosure to the above heating devices can reduce the difference in the sliding friction of the rotator in the longitudinal direction of the rotator.

The image forming apparatus according to the present embodiments of the present disclosure is applicable not only to the color image forming apparatus illustrated in FIG. 1 but also to a monochrome image forming apparatus, a copier, a printer, a facsimile machine, or a multifunction peripheral including at least two functions of the copier, printer, and facsimile machine.

Figure 53:
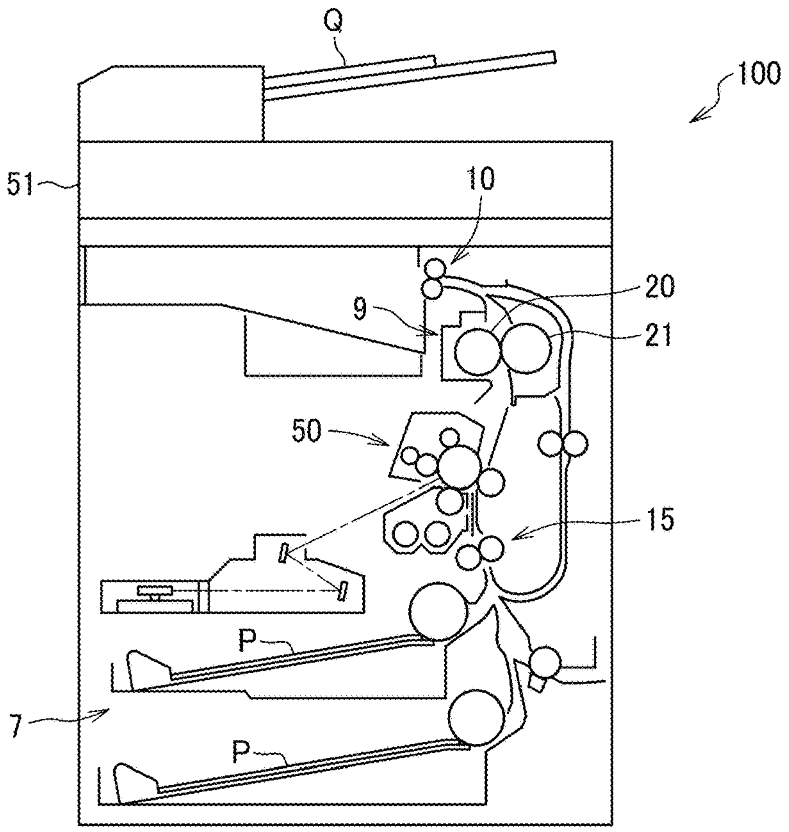
FIG. 53 is a schematic cross sectional view of an image forming apparatus different from the image forming apparatus of FIG. 1.

For example, as illustrated in FIG. 53, the image forming apparatus 100 according to the present embodiment includes an image forming device 50 including a photoconductor drum and the like, the sheet conveyer including the timing roller pair 15 and the like, the sheet feeder 7, the fixing device 9, the sheet ejection device 10, and a reading device 51. The sheet feeder 7 includes the plurality of sheet feeding trays, and the sheet feeding trays stores sheets of different sizes, respectively.

The reading device 51 reads an image of a document Q. The reading device 51 generates image data from the read image. The sheet feeder 7 stores the plurality of sheets P and feeds the sheet P to the conveyance path. The timing roller pair 15 conveys the sheet P on the conveyance path to the image forming device 50.

The image forming device 50 forms a toner image on the sheet P. Specifically, the image forming device 50 includes the photoconductor drum, a charging roller, the exposure device, the developing device, a supply device, a transfer roller, the cleaning device, and a discharging device. The toner image is, for example, an image of the document Q.

The fixing device 9 heats and presses the toner image to fix the toner image on the sheet P. Conveyance rollers convey the sheet P on which the toner image has been fixed to the sheet ejection device 10. The sheet ejection device 10 ejects the sheet P to the outside of the image forming apparatus 100.

Next, the fixing device 9 of the present embodiment is described. Description of configurations common to those of the fixing devices of the above-described embodiments is omitted as appropriate.

Figure 54:
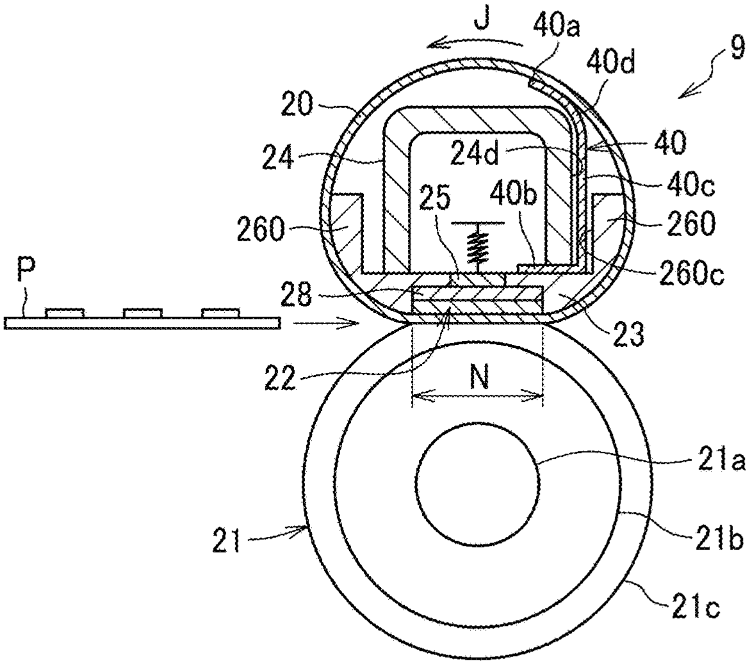
FIG. 54 is a cross-sectional side view of the fixing device according to an embodiment of the present disclosure.

As illustrated in FIG. 54, the fixing device 9 includes the fixing belt 20, the pressure roller 21, the heater 22, the heater holder 23, the stay 24, the thermistor 25, the first high thermal conduction member 28, and the conductor 40.

The fixing nip N is formed between the fixing belt 20 and the pressure roller 21. The nip width of the fixing nip N is 10 mm, and the linear velocity of the fixing device 9 is 240 mm/s.

The fixing belt 20 includes a polyimide base and the release layer and does not include the elastic layer. The release layer is made of a heat-resistant film material made of, for example, fluororesin. The outer loop diameter of the fixing belt 20 is about 24 mm.

The pressure roller 21 includes the core 21*a*, the elastic layer 21*b*, and the release layer 21*c*. The pressure roller 21 has an outer diameter of 24 to 30 mm, and the elastic layer 21*b* has a thickness of 3 to 4 mm.

The heater 22 includes the base, the thermal insulation layer, the conductor layer including the resistive heat generator and the like, and the insulation layer, and is formed to have a thickness of 1 mm as a whole. A width Y of the heater 22 in the direction intersecting the arrangement direction is 13 mm.

The conductor 40 is disposed between the stay 24 and the guide rib 260 downstream from the fixing nip N. Specifically, the facing portion 40*c* of the conductor 40 faces the first facing surface 24*d* of the stay 24 and the second facing surface 260*c* of the guide rib 260 downstream from the fixing nip N. In the present embodiment, the stay 24 serves as the first facing member, and the guide rib 260 serves as the second facing member. The one end 40*a* of the conductor 40 is in contact with the inner surface of the fixing belt 20 as the rotator.

Figure 55:
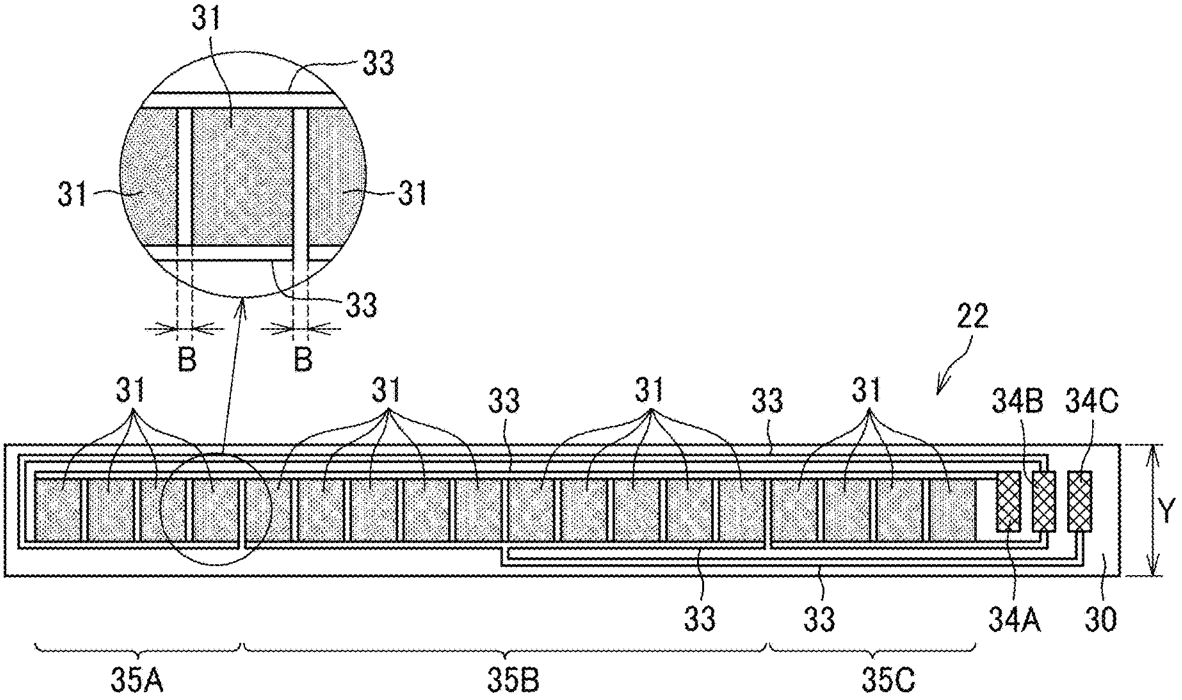
FIG. 55 is a plan view of the heater in the fixing device of FIG. 54.

As illustrated in FIG. 55, the conductor layer of the heater 22 includes a plurality of resistive heat generators 31, power supply lines 33, and electrodes 34A to 34C. As illustrated in the enlarged view of FIG. 55, the separation area B is formed between neighboring resistive heat generators of the plurality of resistive heat generators 31 arranged in the arrangement direction. The enlarged view of FIG. 55 illustrates two separation areas B, but the separation area B is formed between neighboring resistive heat generators of all the plurality of resistive heat generators 31. The resistive heat generators 31 configure three heat generation portions 35A to 35C. When a current flows between the electrodes 34A and 34B, the heat generation portions 35A and 35C generate heat. When a current flows between the electrodes 34A and 34C, the heat generation portion 35B generates heat. When the fixing device 9 fixes the toner image onto the small sheet, the heat generation portion 35B generates heat. When the fixing device 9 fixes the toner image onto the large sheet, all the heat generation portions 35A to 35C generate heat.

Figure 56:
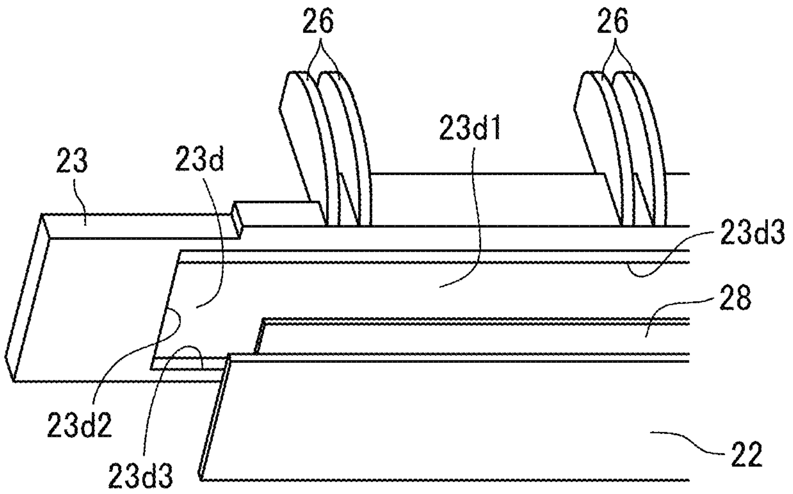
FIG. 56 is a partial perspective view of the heater and the heater holder in the fixing device of FIG. 54.

As illustrated in FIG. 56, the heater holder 23 holds the heater 22 and the first high thermal conduction member 28 in a recessed portion 23*d*. The recessed portion 23*d* is formed on the side of the heater holder 23 facing the heater 22. The recessed portion 23*d* has a bottom surface 23*d*1 and walls 23$d$2 and 23$d$3. The bottom surface 23$d$1 is substantially parallel to the base 30 and the surface recessed from the side of the heater holder 23 toward the stay 24. The walls 23$d$2 are both side surfaces of the recessed portion 23$d$ in the arrangement direction. The recessed portion 23$d$ may have one wall 23$d$2. The walls 23$d$3 are both side surfaces of the recessed portion 23$d$ in the direction intersecting the arrangement direction. The heater holder 23 has guide portions 26. The heater holder 23 is made of LCP.

Figure 57:
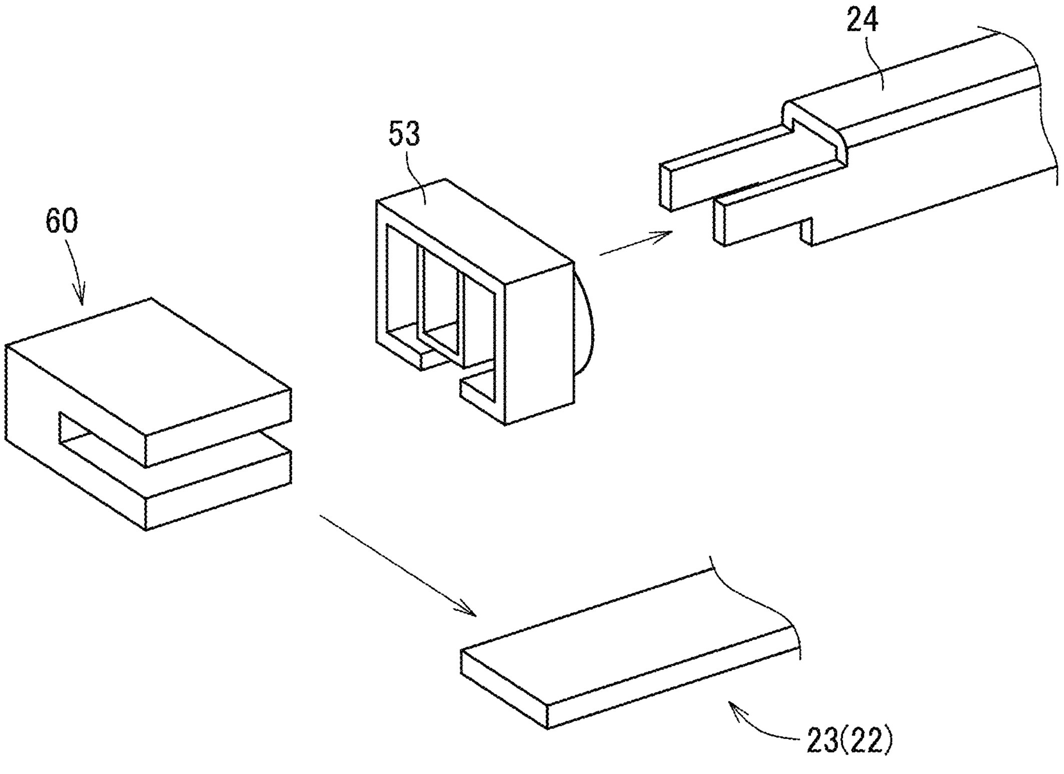
FIG. 57 is a view to illustrate a method of attaching a connector to the heater and a method of attaching a flange to a stay.

As illustrated in FIG. 57, a connector 60 includes a housing made of resin such as LCP and a plurality of contact terminals fixed to the housing.

The connector 60 is attached to the heater 22 and the heater holder 23 such that a front side of the heater 22 and the heater holder 23 and a back side of the heater 22 and the heater holder 23 are sandwiched by the connector 60. In this state, the contact terminals contact and press against the electrodes of the heater 22, respectively and the heat generation portions 35 are electrically coupled to the power supply provided in the image forming apparatus via the connector 60. The above-described configuration enables the power supply to supply power to the heat generation portions 35. Note that at least a part of each of the electrodes 34A to 34C is not coated by the insulation layer and therefore exposed to secure connection with the connector 60.

A flange 53 contacts the inner circumferential surface of the fixing belt 20 at each of both ends of the fixing belt 20 in the arrangement direction to hold the fixing belt 20. The flange 53 is fixed to the housing of the fixing device 9. The flange 53 is inserted into each of both ends of the stay 24 (see an arrow direction from the flange 53 in FIG. 57).

To attach to the heater 22 and the heater holder 23, the connector 60 is moved in the direction intersecting the arrangement direction (see a direction indicated by arrow from the connector 60 in FIG. 57). The connector 60 and the heater holder 23 may have a convex portion and a recessed portion to attach the connector 60 to the heater holder 23. The convex portion disposed on one of the connector 60 and the heater holder 23 is engaged with the recessed portion disposed on the other and relatively move in the recessed portion to attach the connector 60 to the heater holder 23. The connector 60 is attached to one end of the heater 22 and one end of the heater holder 23 in the arrangement direction. The one end of the heater 22 and the one end of the heater holder 23 are farther from a portion in which the pressure roller 21 receives a driving force from a drive motor than the other end of the heater 22 and the other end of the heater holder 23, respectively.

Figure 58:
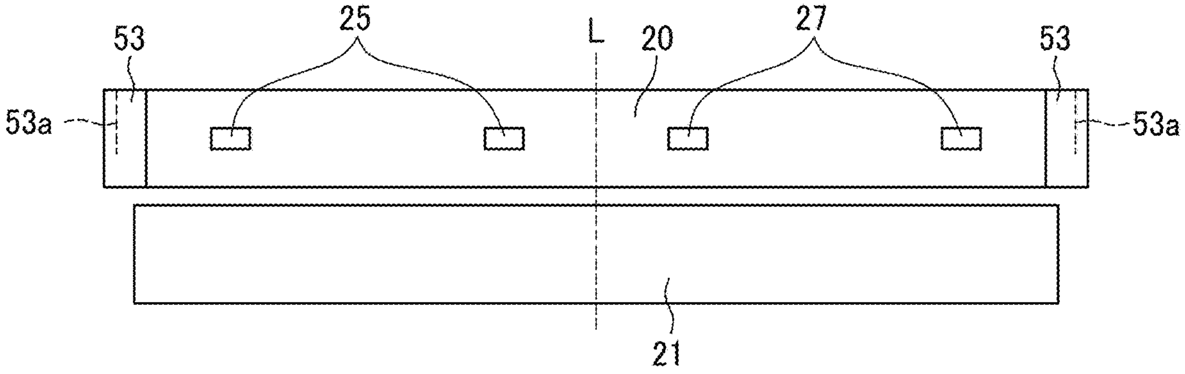
FIG. 58 is a schematic diagram illustrating an arrangement of thermistors and thermostats.

As illustrated in FIG. 58, one thermistor 25 faces a center portion of the inner circumferential surface of the fixing belt 20 in the arrangement direction, and another thermistor 25 faces an end portion of the inner circumferential surface of the fixing belt 20 in the arrangement direction. The heater 22 is controlled based on the temperature of the center portion of the fixing belt 20 and the temperature of the end portion of the fixing belt 20 in the arrangement direction that are detected by the thermistors 25.

As illustrated in FIG. 58, one thermostat 27 faces a center portion of the inner circumferential surface of the fixing belt 20 in the arrangement direction, and another thermostat 27 faces an end portion of the inner circumferential surface of the fixing belt 20 in the arrangement direction. Each of the thermostats 27 shuts off a current to the heater 22 in response to a detection of a temperature of the fixing belt 20 higher than a predetermined threshold value.

Flanges 53 are disposed at both ends of the fixing belt 20 in the arrangement direction and hold both ends of the fixing belt 20, respectively. The flange 53 is made of LCP.

Figure 59:
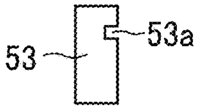
FIG. 59 is a schematic diagram illustrating a groove of a flange.

As illustrated in FIG. 59, the flange 53 has a slide groove 53$a$. The slide groove 53$a$ extends in a direction in which the fixing belt 20 moves toward and away from the pressure roller 21. An engaging portion of the housing of the fixing device 9 is engaged with the slide groove 53$a$. The relative movement of the engaging portion in the slide groove 53$a$ enables the fixing belt 20 to move toward and away from the pressure roller 21.

In the above-described fixing devices 9, disposing the contact portion of the conductor as illustrated in FIGS. 4 to 10 or disposing the contact portion of the conductor and the contact portion of the temperature sensor as illustrated in FIGS. 11 and 12 can reduce the difference in the sliding friction of the fixing belt 20 in the longitudinal direction. Disposing the above-described fastener or the conductor 40 in the above-described fixing device enables the conductor 40 to be in stable contact with the fixing belt 20. In addition, the fixing device can be downsized as described above.

The recording medium P may be a sheet of plain paper, thick paper, thin paper, a postcard, an envelope, coated paper, art paper, tracing paper, overhead projector (OHP) sheet, plastic film, prepreg, copper foil, or the like.

Now, a description is given of some aspects of the present disclosure.

First Aspect

In a first aspect, a fixing device includes a rotator, a pressure rotator, a heater, and a conductor. The pressure rotator presses the rotator to form a fixing nip between the rotator and the pressure rotator. The heater is in contact with an inner circumferential surface of the rotator to heat the rotator. The conductor is grounded and has a contact portion in contact with a center region of the inner circumferential surface of the rotator in a longitudinal direction of the rotator.

Second Aspect

In a second aspect, the fixing device according to the first aspect fixes a toner image onto each of multiple sizes, and the center region has a width of the smallest size of the recording media, fixed by the fixing device, in the longitudinal direction.

Third Aspect

In a third aspect, the contact portion of the conductor in the fixing device according to the second aspect is in contact with a center position of the rotator in the longitudinal direction.

Fourth Aspect

In a fourth aspect, the fixing device includes a rotator, a pressure rotator, a heater, and multiple conductors. The rotator has a center region and outer regions outside the center region in a longitudinal direction of the rotator. The pressure rotator presses the rotator to form a fixing nip between the rotator and the pressure rotator. The heater is in contact with an inner circumferential surface of the rotator and heats the rotator. The multiple conductors are grounded and include a first conductor and a second conductor. The first conductor has a first contact portion in contact with one of the outer regions of the inner circumferential surface of the rotator. The second conductor has a second contact portion in contact with the other one of the outer regions of the inner circumferential surface of the rotator.

Fifth Aspect

In a fifth aspect, the fixing device according to the fourth aspect fixes a toner image onto each of multiple sizes of recording media, and the center region has a width of the smallest size of the recording media, fixed by the fixing device, in the longitudinal direction. In addition, the outer regions are inside a maximum sheet passing region of the rotator. The maximum sheet passing region has a width of the largest size of the recording media, fixed by the fixing device, in the longitudinal direction.

Sixth Aspect

In a sixth aspect, a number of each of the first contact portion and the second contact portion in the fixing device according to the fourth aspect or the fifth aspect is one. Or, in the sixth aspect, the multiple conductors in the fixing device according to the fourth aspect or the fifth aspect further include multiple first contact portions including the first contact portion and multiple second contact portions including the second contact portion. A number of the multiple first contact portions is equal to a number of the multiple second contact portions. The multiple first contact portions are in contact with the one of the outer regions of the inner circumferential surface of the rotator. The multiple second contact portions are in contact with the other one of the outer regions of the inner circumferential surface of the rotator.

Seventh Aspect

In a seventh aspect, a position of the first contact portion and a position of the second contact portion are symmetrical with respect to a center position of the rotator in the longitudinal direction in the fixing device according to any one of the fourth to sixth aspects.

Eighth Aspect

In an eighth aspect, the fixing device according to any one of the fourth, sixth, and seventh aspects fixes a toner image onto each of multiple sizes of recording media, and the center region has a width of the second largest size of the recording media, fixed by the fixing device, in the longitudinal direction.

Ninth Aspect

In a ninth aspect, a fixing device includes a rotator, a pressure rotator, a heater, a conductor, and a temperature sensor. The rotator has a center region and outer regions outside the center region in a longitudinal direction of the rotator. The pressure rotator presses the rotator to form a fixing nip between the rotator and the pressure rotator. The heater is in contact with an inner circumferential surface of the rotator, and heats the rotator. The conductor is grounded and has a first contact portion in contact with one of the outer regions of the inner circumferential surface of the rotator. The temperature sensor has a second contact portion in contact with the other one of the outer regions of the inner circumferential surface of the rotator.

Tenth Aspect

In a tenth aspect, the fixing device according to the ninth aspect fixes a toner image onto each of multiple sizes of recording media, and the center region has a width of the smallest size of the recording media, fixed by the fixing device, in the longitudinal direction. In addition, the outer regions are inside a maximum sheet passing region of the rotator. The maximum sheet passing region has a width of the largest size of the recording media, fixed by the fixing device, in the longitudinal direction.

Eleventh Aspect

In an eleventh aspect, the fixing device according to the ninth aspect or the tenth aspect further includes multiple first conductors and a second conductor. The multiple first conductors are grounded and include the conductor. The multiple first conductors have multiple first contact portions including the first contact portion. The multiple first contact portions are in contact with the one of the outer regions of the inner circumferential surface of the rotator. The second conductor is grounded and has a third contact portion in contact with the other one of the outer regions of the inner circumferential surface of the rotator. A number of the multiple first contact portions is equal to a sum of a number of the second contact portion and a number of the third contact portion.

Twelfth Aspect

In a twelfth aspect, a position of the contact portion of the conductor and a position of the contact portion of the temperature sensor are symmetrical with respect to a center position of the rotator in the longitudinal direction in the fixing device according to any one of the ninth to eleventh aspects.

Thirteenth Aspect

In a thirteenth aspect, the fixing device according to any one of the ninth, eleventh, and twelfth aspects fixes a toner image onto each of multiple sizes of recording media, and the center region has a width of the second largest size of the recording media, fixed by the fixing device, in the longitudinal direction.

Fourteenth Aspect

In a fourteenth aspect, the conductor in the fixing device according to any one of the first to thirteenth aspects has a base end opposite to the contact portion, and a width of the contact portion is smaller than a width of the base end.

Fifteenth Aspect

In a fifteenth aspect, an image forming apparatus includes the fixing device according to any one of the first to fourteenth aspects.

Aspect 1

A fixing device includes: a rotator; a pressure rotator configured to press the rotator to form a fixing nip between the rotator and the pressure rotator; a heater in contact with an inner circumferential surface of the rotator, the heater configured to heat the rotator; and a conductor grounded and having a contact portion in contact with a center region of the inner circumferential surface of the rotator in a longitudinal direction of the rotator.

Aspect 2

In the fixing device according to aspect 1, the fixing device is configured to fix a toner image onto each of multiple sizes of recording media, and the center region has a width of the smallest size of the recording media, fixed by the fixing device, in the longitudinal direction.

Aspect 3

In the fixing device according to aspect 2, the contact portion of the conductor is in contact with a center position of the rotator in the longitudinal direction.

Aspect 4

In the fixing device according to aspect 1, the conductor has a base end opposite to the contact portion, and a width of the contact portion is smaller than a width of the base end.

Aspect 5

An image forming apparatus includes the fixing device according to aspect 1.

Aspect 6

A fixing device includes: a rotator having a center region and outer regions outside the center region in a longitudinal direction of the rotator; a pressure rotator configured to press the rotator to form a fixing nip between the rotator and the pressure rotator; a heater in contact with an inner circumferential surface of the rotator, the heater configured to heat the rotator; and multiple conductors grounded and including: a first conductor having a first contact portion in contact with one of the outer regions of the inner circumferential surface of the rotator; and a second conductor having a second contact portion in contact with another of the outer regions of the inner circumferential surface of the rotator.

Aspect 7

In the fixing device according to aspect 6, the fixing device is configured to fix a toner image onto each of multiple sizes of recording media, and the center region has a width of the smallest size of the recording media, fixed by the fixing device, in the longitudinal direction, and the outer regions are inside a maximum sheet passing region of the rotator, the maximum sheet passing region having a width of the largest size of the recording media, fixed by the fixing device, in the longitudinal direction.

Aspect 8

In the fixing device according to aspect 6, a number of each of the first contact portion and the second contact portion is one.

Aspect 9

In the fixing device according to aspect 6, the multiple conductors further include: multiple first contact portions including the first contact portion; and multiple second contact portions including the second contact portion, a number of the multiple first contact portions is equal to a number of the multiple second contact portions, the multiple first contact portions are in contact with the one of the outer regions of the inner circumferential surface of the rotator, and the multiple second contact portions are in contact with the another of the outer regions of the inner circumferential surface of the rotator.

Aspect 10

In the fixing device according to aspect 6, a position of the first contact portion and a position of the second contact portion are symmetrical with respect to a center position of the rotator in the longitudinal direction.

Aspect 11

In the fixing device according to aspect 6, the fixing device is configured to fix a toner image onto each of multiple sizes of recording media, and the center region has a width of a second largest size of the recording media, fixed by the fixing device, in the longitudinal direction.

Aspect 12

In the fixing device according to aspect 6, the first conductor has a first base end opposite to the first contact portion, the second conductor has a second base end opposite to the second contact portion, a width of the first contact portion is smaller than a width of the first base end, and a width of the second contact portion is smaller than a width of the second base end.

Aspect 13

An image forming apparatus includes the fixing device according to aspect 6.

Aspect 14

A fixing device includes: a rotator having a center region and outer regions outside the center region in a longitudinal direction of the rotator; a pressure rotator configured to press the rotator to form a fixing nip between the rotator and the pressure rotator; a heater in contact with an inner circumferential surface of the rotator, the heater configured to heat the rotator; and a conductor grounded and having a first contact portion in contact with one of the outer regions of the inner circumferential surface of the rotator; and a temperature sensor having a second contact portion in contact with another of the outer regions of the inner circumferential surface of the rotator.

Aspect 15

In the fixing device according to aspect 14, the fixing device is configured to fix a toner image onto each of multiple sizes of recording media, and the center region has a width of the smallest size of the recording media, fixed by the fixing device, in the longitudinal direction, and the outer regions are inside a maximum sheet passing region of the rotator, the maximum sheet passing region having a width of the largest size of the recording media, fixed by the fixing device, in the longitudinal direction.

Aspect 16

The fixing device according to aspect 14, further includes: multiple conductors grounded and including the conductor, the multiple conductors having multiple first contact portions including the first contact portion, the multiple first contact portions in contact with the one of the outer regions of the inner circumferential surface of the rotator and multiple third contact portions in contact with the another of the outer regions of the inner circumferential surface of the rotator; and multiple temperature sensors including the temperature sensor, the multiple temperature sensors having the second contact portion and a fourth contact portion in contact with the one of the outer regions of the inner circumferential surface of the rotator, wherein a sum of a number of the multiple first contact portions and a number of the fourth contact portion is equal to a sum of the number of the multiple third contact portions and a number of the second contact portion.

Aspect 17

In the fixing device according to aspect 14, a position of the first contact portion of the conductor and a position of the second contact portion of the temperature sensor are symmetrical with respect to a center position of the rotator in the longitudinal direction.

Aspect 18

In the fixing device according to aspect 14, the fixing device is configured to fix a toner image onto each of multiple sizes of recording media, and the center region has a width of a second largest size of the recording media, fixed by the fixing device, in the longitudinal direction.

Aspect 19

In the fixing device according to aspect 14, the conductor has a base end opposite to the contact portion, and a width of the contact portion is smaller than a width of the base end.

Aspect 20

An image forming apparatus includes the fixing device according to aspect 14.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A fixing device comprising:

a rotator having a center region and outer regions outside the center region in a longitudinal direction of the rotator;

a pressure rotator to press the rotator to form a fixing nip between the rotator and the pressure rotator;

a heater in contact with an inner circumferential surface of the rotator, the heater to heat the rotator; and multiple conductors grounded and including:

a first conductor having a first contact portion in contact with one of the outer regions of the inner circumferential surface of the rotator; and a second conductor having a second contact portion in contact with another of the outer regions of the inner circumferential surface of the rotator.

2. The fixing device according to claim 1, wherein the fixing device is to fix a toner image onto each of multiple sizes of recording media, and the center region has a width of a smallest size of the recording media, fixed by the fixing device, in the longitudinal direction, and the outer regions are inside a maximum sheet passing region of the rotator, the maximum sheet passing region having a width of a largest size of the recording media, fixed by the fixing device, in the longitudinal direction.

3. The fixing device according to claim 1, wherein a number of each of the first contact portion and the second contact portion is one.

4. The fixing device according to claim 1, wherein the multiple conductors further include:

multiple first contact portions including the first contact portion; and multiple second contact portions including the second contact portion, a number of the multiple first contact portions is equal to a number of the multiple second contact portions, the multiple first contact portions are in contact with the one of the outer regions of the inner circumferential surface of the rotator, and the multiple second contact portions are in contact with the another of the outer regions of the inner circumferential surface of the rotator.

5. The fixing device according to claim 1, wherein a position of the first contact portion and a position of the second contact portion are symmetrical with respect to a center position of the rotator in the longitudinal direction.

6. The fixing device according to claim 1, wherein the fixing device is to fix a toner image onto each of multiple sizes of recording media, and the center region has a width of a second largest size of the recording media, fixed by the fixing device, in the longitudinal direction.

7. The fixing device according to claim 1, wherein the first conductor has a first base end opposite to the first contact portion, the second conductor has a second base end opposite to the second contact portion, a width of the first contact portion is smaller than a width of the first base end, and a width of the second contact portion is smaller than a width of the second base end.

8. An image forming apparatus comprising the fixing device according to claim 1.

9. The fixing device according to claim 1, further comprising:

a stay surrounded by the rotator, wherein each of the multiple conductors includes:

a flat portion attached to the stay, and a curved portion adjacent to the flat portion, wherein a tip end of the curved portion corresponding to one of the contact portions.

10. The fixing device according to claim 9, wherein:

the tip end is flat.

11. The fixing device according to claim 9, wherein:

the tip end is curved.

12. The fixing device according to claim 9, wherein:

the tip end is pointed.

13. The fixing device according to claim 9, wherein: the tip end is split.

14. A fixing device comprising:

a rotator having a center region and outer regions outside the center region in a longitudinal direction of the rotator;

a pressure rotator to press the rotator to form a fixing nip between the rotator and the pressure rotator;

a heater in contact with an inner circumferential surface of the rotator, the heater to heat the rotator; and a conductor grounded and having a first contact portion in contact with one of the outer regions of the inner circumferential surface of the rotator; and a temperature sensor having a second contact portion in contact with another of the outer regions of the inner circumferential surface of the rotator.

15. The fixing device according to claim 14, wherein the fixing device is to fix a toner image onto each of multiple sizes of recording media, and the center region has a width of a smallest size of the recording media, fixed by the fixing device, in the longitudinal direction, and the outer regions are inside a maximum sheet passing region of the rotator, the maximum sheet passing region having a width of a largest size of the recording media, fixed by the fixing device, in the longitudinal direction.

16. The fixing device according to claim 14, further comprising:

multiple conductors grounded and including the conductor, the multiple conductors having multiple first contact portions including the first contact portion, the multiple first contact portions in contact with the one of the outer regions of the inner circumferential surface of the rotator and multiple third contact portions in contact with the another of the outer regions of the inner circumferential surface of the rotator; and multiple temperature sensors including the temperature sensor, the multiple temperature sensors having the second contact portion and a fourth contact portion in contact with the one of the outer regions of the inner circumferential surface of the rotator, wherein a sum of a number of the multiple first contact portions and a number of the fourth contact portion is equal to a sum of the number of the multiple third contact portions and a number of the second contact portion.

17. The fixing device according to claim 14, wherein a position of the first contact portion of the conductor and a position of the second contact portion of the temperature sensor are symmetrical with respect to a center position of the rotator in the longitudinal direction.

18. The fixing device according to claim 14, wherein the fixing device is to fix a toner image onto each of multiple sizes of recording media, and the center region has a width of a second largest size of the recording media, fixed by the fixing device, in the longitudinal direction.

19. The fixing device according to claim 14, wherein the conductor has a base end opposite to the first contact portion, and a width of the first contact portion is smaller than a width of the base end.

20. An image forming apparatus comprising the fixing device according to claim 14.

* * * * *